US 6,608,619 B2

(12) United States Patent
Omura et al.

(10) Patent No.: US 6,608,619 B2
(45) Date of Patent: *Aug. 19, 2003

(54) COORDINATE POSITION INPUTTING/DETECTING DEVICE, A METHOD FOR INPUTTING/DETECTING THE COORDINATE POSITION, AND A DISPLAY BOARD SYSTEM

(75) Inventors: Katsuyuki Omura, Kanagawa (JP); Kunikazu Tsuda, Kanagawa (JP); Makoto Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/211,272

(22) Filed: Aug. 5, 2002

(65) Prior Publication Data

US 2003/0006973 A1 Jan. 9, 2003

Related U.S. Application Data

(63) Continuation of application No. 09/307,809, filed on May 10, 1999, now Pat. No. 6,429,856.

(30) Foreign Application Priority Data

May 11, 1998 (JP) .......................................... 10-127035
Jul. 31, 1998 (JP) .......................................... 10-218271
Apr. 22, 1999 (JP) .......................................... 11-115473

(51) Int. Cl.[7] ................................................ G09G 5/00
(52) U.S. Cl. ..................................... 345/175; 178/18.09
(58) Field of Search ......................... 345/173, 175–183; 178/18.01, 18.03, 18.09

(56) References Cited

U.S. PATENT DOCUMENTS 4,507,557 A * 3/1985 Tsikos .......................... 345/175
4,553,842 A * 11/1985 Griffin .......................... 345/175
4,710,760 A * 12/1987 Kasday ......................... 345/175
4,713,534 A   12/1987 Masters et al.
4,834,329 A *  5/1989 Delapp
5,196,835 A *  3/1993 Blue et al. .................... 345/175
5,489,938 A *  2/1996 Maruyama et al.
5,913,582 A *  6/1999 Coonan
6,091,405 A *  7/2000 Lowe et al. ................... 345/175
6,100,538 A *  8/2000 Ogawa ......................... 345/173

FOREIGN PATENT DOCUMENTS

| JP | 57-211637 | 12/1982 |
| JP | 62-192683 | 8/1987 |
| JP | 3-50238 | 5/1991 |
| JP | 6-37467 | 9/1994 |
| JP | 8-240407 | 9/1996 |
| JP | 9-91094 | 4/1997 |
| JP | 2678231 | 8/1997 |
| JP | 9-319501 | 12/1997 |

* cited by examiner

Primary Examiner—Regina Liang
(74) Attorney, Agent, or Firm—Oblon, Spivak, McClelland, Maier & Neustadt, P.C.

(57) ABSTRACT

In the coordinate-position inputting/detecting device, the light receiving/emitting devices emit light beams spreading in a fan shape and travelling along an entry area. The light receiving/emitting devices also receive the light beam reflected by a recursive reflecting member and detect the distribution of the intensity of the received light beam. The coordinates of a position of a pointing body such as a user's fingertip or a pen inserted in the entry area is identified using the distribution of intensity detected by the light receiving/emitting devices.

51 Claims, 72 Drawing Sheets

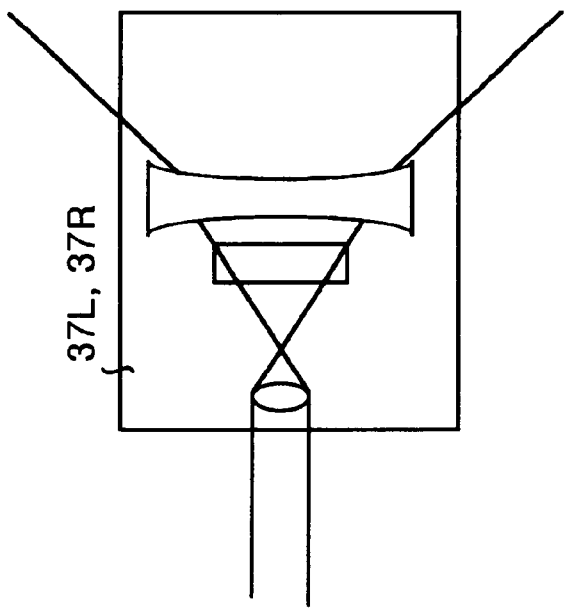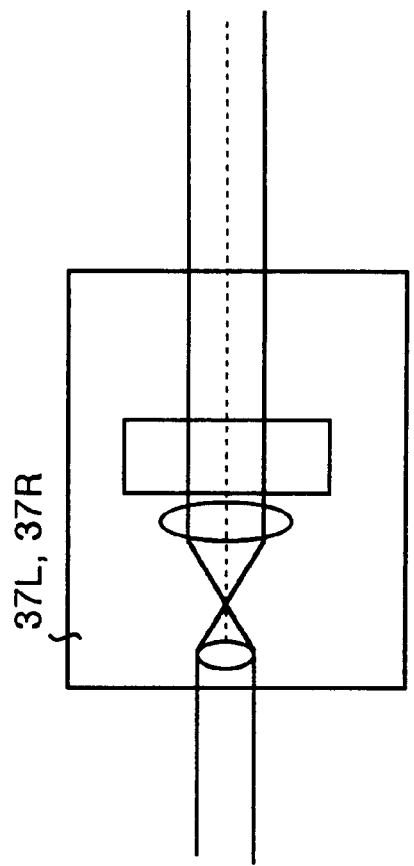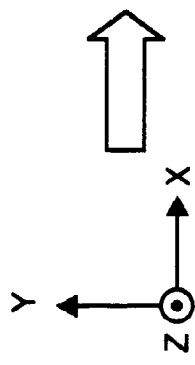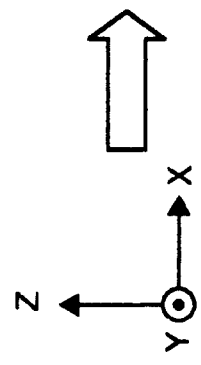

FIG.12

|    | R1 | R2 | R3 | R4 | ... | Rn |
|----|----|----|----|----|-----|----|
| L1 | (x1, y1) | (x2, y1) | (x3, y1) | (x4, y1) | ... | (xn, y1) |
| L2 | (x1, y2) | (x2, y2) | (x3, y2) | (x4, y2) | ... | (xn, y2) |
| L3 | (x1, y3) | (x2, y3) | (x3, y3) | (x4, y3) | ... | (xn, y3) |
| L4 | (x1, y4) | (x2, y4) | (x3, y4) | (x4, y4) | ... | (xn, y4) |
| L5 | (x1, y5) | (x2, y5) | (x3, y5) | (x4, y5) | ... | (xn, y5) |
| ... | ... | ... | ... | ... | ... | ... |
| Ln | (x1, yn) | (x2, yn) | (x3, yn) | (x4, yn) | ... | (xn, yn) |

33

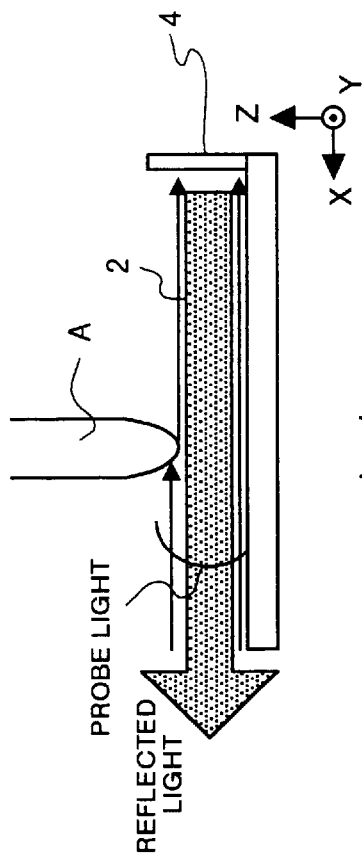
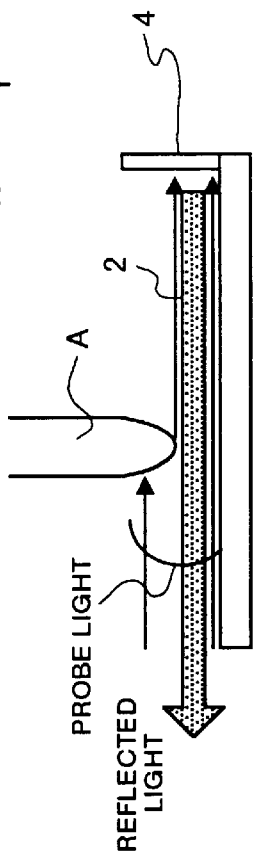
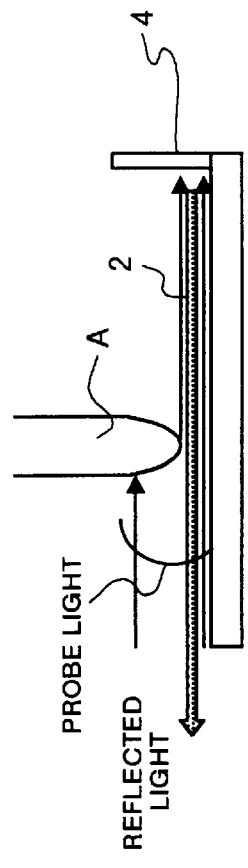
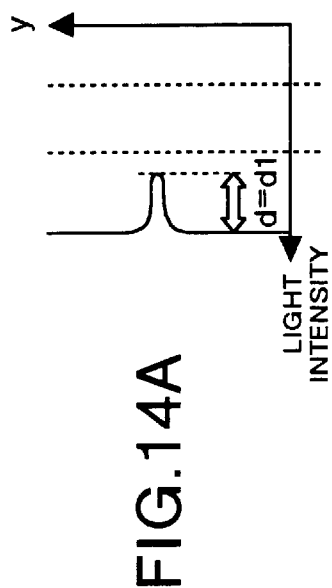
FIG.14A
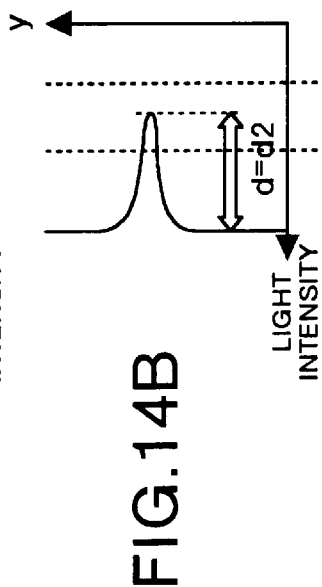
FIG.14B
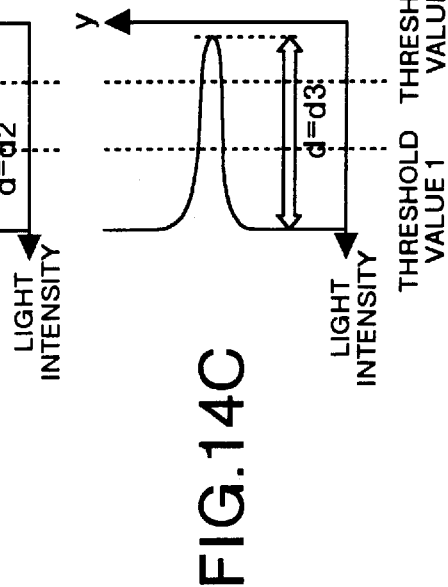
FIG.14C

FIG.16

| COORDINATE TIME DIFFERENTIATION ABSOLUTE VALUE | MINIMUM VALUE | | |
|---|---|---|---|
| | MINIMUM VALUE > THRESHOLD VALUE1 | THRESHOLD VALUE1 ≧ MINIMUM VALUE > THRESHOLD VALUE2 | THRESHOLD VALUE2 ≧ MINIMUM VALUE |
| DIFFERENCIATION VALUE > THRESHOLD VALUE | NOT-POINTING STATE | POINTING STATE | POINTING STATE |
| THRESHOLD VALUE ≧ DIFFERENCIATION VALUE | NOT-POINTING STATE | NOT-POINTING STATE | POINTING STATE |

FIG.17

| CURRENT STATE | | MINIMUM VALUE | | |
|---|---|---|---|---|
| | | MINIMUM VALUE > THRESHOLD VALUE1 | THRESHOLD VALUE1 ≧ MINIMUM VALUE > THRESHOLD VALUE2 | THRESHOLD VALUE2 ≧ MINIMUM VALUE |
| | NOT-POINTING STATE | NOT-POINTING STATE | NOT-POINTING STATE | POINTING STATE |
| | POINTING STATE | NOT-POINTING STATE | POINTING STATE | POINTING STATE |

COORDINATE POSITION INPUTTING/DETECTING DEVICE, A METHOD FOR INPUTTING/DETECTING THE COORDINATE POSITION, AND A DISPLAY BOARD SYSTEM

FIELD OF THE INVENTION

The present invention relates to a method and device for inputting/detecting the coordinate position and a display board system and more particularly, to a method and device for inputting/detecting the coordinate position with improved operability and reliability as well as a display board system which uses the coordinate-position inputting/detecting device.

BACKGROUND OF THE INVENTION

Conventionally there has been known a display board which can read freehand information written on a whiteboard or a write-in surface of a write-in sheet with some writing tool using a dedicated scanner and output the read information onto a recording paper with a dedicated printer. While, in recent years, there has also been suggested a display board system in which a coordinate-position inputting/detecting device is provided in a write-in surface of a display board for enabling inputting of freehand information written in the write-in surface in real time.

For instance, the Soft Board manufactured and provided by the Microfield Graphics, Inc. is a device having a coordinate-position inputting/detecting device provided on a whiteboard, and being capable of acquiring visual data such as characters and pictures drawn on the whiteboard into a computer in real time. With the display board system using this Soft Board, it is possible to input visual data captured with the Soft Board into a computer for displaying the data on a CRT thereof, to display the data on a large-sized screen using a liquid crystal projector, or to output the data with a printer onto a recording paper. It is also possible to project an image on a screen of a computer with the Soft Board connected thereto onto the Soft Board with a liquid crystal projector and operate the computer on the screen of the Soft Board.

There has also been disclosed a display board system having a display unit for displaying characters and images thereon, a coordinate-position inputting/detecting device with a coordinate-position input surface (a touch panel) provided on a front surface of the display unit, and a control unit for providing controls over display by the display unit according to input from the coordinate-position inputting/detecting device. This system forms a display surface and a write-in surface of the display board by making use of the display unit and the touch input device.

For instance, in a case of the Smart 2000 manufactured and supplied by the SMART Technologies Inc., in a state where an image of a character, a picture, or a graphics is projected with a liquid crystal projector connected to a computer onto a panel, freehand information is captured into the computer using a coordinate-position inputting/detecting device (write-in surface) provided on a front surface of the projection surface (display surface) of the panel. Then, the freehand information is synthesized with the image information in the computer, and the synthesized information can be displayed again with the liquid crystal projector in real time.

There has been disclosed a display board system in the U.S. patent application Ser. No. 9/299,052 (filing date Apr. 4, 1999), the contents of which are incorporated in the present invention by reference.

The a display board system can display an image inputted by the coordinate-position inputting/detecting device superimposed on an image on the screen displayed by the display unit as an overwrite image, so that the display board system has been used for conferences, presentation, or educational purposes and its effect in actual use has been highly evaluated. When a communicating function for transferring audio or video data is integrated with the display board system as described above, the display board system can also be used as an electronic conference system by connecting remote sites with a communication line.

By the way, as a coordinate-position inputting/detecting device used in the display board system as described above, devices described below are known according to a difference between input methods thereof. As a first case, there is a coordinate-position inputting/detecting device having a coordinate-position input surface with wires provided in a grid pattern in the X-Y direction and a dedicated pen for generating a magnetic field and used in a state where a current is passed through the wire. In this coordinate-position inputting/detecting device, when a user points to a desired position by making a dedicated pen contact or bringing the same closer to the coordinate-position input surface for some input operation, an electrical change is generated at the pointed position. The coordinate-position inputting/detecting device detects the coordinates of the position pointed by the dedicated pen according to electrical changes generated as described above on the coordinate-position input surface, and executes the processing of inputting the detected coordinates into a computer.

As a second case, there is a coordinate-position inputting/detecting device having a coordinate-position input surface with a resistive film such as conductive rubber. In this coordinate-position inputting/detecting device, when a user points to a desired position by making a pen contact the coordinate-position input surface for some input operation, a resistance value at the pointed position changes due to the pressure applied to the coordinate-position input surface by the pen. The coordinate-position inputting/detecting device detects the coordinates of the position pointed by the pen according to a change in the resistance values on the coordinate-position input surface, and executes the processing of inputting the detected coordinates into a computer.

Furthermore, as a third case, there is known an optical type of coordinate-position inputting/detecting device having at least two light emitting sections each for emitting a light beam through, for example, a rotating polygon mirror and scanning a coordinate-position input surface with the emitted light beam (Refer to Japanese Patent Laid-Open Publication No. SHO 57-211637). At least two light receiving sections are provided for receiving the light beam reflected with a dedicated pen having a reflecting member provided at the tip thereof inserted in a coordinate-position input surface. It should be noted that the coordinate-position input surface of the coordinate-position inputting/detecting device is not a physical surface like the coordinate-position input surface of the coordinate-position inputting/detecting device in the first and second cases, but is a surface formed with the light beams emitted from the light emitting sections. In this coordinate-position inputting/detecting device, when a user points a desired position on the coordinate-position input surface with the dedicated pen for some input operation, the light beams emitted from the light emitting sections are reflected by the reflecting member of the dedicated pen. The coordinate-position inputting/detecting device receives the reflected light beams, detects the coordinates of the position pointed by the user using the principle of triangulation, and executes the processing of inputting the detected coordinates into a computer.

Of those coordinate-position inputting/detecting devices described above, the optical type of coordinate-position inputting/detecting device described as the third case seems a promising device to us after consideration on an appropriate system to be applied in the a display board system. More specifically, the coordinate-position inputting/detecting device according to the first case has a problem associated with operability in a display board system requiring a large type of coordinate-position inputting/detecting device because a dedicated pen which generates a magnetic field and a main body of the device are connected to each other through a cable. The coordinate-position inputting/detecting devices in the first and second cases have problem that transparency of the coordinate-position input surface is reduced because wire or a resistive film has to be provided on the coordinate-position input surface. Accordingly, when any of the coordinate-position inputting/detecting devices is attached to the front surface of a display unit, for instance, there occurs inconvenience that the information appearing on the display unit is difficult to be seen. Furthermore, the coordinate-position inputting/detecting devices in the first and second cases have difficulty in upsizing and require high manufacturing cost, which is not suitable to be applied to such a system like the display board system that needs a large-sized screen display.

On the other hand, the optical type of coordinate-position inputting/detecting device as the third case is a system in which the coordinates of a position on the coordinate-position input surface pointed by the user are detected by scanning the coordinate-position input surface with light beams and receiving the light beams reflected by the dedicated pen. Hence, the device in the third case does not create any problem even when the device is mounted on the surface of the display unit and used, and upsizing thereof is also comparatively easier. Accordingly, the coordinate-position inputting/detecting device in the third case is thought preferable as a coordinate-position inputting/detecting device used for display board system. In addition, the coordinate-position inputting/detecting device in the third case excellent in operability and viewability of a display unit is also thought preferable to be used even when the device is mounted on the display unit of an ordinary-sized computer taking into consideration the problems in the coordinate-position inputting/detecting devices in the first and second cases.

It should be noted that a coordinate-position inputting/detecting device related to the optical type of coordinate-position inputting/detecting device having described as the third case is disclosed in Japanese Patent Laid-Open Publication No. HEI 9-91094 and Japanese Patent Laid-Open Publication No. HEI 9-319501.

With the coordinate-position inputting/detecting device in the third case, however, as a dedicated pen with a reflecting member provided at the tip thereof is required, input operation with, for example, a fingertip, is not allowed, which is inconvenient. In addition, when the dedicated pen is lost or damaged, the input operation can not be carried out. Though it can be considered that only a reflecting member is formed as a discrete device and used by mounting on a user's finger or a pen, a mechanism for mounting is complicated or there occurs the need to prepare various types of mounting mechanism because of variations in a form and a size of pens to be used and of variations in a size and a length of user's finger. Furthermore, even if the same reflecting member is used, the reflecting characteristic varies according to the difference in their sizes and forms, hence, stable detection of a coordinate position can not be carried out.

The coordinate-position inputting/detecting device in the third case uses a mechanical system such as a rotating polygon mirror and a motor for rotating the rotating polygon mirror for scanning the coordinate-position input surface with light beams. Therefore, there is a problem that vibrations in the device occur due to the mechanical system, which causes reduction of reliability of detecting a position or occurrence of noise therein.

SUMMARY OF THE INVENTION

It is an object of the present invention to improve, for the purpose of solving the problems described above, operability and usability of a method and device for inputting/detecting the coordinate position by enabling specification of coordinates of a position in an entry area pointed thereto with an arbitrary pointing body such as a fingertip or an ordinary pen without using a particular pointing device.

It is another object of the present invention to enhance reliability of a device for inputting/detecting the coordinate position by preventing occurrence of vibrations therein.

It is another object of the present invention to improve workability and adaptability to handling of a display board system by using the coordinate-position inputting/detecting device with excellent operability and high reliability.

In the present invention, at least two light emitting units are provided that emit a light beam travelling along an entry area, at least two intensity-distribution detecting units are provided that receive a light beam reflected by a reflecting unit and detects distribution of the intensity of the received light, and a coordinate-value identifying unit is provided in order to identity the coordinates of a blocked position where the light beam travelling along the entry area is blocked by using each distribution of intensity detected by the intensity-distribution detecting units. Accordingly, with the present invention, a user can perform a desired input operation only by blocking a portion of the light travelling along the entry area with an arbitrary pointing body such as a user's finger or a pen.

In the present invention, each of at least two light emitting units emit a light beam toward an inner side of a frame to form an entry area in the inner side thereof, each of at least two intensity-distribution detecting units receive a light beam reflected by a reflecting member provided in a specified location of the frame and detect distribution of the intensity of the received light. Further, a coordinate-value identifying unit identifies a blocked position using the detected distribution of intensity. Accordingly, with the present invention, a user can perform a desired input operation only by blocking a portion of the light within the entry area with an arbitrary pointing body such as a user's finger or a pen.

In the present invention, the light emitting unit forms light from a light source into a fan shape and emits the fan-shaped light beams so that the emitted light beams cover the entry area or a substantially entire area of the inner side of the frame.

In the present invention, one unit of light source may be provided for all the light emitting units or one unit of light source may be provided for each of the light emitting units.

In the present invention, a light converging system converges light from the light source to form fan shape light beams, so that a light that can cover most of the area of the inner side of the frame can be emitted. Accordingly, with the present invention, the need for preparing a mechanical system such as a rotating polygon mirror used for scanning an entry area with a light beam can be eliminated.

In the present invention, a light converging lens converges the light reflected by the reflecting unit, and a light-receiving element receives the light converged by the light converging lens and outputs an electric signal according to the distribution of intensity of the received light. More specifically, the light reflected by the reflecting unit is converged by the light converging lens at a different incident angle with respect to the light-receiving element, so that the light-receiving element can easily detect the distribution of intensity of the light.

In the present invention, the light reflected by the reflecting unit is led to the light-receiving element through a slit, and the light-receiving element receives the light converged by a light converging lens and outputs an electric signal according to the distribution of intensity of the received light, with which the distribution of intensity of the light can be detected. More specifically, the light reflected by the reflecting unit is converged by the slit at a different incident angle with respect to the light-receiving element, so that the light-receiving element can easily detect the distribution of intensity of the light.

In the present invention, dark points generated on the light-receiving elements due blocking of the light beam in an entry area are detected according to the electric signals outputted from the light-receiving elements, and coordinates of the light-blocked position are computed using the detected dark points in order to identify the coordinates of the light-blocked position. Herein, coordinates of the light-blocked position can be identified using, for example, the principle of triangulation.

In the present invention, dark points generated on the light-receiving elements due blocking of the light beam in the entry area are detected according to the electric signals outputted from the light-receiving elements, coordinate information obtained by previously correlating the coordinates within the entry area to each combination of two detected dark points is referred to, and the coordinate values corresponding to the combination of the detected dark points are selected as coordinate values of the light-blocked position in order to identify the coordinates of the light-blocked position.

In the present invention, a light emitting unit, a reflecting unit, and an intensity-distribution detecting unit are integrated with the frame, which enables easy attachment of the coordinate-position inputting/detecting device, for example, to a display unit.

In the present invention, a minimum-value identifying unit identifies minimum values of the distribution of intensity detected by each intensity-distribution detecting unit respectively, a computing unit computes a time differentiation of identified coordinates. A determining unit determines contents of an input operation performed by a user in the entry area from the previously prepared condition and at least one of the minimum values, coordinate values, and time-differentiated values.

In the present invention, an intensity-value identifying unit identifies the light intensity values of the dark points detected by a dark point detecting unit according to electric signals outputted from each of the light-receiving elements. A second computing unit computes the time differentiation of the coordinates obtained by the first computing unit. A determining unit determines contents of an input operation performed by a user in the entry area from the previously prepared condition and at least one of the light intensity values, coordinate values, and time-differentiated values.

In the present invention, an intensity-value identifying unit identifies the light intensity values of the dark points detected by a dark point detecting unit according to electric signals outputted from each of the light-receiving elements. A first computing unit computes the time differentiation of the coordinates selected by the selecting unit. A determining unit determines the contents of an input operation performed by a user in the entry area from to the previously prepared condition and at least one of the light intensity values, coordinate values, and time-differentiated values.

In the present invention, by using a result of previous determination concerning the contents of an operation as one of the conditions for determining the contents of the next operation, the contents of continuous input operation by a user can accurately be determined.

In the present invention, by forming an entry area that matches with the size of a display surface of a display unit, the display surface can effectively be used. As the entry area is formed with light, viewability of the display unit is not reduced.

In the present invention, by forming an entry area that matches with the size of a write-in surface for writing freehand characters and graphics, the write-in surface can effectively be used. As the entry area is formed with light, the write-in surface can be made use of as it is.

In the present invention, the coordinate-position inputting/detecting device is provided in the front surface of a display unit for displaying characters and images, and a display surface and a write-in surface of a display board are formed with the display unit and coordinate-position inputting/detecting device, so that viewability of the display unit and operability of the system can be improved.

In the present invention, the coordinate-position inputting/detecting device is provided in the front surface of a display unit for displaying thereon characters and images. As a result, a display surface and a write-in surface of the display board are formed with the display unit and coordinate-position inputting/detecting device, so that viewability of the display unit and operability of the system can be improved. Furthermore, the display board system comprises a frame unit having a holding section for holding a display surface and a write-in surface of the display board at a specified height, a printer accommodating section for accommodating the printer therein, and a control unit accommodating section for accommodating the control unit therein. The control unit accommodating section, printer accommodating section, and holding section are arranged in the vertical direction in this order from the bottom. As a result, transport and installation of the system can easily be carried out.

In the present invention, by using a plasma display as a display unit, optimizations of the display board system can be performed. Namely, use of the plasma display allows the thickness of a display unit to be reduced, and also has high brightness as well as a wide viewing angle, and can reproduce moving pictures smoothly, so that the plasma display is preferable as a display unit of the display board system.

In the present invention, a keyboard placement section for placing a keyboard connected to a personal computer is provided at a position in the upper side of the printer accommodating section and in the lower side of the holding section. Therefore, handling capability of the system is improved.

In the present invention, an angle adjusting unit for adjusting an angle of a display surface and a write-in surface of the display board is provided in a holding section. Therefore, disturbance light coming into the display unit (display surface), especially, light from lighting equipment such as a fluorescent tube on the ceiling can be prevented.

In the present invention, a plurality of connecting terminals for connecting various types of information equipment and AV equipment such as a digital camera, a DVD player, and video equipment are provided in a display unit and is usable as a large-sized screen monitor. Therefore, the display board system can be used in any occasions.

Other objects and features of this invention will become understood from the following description with reference to the accompanying drawings.

BRIEF DESCRIPTION OF THE DRAWINGS

FIGS. 9A and 9B show general configuration of a light converging system shown in FIG. 8;

FIG. 12 explains a memory table stored in a ROM constituting the controller shown in FIG. 10;

FIG. 14A to FIG. 14C are explanatory views, in the coordinate-position inputting/detecting device according to Embodiment 3 of the present invention, each showing a relation between a position of a pointing body in the Z-axial direction and probe light blocked by the pointing body when an arbitrary position in a coordinate-position entry area is pointed with the pointing body, and also showing information for distribution of intensity obtained by the position of the pointing body in the Z-axial direction and a light-receiving element;

FIG. 16 shows a state table used for deciding the state of a pointing body by the controller of the coordinate-position inputting/detecting device according to Embodiment 3 of the present invention;

FIG. 17 shows another example of the state table used for deciding the state of a pointing body by the controller of the coordinate-position inputting/detecting device according to Embodiment 3 of the present invention;

DESCRIPTION OF THE PREFERRED EMBODIMENTS

Detailed description is made hereinafter for embodiments of the a method and device for inputting/detecting the coordinate position according to the present invention and a display board system using the same with reference to the attached drawings.

Figure 1:
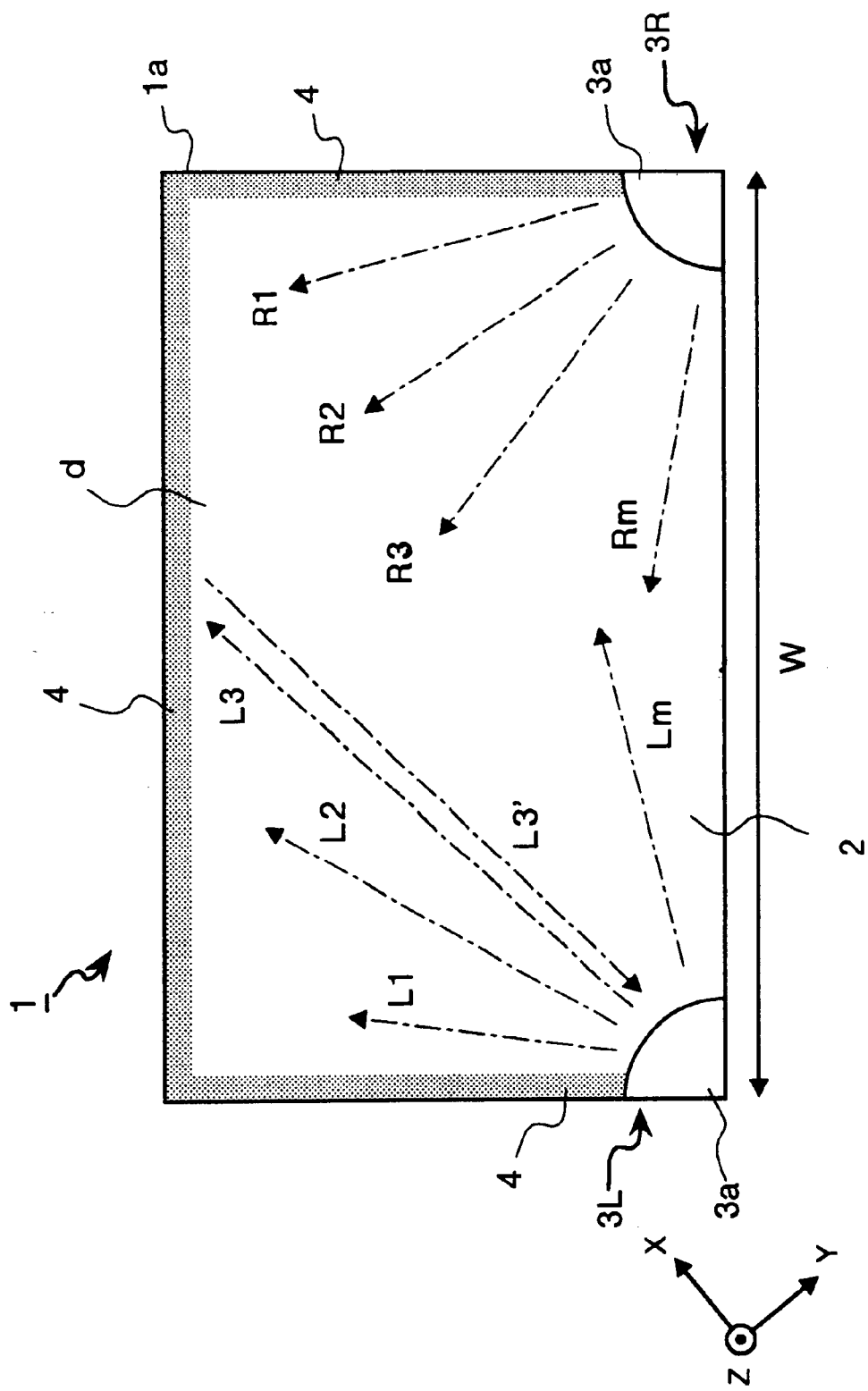
FIG. 1 is a front view showing general configuration of a coordinate-position inputting/detecting device according to Embodiment 1 of the present invention.

FIG. 1 is a front view showing general configuration of a coordinate-position inputting/detecting device according to Embodiment 1 of the present invention. The coordinate-position inputting/detecting device 1 according to Embodiment 1 is connected to a computer such as a personal computer and a work station. The coordinate-position inputting/detecting device is utilized by attaching it to the front surface of the display of the computer. In the figure, the reference numeral d indicates a display of the computer. As shown in FIG. 1, the coordinate-position inputting/detecting device 1 comprises a frame 1a for defining an entry area 2 for inputting coordinate values such that freehand characters and graphics are inputted corresponding to a size of the display d. Light emitting/receiving devices 3L and 3R provided at both edge sections in the lower side of the frame 1a. The light emitting/receiving devices 3L and 3R emit fan-shaped light so as to cover the whole area of the entry area 2 and also receive the light reflected by a recursively reflecting member 4 provided in the peripheral section of the frame 1a excluding the lower side thereof. A controller (Refer to FIG. 4 and FIG. 5) not shown herein for executing the processing of identifying a position, when light in the entry area 2 is blocked, according to the light received by the light receiving/emitting devices 3L and 3R. Although it is assumed herein that fan-shaped light is emitted from the light receiving/emitting devices 3L and 3R, any light may be allowed other than the fan-shape on condition that the light covers the whole entry area 2.

The light receiving/emitting devices 3L and 3R shown in FIG. 1 provided inside the covers 3a are located in a frame 1a. The light receiving/emitting devices 3L and 3R are separated by a distance W. The description below assumes a case where the fan-shaped light emitted from the light receiving/emitting device 3L comprises a flux of light beams L1, L2, L3, . . . , Lm for convenience in description. Similarly, the fan-shaped light emitted from the light receiving/emitting device 3R comprises a flux of light beams R1, R2, R3, . . . , Rm. The light beams L1, L2, L3, . . . , Lm and R1, R2, R3, . . . , Rm will be referred to as a probe beam hereinafter. As described above, it is also assumed that the light receiving/emitting devices 3L and 3R emit the fan-shaped lights each comprising a flux of these probe beams in parallel with the surface of the display d.

A recursive reflecting member 4 is provided in an inner side of the frame 1a along a peripheral section excluding the lower side thereof. This recursive reflecting member 4 is formed with, for example, a large number of conical corner cubes which reflect an incident probe beam towards the same light path. For instance, probe beam L3 emitted from the light receiving/emitting device 3L is reflected by the recursive reflecting member 4 and then becomes a recursively reflected beam L3' which returns back to the light receiving/emitting device 3L provided in the left side along the same light path again.

Figure 2:
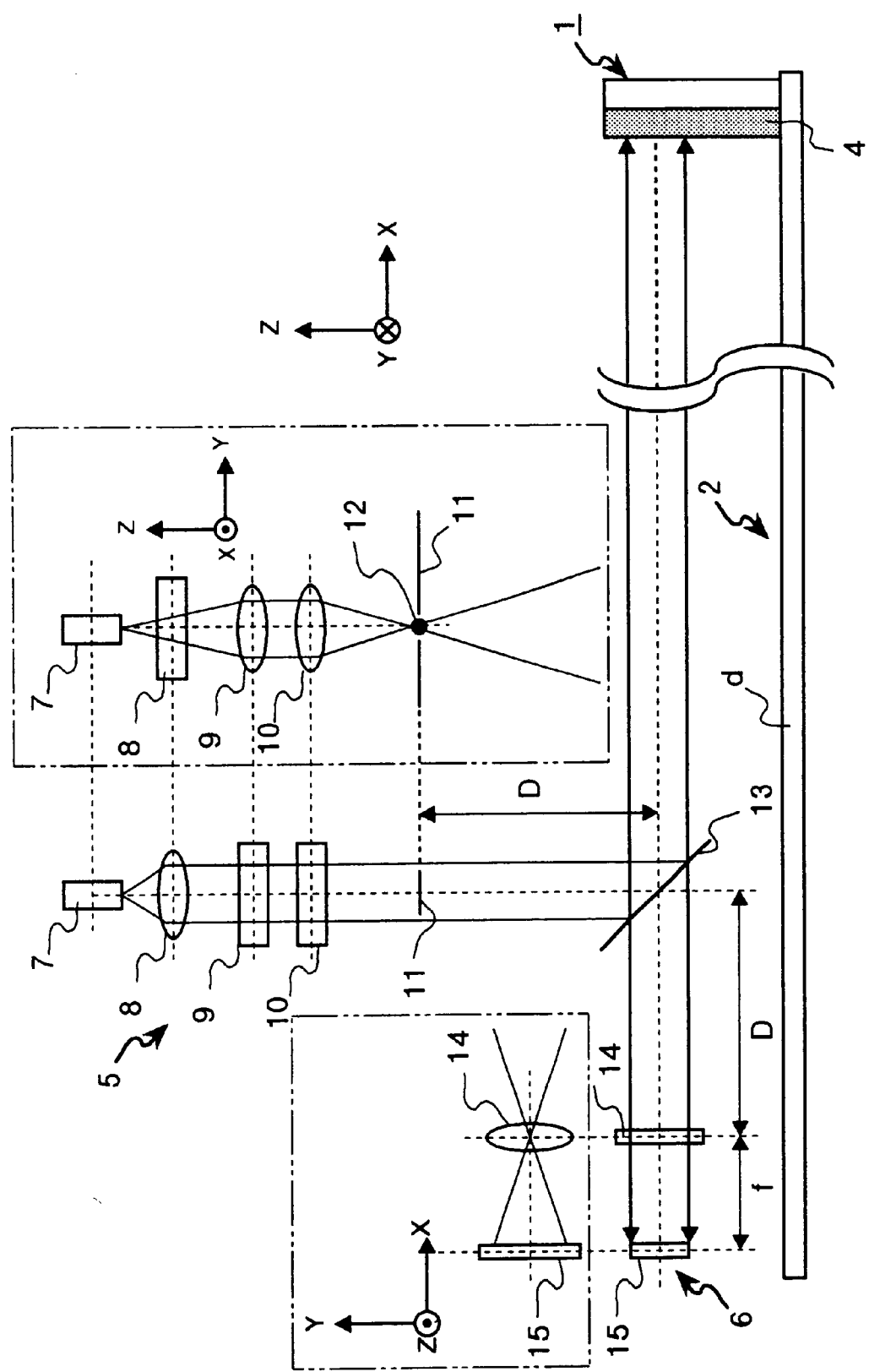
FIG. 2 shows general configuration of a light receiving/emitting device shown in FIG. 1.

Specific configuration of the light receiving/emitting devices 3L and 3R will be described below. FIG. 2 shows detail configuration of one of light receiving/emitting devices 3L and 3R. Although FIG. 2 shows the light receiving/emitting devices 3L and 3R mainly from the X-Z direction, a section indicated by a phantom line in the figure is a view of the same component device viewed from the different direction (X-Y direction or Y-Z direction).

As shown in FIG. 2, each of the light receiving/emitting device 3L and 3R has a light-receiving section 5 and a light-receiving section 6. The light receiving section 5 has a light source 7 such as an laser diode or a light emitting diode capable of focusing a spot up to a certain degree. The light beam vertically emitted from the light source 7 to the display d is collimated in the X-direction by a cylindrical lens 8, which can change a magnification only in one direction. Light collimated in the X-direction by the cylindrical lens 8 is converged to the Y-direction by two cylindrical lenses 9 and 10 whose distribution of the curvature is orthogonal to that of the cylindrical lens 8. Light passing through the cylindrical lens group (cylindrical lenses 8, 9 and 10) enter a slit which is narrow in the Y-direction and slim and long in the X-direction provided on a slit plate 11. This slit forms a secondary light source 12. Light emitted from the secondary light source 12 is reflected by a half mirror 13, formed in fan-shape light with the secondary light source 12 at the center in parallel with the surface of the display d and the beams travel along the entry area 2. In other words, the fan-shaped light form the entry area 2. It should be noted that the cylindrical lens group (cylindrical lenses 8, 9 and 10) and the slit plate 11 forms a light converging system utilized for forming a fan-shaped light.

The fan-shaped light travelling along the entry area 2 is recursively reflected by the recursive reflecting member 4 and return to the half mirror 13 along the same light path again. The recursively reflected light returned to the half mirror 13 pass through the half mirror 13 to enter the light receiving section 6. The recursively reflected light entering the light receiving section 6 pass through a cylindrical lens 14 as a light converging lens to be made linear, and then received in the light receiving element 15 provided at a distance of f (f: a focal distance of the cylindrical lens 14) from the cylindrical lens 14 at a different location thereof for each probe beam.

The light receiving element 15 generates an electric signal according to the distribution of light intensity of the recursively reflected light beam (probe beam), and inputs the signal to a controller 16 described later (Refer to FIG. 4 and FIG. 5). It should be noted that the optical system is configured as shown in FIG. 2 so that a distance D between the secondary light source 12 and half mirror 13 is the same as a distance between the cylindrical lens 14 and the half mirror 13. In this configuration, the recursively reflected light reflected by the recursive reflecting member 4 is not affected by the cylindrical lens 14 in the Z-axial direction and reaches the light receiving element 15 with the light kept collimated. The recursively reflected light propagate so as to be converged to the center of the cylindrical lens 14 in a parallel direction with the display surface, and as a result, the light is affected by the cylindrical lens 14 to form an image on the light receiving element 15 provided on the surface of focus of the cylindrical lens 14. Thus, distribution of the light intensity is formed on the light receiving element 15 according to presence or absence of the recursively reflected light. Namely, when the recursively reflected light is blocked by a pointing body such as a user's finger or a pen, a point where light intensity is low (a peak point described later) appears at the position corresponding to the blocked recursively reflected light on the light receiving element 15.

Figure 3:
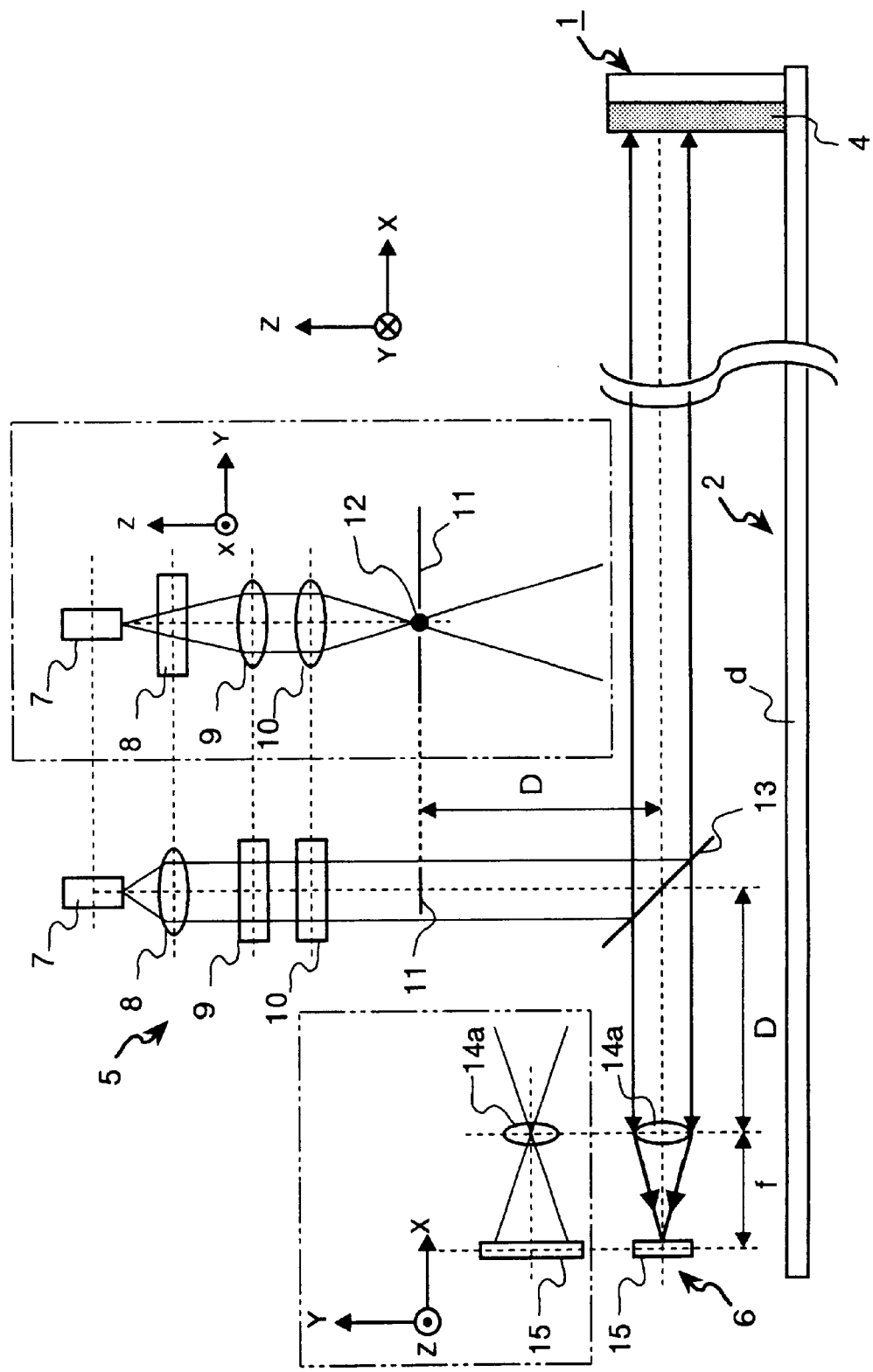
FIG. 3 shows another general configuration of the light receiving/emitting device shown in FIG. 1.

Instead of the cylindrical lens 14 shown in FIG. 2, an ordinary lens having the same curvature on concentric circles may be used. FIG. 3 shows an example of the configuration in this case. In this configuration, the recursively reflected light reflected by the recursive reflecting member 4 is converged in a collimated state by a light converging lens 14a, and the converged light reaches the light receiving element 15. The recursively reflected light propagate so as to be converged at the center of the cylindrical lens 14 in a direction parallel to the direction of the display surface, and as a result, the light is affected by the light converging lens 14a to form an image on the light receiving element 15 provided on the surface of focus of the light converging lens 14a. Thus, distribution of the light intensity in a slim and linear form in parallel to the Y axis is formed on the light receiving element 15 according to presence or absence of the recursively reflected light. Namely, when the recursively reflected light is blocked by a pointing body such as a user's finger or a pen, a point where light intensity is low (a peak point described later) appears at the position corresponding to the blocked recursively reflected light beam on the light receiving element 15.

Figure 4:
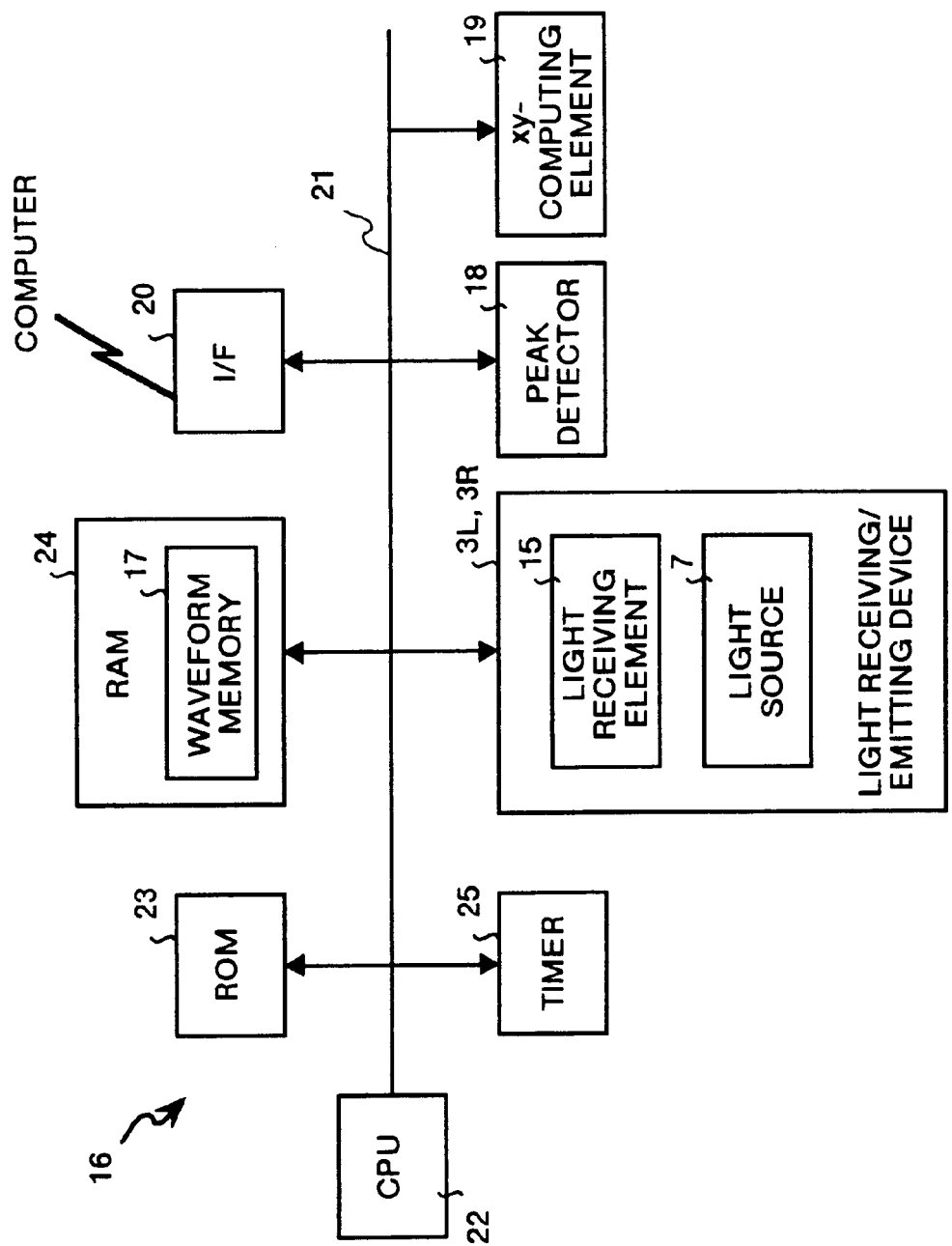
FIG. 4 is a block diagram of a controller of the coordinate-position inputting/detecting device according to Embodiment 1 of the present invention.
Figure 5:
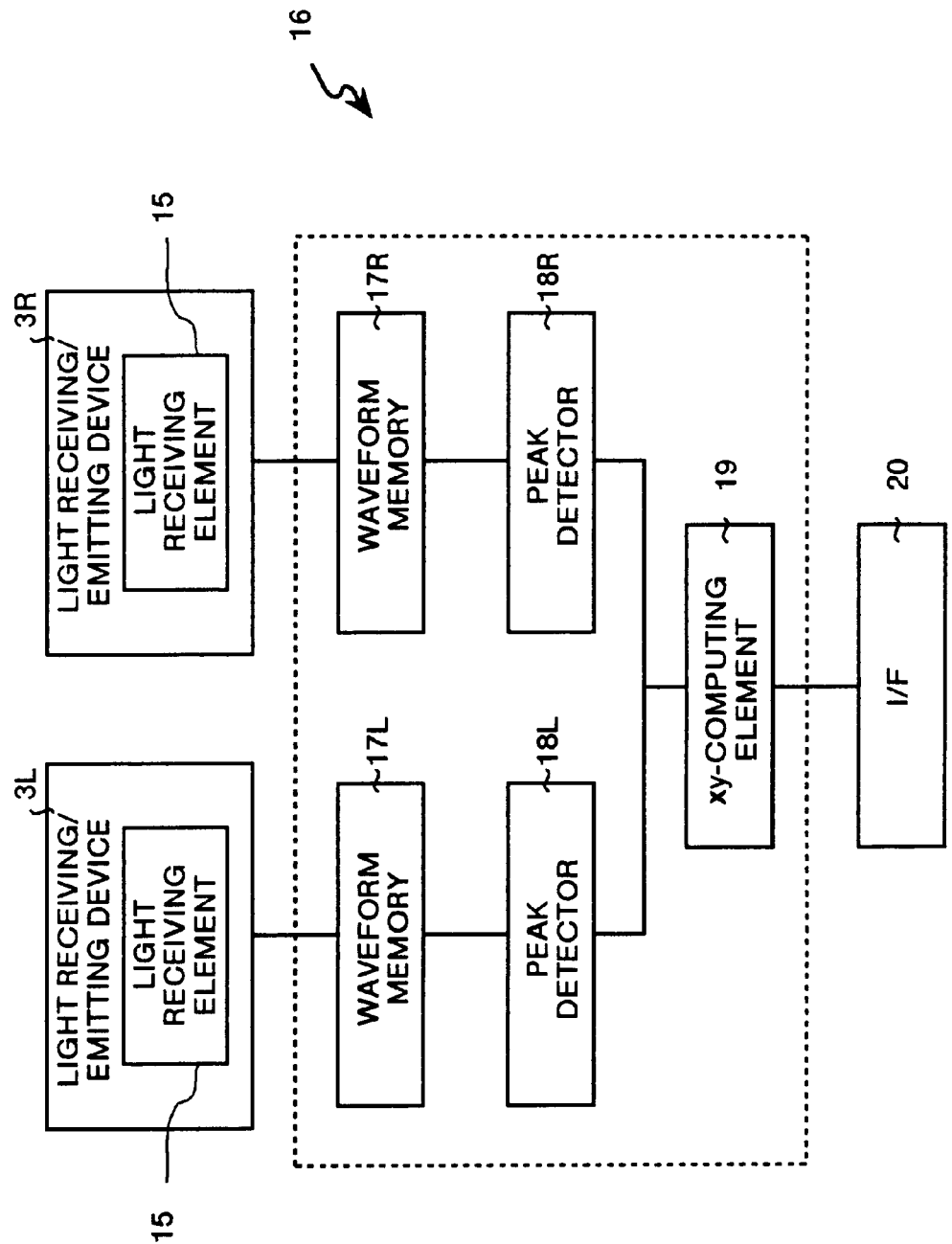
FIG. 5 explains the processing executed by the controller shown in FIG. 4.

FIG. 4 is a block diagram of a controller. The controller 16 receives an electric signal according to the distribution of light intensity of recursively reflected light from the light receiving element 15 and executes the processing of identifying the coordinates of a position where the light travelling along the entry area 2 is blocked. In FIG. 4, blocks excluding the light receiving/emitting devices 3L and 3R constitute the controller 16. The controller 16 shown in FIG. 4 comprises a CPU 22 for providing centralized controls over the blocks, a ROM 23 for storing therein fixed data such as a control program, a RAM 24 for storing therein variable data, a timer 25 for controlling time intervals of light emission from the light sources 7 provided in the light receiving/emitting devices 3L and 3R, a peak detector 18, an xy-computing element 19, an interface (I/F) 20 for connecting the controller 16 to the computer, and a bus 21 for connecting the blocks to each other. It should be noted that a waveform memory 17 is provided in the RAM 24 using a function of rewritably storing therein variable data.

The processing executed in the controller 16 will be described below. FIG. 5 explains the processing executed by the controller shown in FIG. 4. Waveform data which represents the distribution of intensity of the light outputted from the light receiving element 15 as an electric signal is stored in waveform memories 17L and 17R of the RAM 24. The peak detectors 18L and 18R execute the processing of detecting a position of a peak point in the waveform data stored in the waveform memories 17L and 17R.

Figure 6:
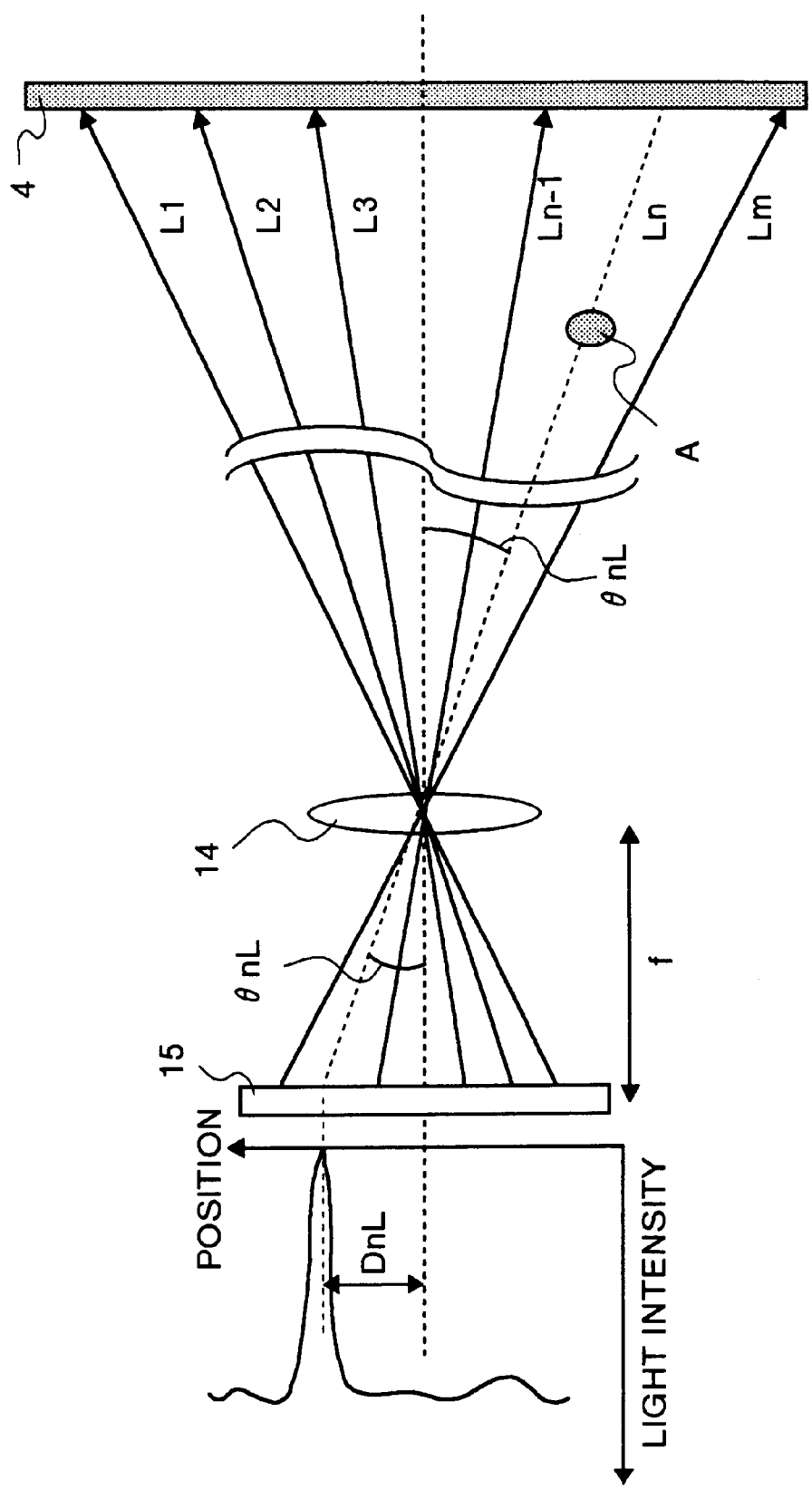
FIG. 6 explains a peak point detected through the processing executed by the controller shown in FIG. 4.

FIG. 6 shows a peak point. For example, of the fan-shaped light comprising a flux of probe beams L1, L2, L3, ..., Ln-1, Ln, Ln+1, ..., Lm, when the n-th probe beam Ln is blocked by a pointing body A such as a user's finger or a pen, the probe beam Ln does not reach the recursive reflecting member 4. Accordingly, as the probe beam Ln is not received by the light receiving element 15 of the light receiving/emitting device 3L, so that the position separated by distance DnL from the center of the light receiving element 15 corresponding to the probe beam Ln becomes an area (a dark point) where light intensity is low. As a result, a peak point appears in the waveform for intensity of the light outputted from the light receiving element 15. Each of the peak detectors 18L and 18R detects a position Dn ((DnL on the light receiving element 15 of the light receiving/emitting device 3L, DnR on the light receiving element 15 of the light receiving/emitting device 3R) of a dark point representing a peak point in the waveform of the light intensity respectively. A method of operating waveform processing such as smoothing differentiation may be utilized in order determine the dark point.

When a peak point is detected from waveform data by the peak detectors 18L and 18R, the xy-computing element 19 computes the coordinates (x, y) of a position of the pointing body A which causes the peak point to appear on the waveform data.

Then, description is made more specifically for the processing of computing the coordinates (x, y) of the pointing body A performed in the xy-computing element 19. As shown in FIG. 6, an outgoing/incident angle θnL of a probe beam from the light receiving/emitting device 3L (θnR for a probe beam from the light receiving/emitting device 3R) blocked by the pointing body A can be computed using the two equations described below.

$$\theta nL = \arctan(DnL/f) \quad (1)$$

$$\theta nR = \arctan(DnR/f) \quad (2)$$

Where DnL is a position of a dark point on the light receiving element 15 for the light receiving/emitting device 3L detected by the peak detector 18L, DnR is a position of a dark point on the light receiving element 15 for the light receiving/emitting device 3R detected by the peak detector 18R, and f is a distance between the cylindrical lens 14 (FIG. 2) or the light converging lens 14a (FIG. 3) and the light receiving element 15, which corresponds to a focal lengths of the lenses.

An angle θL (Refer to FIG. 7) between the pointing body A and light receiving/emitting device 3L can also be computed from the equation described below using the value of θnL obtained in Equation (1).

$$\theta L = g(\theta nL) \quad (3)$$

Where g is a conversion factor corresponding to a geometrical and relative position between the pointing body A and the light receiving/emitting device 3L.

Further, an angle θR (Refer to FIG. 7) between the pointing body A and light receiving/emitting device 3R can also be computed from the equation described below using the value of θnR obtained in Equation (2).

$$\theta R = h(\theta nR) \quad (4)$$

Where h is a conversion factor corresponding to a geometrical and relative position between the pointing body A and the light receiving/emitting device 3R.

Figure 7:
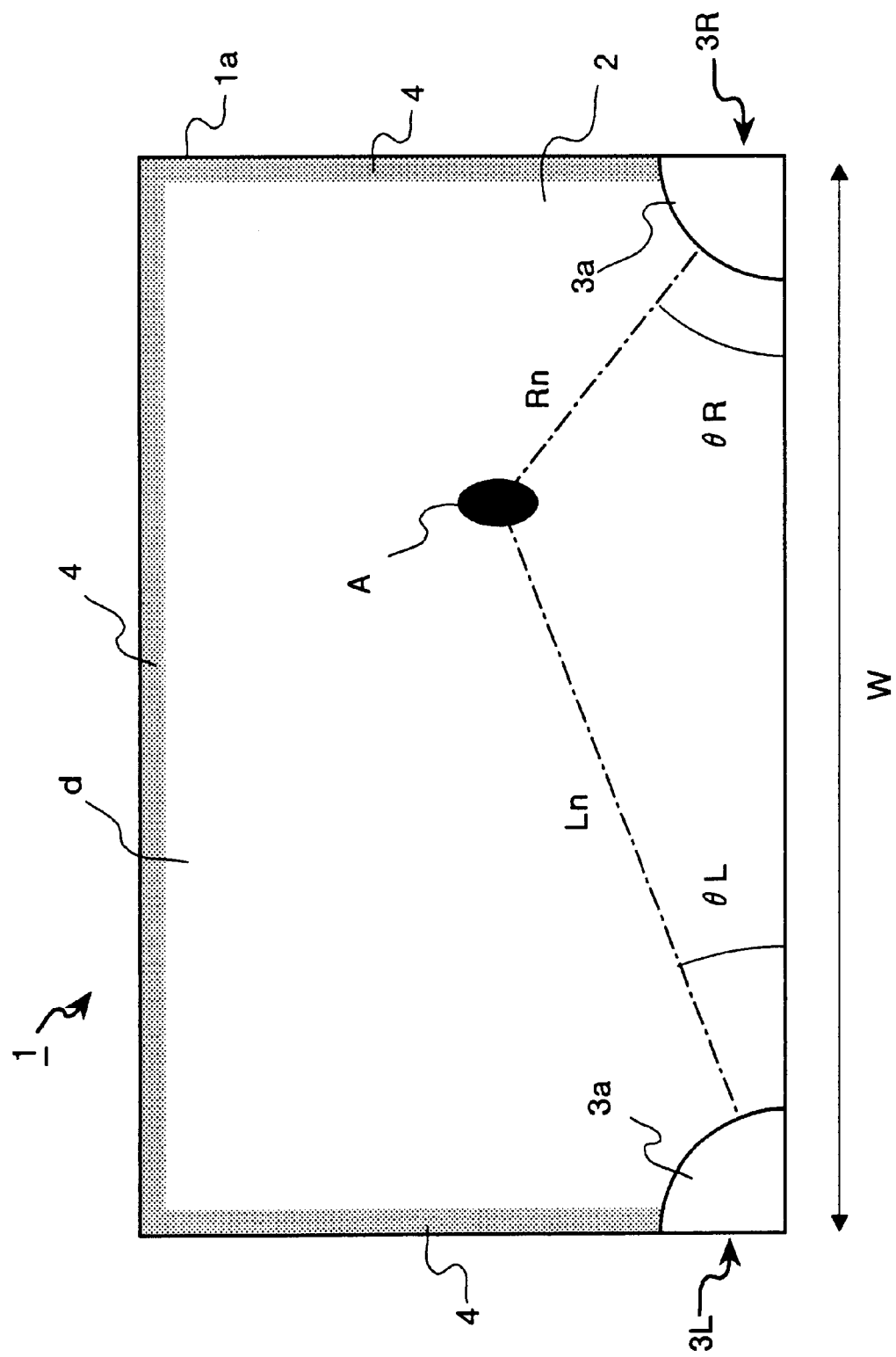
FIG. 7 explains the operation of the coordinate-position inputting/detecting device as a whole according to Embodiment 1 of the present invention.

On the other hand, coordinates (x, y) of the position of the pointing body A is computed using the two equation described below based on the principle of triangulation.

$$x = W \tan \theta R / (\tan \theta L + \tan \theta R) \quad (5)$$

$$y = W \tan \theta L \cdot \tan \theta R / (\tan \theta L + \tan \theta R) \quad (6)$$

Where W is a distance between the light receiving/emitting devices 3L and 3R (Refer to FIG. 1 and FIG. 7).

The coordinates (x, y) of the position of the pointing body A are computed as a function of DnL and DnR using the equations (1), (2), (3), (4), (5) and (6). Namely, by detecting the position DnL of a dark point on the light receiving element 15 for the light receiving/emitting device 3L as well as the position DnR of a dark point on the light receiving element 15 for the light receiving/emitting device 3R, the coordinates (x, y) of the position of the pointing body A can be detected. It should be noted that the equations (1), (2), (3), (4), (5) and (6) can previously be stored in the ROM 23 as a portion of the control program.

The controller 16 inputs the coordinates (x, y) of the position of the pointing body A obtained by the processing as described above into the computer through the I/F 20.

Specific description is made for an operation of the coordinate-position inputting/detecting device 1 as a whole having the configuration described above with reference to FIG. 7. At first, it is assumed, as shown in FIG. 7, that the user points to a certain position (x, y) on the display d by a pointing body A such as a user's finger or a pen through the entry area 2 of the coordinate-position inputting/detecting device 1. As a result, the probe beams Ln and Rn emitted from the light receiving/emitting devices 3L and 3R respectively are blocked by the pointing body A. The probe beams Ln and Rn blocked by the pointing body A do not reach the recursive reflecting member 4, and recursively reflected light beams of the probe beams Ln and Rn are not received by the light receiving elements 15 of the light receiving/emitting devices 3L and 3R. This causes an area with low light intensity (dark point) to appear at each specified position (DnL, DnR) on the light receiving elements 15 respectively (Refer to FIG. 6). The waveform data according to the intensity of the light outputted from the light receiving elements 15 is stored in the waveform memories 17L and 17R.

The peak detectors 18L and 18R detect dark points (DnL, DnR) on the light receiving elements 15 as a peak point in the waveform data according to the waveform data stored in the waveform memories 17L and 17R. The xy-computing element 19 computes coordinates (x, y) of the position pointed thereto by the pointing body A according to the dark points (DnL, DnR) on the light receiving elements 15 detected by the peak detectors 18L and 18R. The coordinates (x, y) obtained as described above are inputted into the computer through the I/F 20, in which the processing according to an instruction by the user with the pointing body A is executed.

As described above, with the coordinate-position inputting/detecting device 1 according to Embodiment 1, a desired input operation can be performed only by blocking a portion of light beams within the entry area with an arbitrary pointing body A such as a user's finger or a pen, so that the need for using a special pen with a reflecting member provided thereon can be eliminated.

The light emitting unit 5 forms a fan-shaped light from the light emitted from the light source 7 and emits the fan-shaped light into the inner side of the frame 1a, so that no vibrations occur in the device, which allows coordinates of a position pointed thereto by a pointing body A to be detected with high precision.

Figure 8:
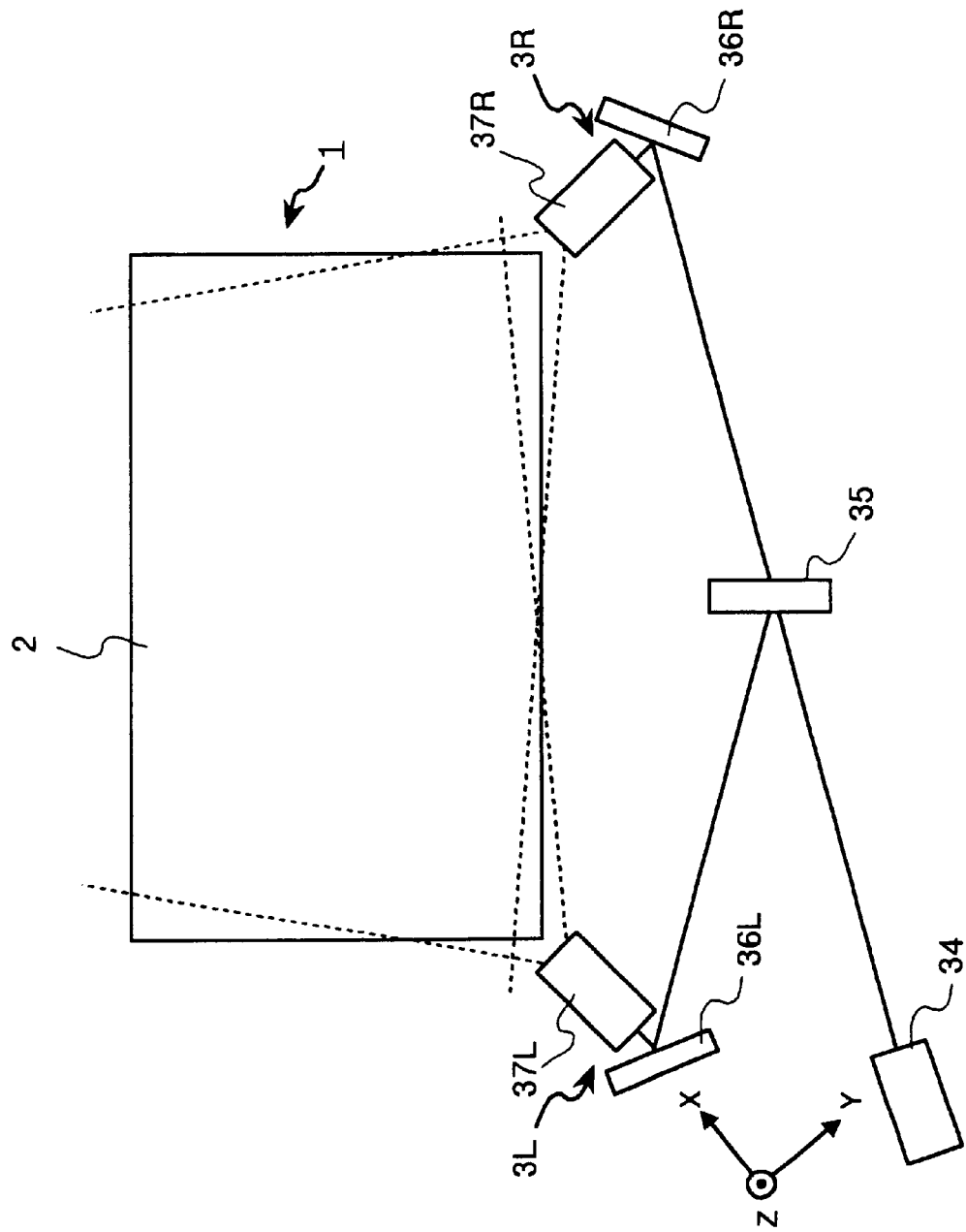
FIG. 8 shows a modification in the configuration of the coordinate-position inputting/detecting device according to Embodiment 1 of the present invention.

It should be noted that two light sources 7 are provided in the light receiving/emitting devices 3L and 3R respectively as shown in FIG. 2, but, for instance, only one light source may be provided. FIG. 8 shows a configuration of the coordinate-position inputting/detecting device 1 when only one light source is provided therein. As shown in FIG. 8, the light emitted from the light source 34 is divided into the direction of the light receiving/emitting device 3L and the direction of the light receiving/emitting device 3R by the half mirror 35. In the side of light receiving/emitting device 3L, the light from the light source 34 is reflected by the half mirror 36 to enter a light converging system 37L. As a result, the fan-shaped light beams are emitted from the light converging system 37L to the inner side of the frame section 1a. While in the side of light receiving/emitting device 3R, similarly to the side of light receiving/emitting device 3L, the fan-shaped light beams are also emitted through the half mirror 36R and light converging system 37R thereto. FIGS. 9A and 9B show two general configurations of light converging systems 37L and 37R.

Although the light receiving section 6 uses a cylindrical lens 14 to converge each probe beam reflected by the recursive reflecting member 4, a slit for leading each probe beam in a linear form onto the light receiving element 15 may be used instead of the cylindrical lens 14.

Although two light receiving/emitting devices 3L and 3R are provided in the coordinate-position inputting/detecting device 1, three or more of light receiving/emitting devices may be provided therein. In addition, FIG. 1 shows that the light receiving/emitting devices 3L and 3R are provided in the lower side of the frame 1a, but the light receiving/emitting devices 3L and 3R may be provided, for example, in the upper side of the frame 1a. Further, design of the mounting positions of those component devices can be modified as necessary.

Although the case where the coordinate-position inputting/detecting device 1 is attached in front of the display of a computer has been shown, the coordinate-position inputting/detecting device 1 can be attached to any display unit other than the display of a computer. Herein, the coordinate-position inputting/detecting device 1 according to Embodiment 1 is also applicable to any display unit in any size in a range from a small sized to a large sized ones. In addition, the coordinate-position inputting/detecting device 1 can be attached to the write-in surface of a display board or the like. In that case, it is desirable to form an entry area 2 matching the size of the write-in surface thereof.

Furthermore, by integrating the light receiving/emitting devices 3L and 3R and recursive reflecting member 4 with the frame 1a into one unit, performability when the coordinate-position inputting/detecting device 1 is attached to a display unit, for instance, can be improved. Alternately, the coordinate-position inputting/detecting device 1 may not be attached to a display unit or a write-in surface of a display board or the like through a frame 1a, but the display unit or write-in surface of a display board or the like are made use of as a frame of the coordinate-position inputting/detecting device 1, so that the coordinate-position inputting/detecting device 1 can also be integrated with the display unit or the write-in surface of a display board or the like into one unit.

A coordinate-position inputting/detecting device according to Embodiment 2 of the present invention will be explained below. Herein, however, description is made mainly for a controller assuming that a coordinate-position inputting/detecting device 1 has the same configuration as shown in FIG. 1 and FIG. 2 (or FIG. 3). Namely, the controller described below is usable as the controller 16 for the coordinate-position inputting/detecting device 1 according to Embodiment 1. Accordingly, it is assumed in the coordinate-position inputting/detecting device according to Embodiment 2 that the configuration other than the configuration of the controller is the same as that of the coordinate-position inputting/detecting device 1 according to Embodiment 1.

Figure 10:
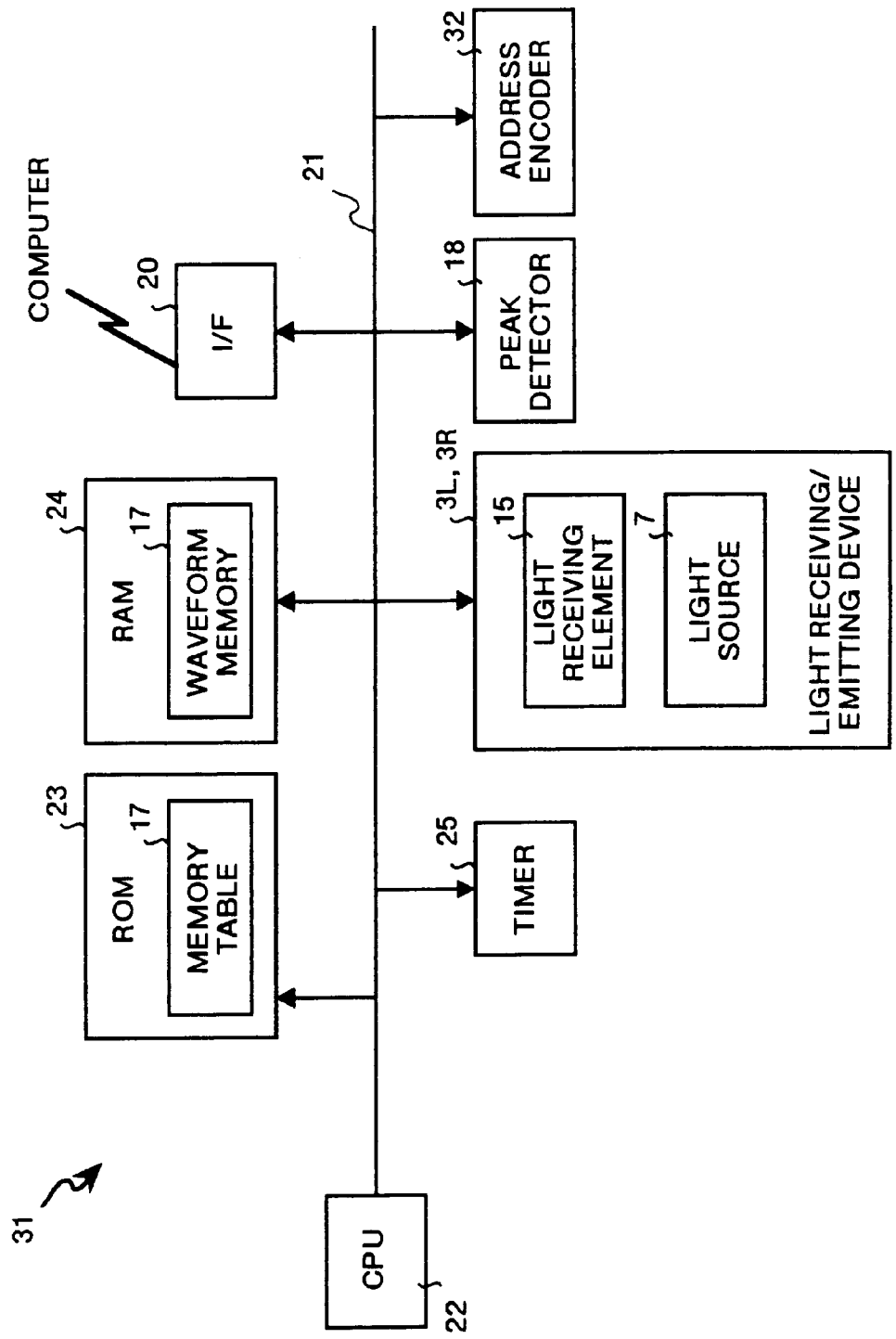
FIG. 10 is a block diagram of a controller of a coordinate-position inputting/detecting device according to Embodiment 2 of the present invention.

FIG. 10 is a block diagram showing the controller for the coordinate-position inputting/detecting device according to Embodiment 2. In FIG. 10, a controller 31 is formed with blocks excluding light receiving/emitting devices 3L and 3R. The controller 31 shown in FIG. 10 comprises a CPU 22 for providing a centralized control over all the blocks, a ROM 23 for storing therein fixed data such as a control program, a RAM 24 for storing therein variable data, a timer 25 for controlling time intervals of light emission from the light sources 7 provided in the light receiving/emitting devices 3L and 3R, a peak detector 18, an address encoder 32, an I/F 20 for connecting the controller 31 to a computer, and a bus 21 for connecting the blocks to each other. It should be noted that a waveform memory 17 for storing therein waveform data outputted from the light receiving element 15 of the light receiving/emitting devices 3L and 3R is provided in the RAM 24. Memory table 33 described later is stored in the ROM 23 along with the control program.

Figure 11:
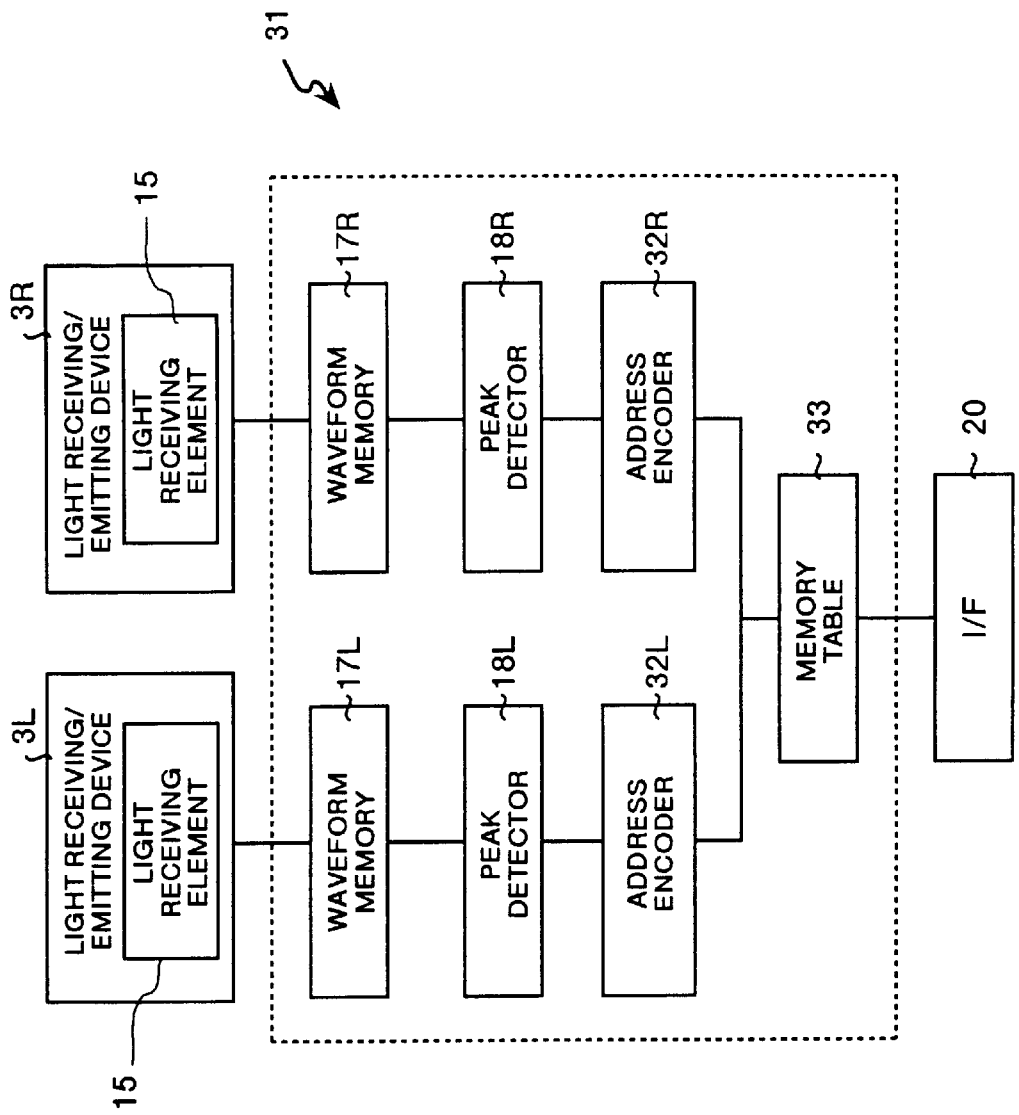
FIG. 11 shows the processing executed by the controller shown in FIG. 10.

The processing executed in the controller 31 will be explained below. FIG. 11 show the processing executed by the controller. Waveform data inputted from the light receiving element 15 as an electric signal is stored in waveform memories 17L and 17R of the RAM 24. The peak detectors 18L and 18R execute the processing of detecting a position of a peak point in the waveform data stored in the waveform memories 17L and 17R. The processing by the peak detectors 18L and 18R is as described with reference to FIG. 6, and so, a position of a dark point Dn ((DnL on the light receiving element 15 of the light receiving/emitting device 3L, DnR on the light receiving element 15 of the light receiving/emitting device 3R) is detected herein.)

When a dark point (DnL, DnR) on the light receiving elements 15 is detected, the address encoders 32L and 32R execute the processing for converting the dark point (DnL, DnR) to each address value. Namely, each of the address encoder 32L and address encoder 32R has performs a function of converting a position of a dark point (DnL, DnR) to a specified address value. When a dark point (DnL, DnR) is converted to a specified address value, the processing of obtaining the coordinates (x, y) of a position of a pointing body A which causes a peak point to appear in the waveform data of light intensity is executed.

The processing of obtaining the coordinates (x, y) of a position of a pointing body A using a memory table 33 will be specifically described below. FIG. 12 shows the memory table 33 stored in the ROM 23. The memory table 33 is prepared, as shown in FIG. 12, by combining an address Ln based on a value of a dark point DnL on the light receiving element 15 of the light receiving/emitting device 3L with an address Rn based on a value of a dark point DnR on the light receiving element 15 of the light receiving/emitting device 3R each appearing when a probe beam is blocked by a pointing body A in a matrix respectively with the coordinates (x, y) of each position corresponding to each of the combinations stored therein. It should be noted that the address Ln corresponds to the probe beam Ln and the address Rn corresponds to the probe beam Rn in the memory table 33 shown in FIG. 12.

Accordingly, by converting the dark points (DnL, DnR) on the light receiving elements 15 into specified addresses (Ln, Rn) by the address encoder 32 and searching the memory table 33 according to the address, the coordinates of the corresponding position are selected as the coordinates (x, y) of the position of a pointing body A.

The coordinates (x, y) of the position of a pointing body A detected as described above are inputted into the computer through the I/F 20.

Specific description is made for an operation of the coordinate-position inputting/detecting device 1 when the controller 31 described above is applied in the coordinate-position inputting/detecting device 1 according to Embodiment 1 with reference to FIG. 7. At first, it is assumed, as shown in FIG. 7, that the user points to a certain position (x, y) on the display d by a pointing body A such as a user's finger or a pen through the entry area 2 of the coordinate-position inputting/detecting device 1. As a result, the probe beams Ln and Rn emitted from the light receiving/emitting devices 3L and 3R respectively are blocked thereby. The probe beams Ln and Rn blocked by the pointing body A do not reach the recursive reflecting member 4, and recursively reflected light beams of the probe beams Ln and Rn are not received by the light receiving elements 15 of the light receiving/emitting devices 3L and 3R. This causes an area with low light intensity (dark point) to appear at each specified position (DnL, DnR) on the light receiving elements 15 respectively (Refer to FIG. 6). The waveform data according to the intensity of the light outputted from the light receiving elements 15 is stored in the waveform memories 17L and 17R.

The peak detectors 18L and 18R detect a dark point (DnL, DnR) on the light receiving elements 15 as a peak point in the waveform data according to the waveform data stored in the waveform memories 17L and 17R. The address encoders 32L and 32R convert the dark point (DnL, DnR) on the light receiving elements 15 detected by the peak detectors 18L and 18R into specified addresses (Rn, Ln).

As described above, with the controller 31 of the coordinate-position inputting/detecting device according to Embodiment 2, when the dark points on the light receiving elements 15 are obtained the coordinates of the corresponding position are selected from the memory table 33 as the coordinates of a position pointed thereto by a pointing body A using the obtained relative positions of the dark point. Therefore, the need for obtaining the coordinates of a position by computation is eliminated, so that coordinates of a position pointed thereto by a pointing body A can be obtained with simple processing.

A coordinate position inputting/detecting device according to Embodiment 3 of the present invention will be described below. Also herein, like in Embodiment 2, description is made mainly for a controller for the coordinate position inputting/detecting device 1 having the configuration shown in FIG. 1 and FIG. 2. Namely the controller described below can be used as a controller 16 for the coordinate position inputting/detecting device 1 according to Embodiment 1. Namely, the configuration of the coordinate position inputting/detecting device according to Embodiment 3 other than the configuration of the controller is the same as that of the coordinate position inputting/detecting device according to Embodiment 1.

By the way, the entry area 2 of the coordinate position inputting/detecting device 1 according to Embodiment 1 comprises a fan-shaped light emitted from the light emitting/receiving devices 3L and 3R. In addition, there is a depth of light (for instance, a thickness of a light layer formed on the display d shown in FIG. 1: generally 5 mm to 10 mm) (Refer to FIG. 14), so that a region determinable as the specified entry area 2 is present also in the vertical direction against the display d.

Therefore, an inputting work with the coordinate position inputting device 1 is largely affected according to the state in which probe light completely blocked by the pointing body A is determined as a state in which a user pointed a certain position in the entry area 2 (a certain position was clicked with the mouse; described as "pointed state" hereinafter) or as a state in which the probe light is a little blocked by the pointing body A. For instance, when a straight line is drawn with the coordinate position inputting/detecting device 1 provided in front of the display d as shown in FIG. 1, it is considered that a user generally draws the straight line with a finger or a pen while touching a surface of the display d. However, when a long straight line is drawn in the large entry area 2, it is difficult to draw a straight line keeping a finger tip or a pen always in contact with the surface of the display d. Sometimes the finger tip or the pen tip may get off from the surface of the display d while the user is drawing the straight line. If the state where the probe light is completely blocked is determined as the pointed state, when a finger tip or a pen tip is even slightly away from the surface of the display d, the probe light can not completely be blocked, and a continuous line can not be drawn. On the other hand, if the state where the probe light is partially blocked is determined as the pointed state, the possibility of a continuous line being broken becomes lower, but even if a user does not actually start an inputting operation, sometimes the probe light may partially be blocked, and the state may be determined as the pointed state.

The controller according to Embodiment 3 of the present invention makes it possible to identify the contents of an operation executed by a user without being affected by minute movement of a finger tip or a pen.

Figure 13:
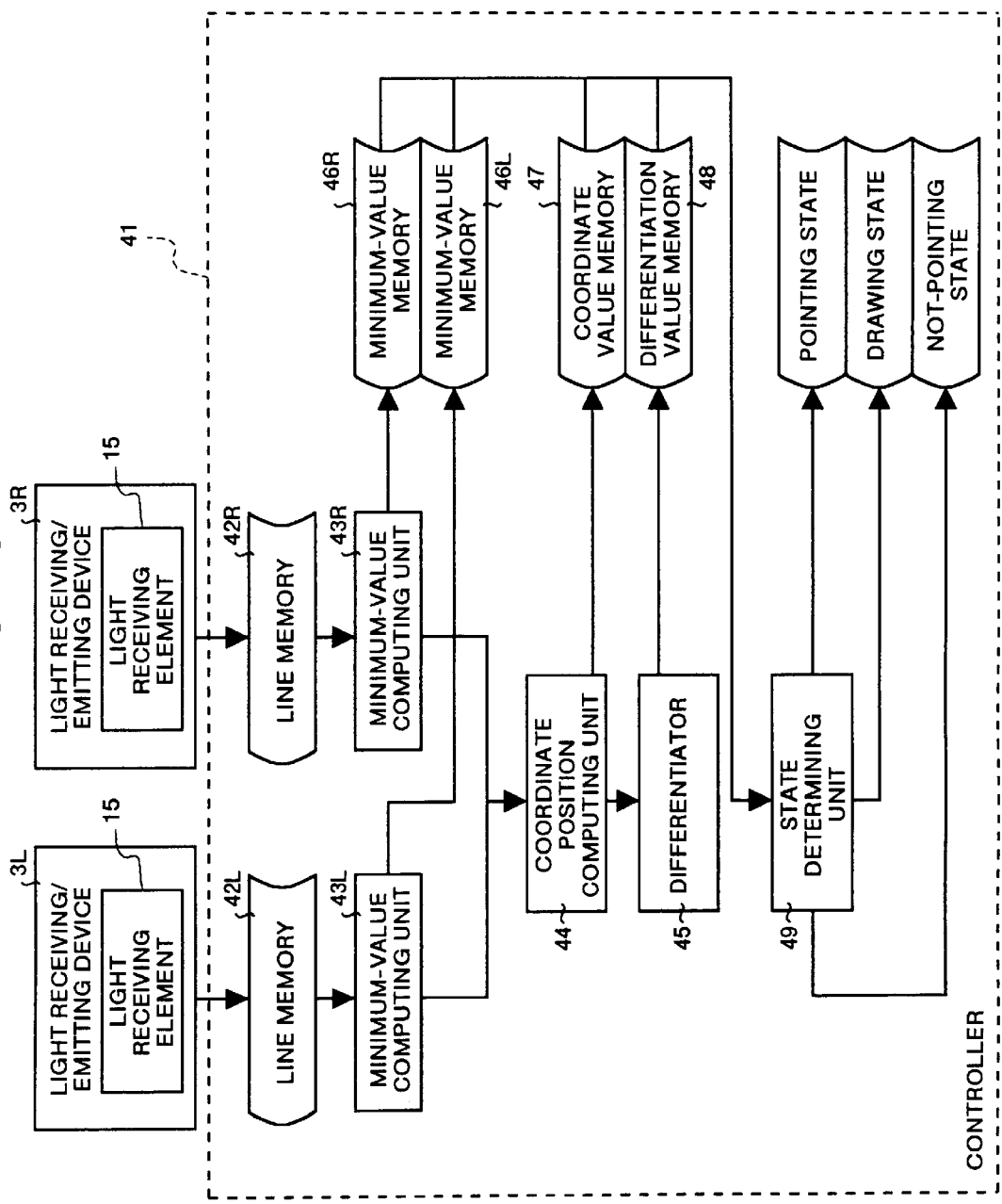
FIG. 13 is a block diagram of a controller of a coordinate-position inputting/detecting device according to Embodiment 3 of the present invention.

FIG. 13 is a block diagram of a controller for executing various types of operation according to waveform data outputted from each light receiving element 15 of the light emitting/receiving devices 3L and 3R described in Embodiment 1. The controller 41 comprises line memories 42L and 42R each for receiving waveform data inputted from each light receiving element 15. Minimum-value computing units 43L and 43R are provided for reading out waveform data from the corresponding line memories 42L and 42R and computing the dark points on the light receiving elements 15 from the read-out waveform data and computing a light intensity value of the dark point, namely a maximum value in the light intensity distribution. A coordinate position computing unit 44 is provided for computing a coordinate position in the entry area 2 where the pointing body A is inserted. A differentiator 45 is provided for computing a time differentiation of the coordinate position computed by the coordinate computing unit 44 to obtain a time differentiation value for the coordinate position.

In addition, the controller 41 comprises minimum value memories 46L and 46R for storing therein minimum values (light intensity values) computed by the corresponding minimum value computing units 43L and 43R respectively. A coordinate value memory 47 is provided for storing therein a coordinate position computed by the coordinate position computing unit 44. A differentiation value memory 48 is provided for storing therein a time differentiation value computed by the differentiator 45. It should be noted that a value stored in each memory is correlated to values stored in other memories.

As explained later, the controller 41 comprises a state determining unit 49 for identifying what type of operation a user is executing with the pointing body A depending on values stored and rules previously set in each of the memories described above. The state determining unit 49 determines, for instance, whether a user is executing an operation for pointing an arbitrary point in the entry area 2 with the pointing body A or not (namely whether the current state is a pointing state or a not-pointing state), or whether the user is drawing something in the entry area 2 with the pointing body A or not (whether the current state is a drawing state or not).

FIG. 13 shows the minimum value computing units 43L and 43R, coordinate position computing unit 44, differentiator 45, and state determining unit 49 each constituting the controller 41, but these functions can also be realized by executing a software for the same functions with the CPU.

The processing of identifying a state of the pointing body A by the state determining unit 49 shown in FIG. 13 will be described below. FIG. 14A to FIG. 14C show a relation between a relative position of the pointing body A in the Z-axial direction and a probe light blocked by the pointing body A when an arbitrary position in the entry area 2 is pointed by the pointing body A (for instance, a pen) and information concerning intensity distribution obtained by the light receiving elements 15.

A fan-shaped light comprising probe light fluxes emitted from the light emitting/receiving devices 3L and 3R generally has a thickness as shown in each of FIG. 14A to FIG. 14C. This thickness is generally in a range from around 5 mm to around 10 mm. As clearly shown in these figures, as the pointing body A is moved in the entry area 2 in the Z-axial direction, the quantity of light blocked by the pointing body A increases. Namely, as shown in the left of these figures, as a position of the pointing body A inserted into the entry area 2 becomes deeper, light intensity in a portion corresponding to a position of the pointing body A proportionally decreases in intensity distribution for light received by the light receiving elements 15 in the light emitting/receiving devices 3R and 3L.

Figure 15:
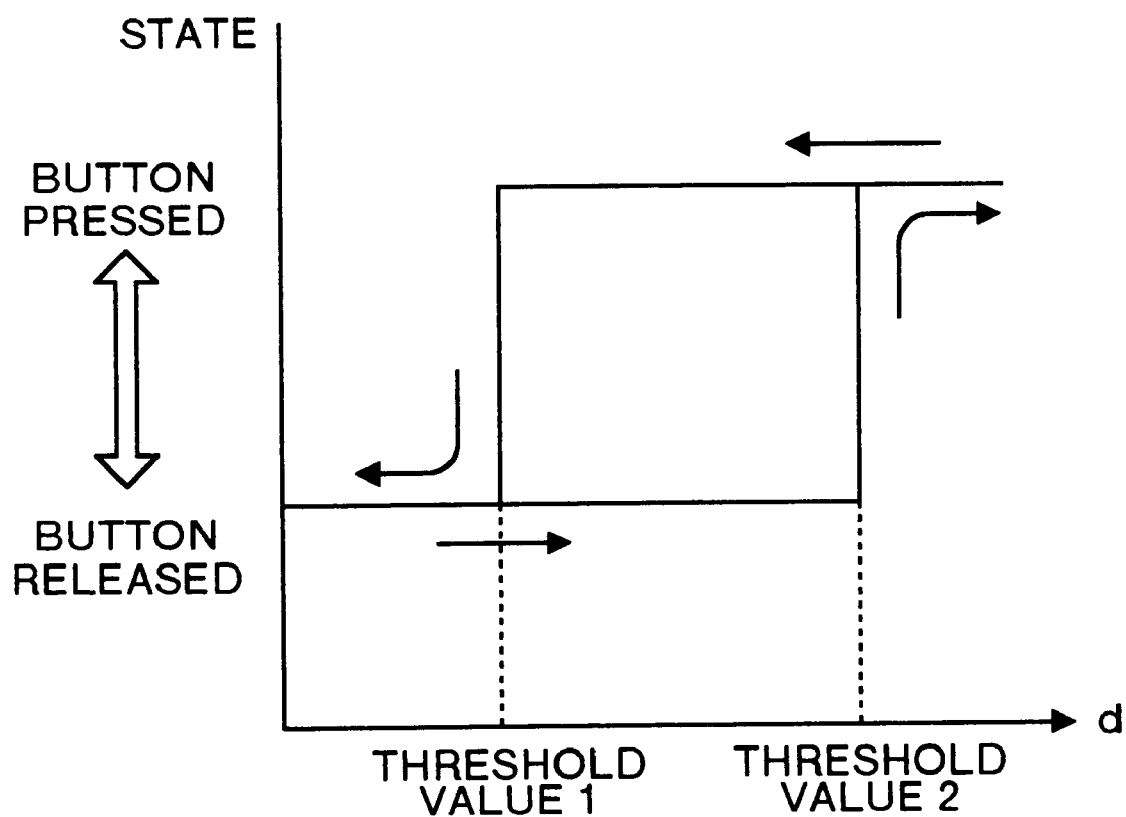
FIG. 15 explains the state shifting rule used for deciding the state of a pointing body by the controller of the coordinate-position inputting/detecting device according to Embodiment 3 of the present invention.

In order to solve the problem described above, as shown in left of FIG. 14A to FIG. 14C, two threshold values are set for the reflected light. Further, a rule for identifying an operating state of the pointing body A in the entry area 2 is decided according to a relation between these two threshold values and the light intensity. FIG. 15 explains the rule for identifying an operating state of the pointing body A against the entry area 2. Herein the rule will be called as "state shift rule".

The state shift rule is a rule for allocating a depressed state of a mouse button or a released state of the mouse button to a state of the pointing body A as a result of some inputting operation to the entry area 2 by a user. This rule is employed because the coordinate position inputting/detecting device 1 is connected, for instance, to a computer and is used as a device like a mouse and which state is regarded as clicking and which one is to be regarded as double-clicking is important. In FIG. 15, the horizontal axis indicates a depth d (in the Z-axial direction) to which the pointing body A is inserted into the entry area 2, and the vertical axis indicates a state allocated to the pointing body A according to the depth d.

More specifically, with this state shift rule, when the pointing body A is inserted into the entry area 2 down to the depth d and probe light is blocked, a state where light intensity reduces below the threshold value 1 and even below the threshold value 2 is regarded as a state in which the mouse button has been depressed (Refer to FIG. 14C). On the other hand, if the light intensity reduces below the threshold value 2 and even if an operation for pulling the pointing body A out from the entry area 2 is performed, the state is regarded as a state in which the mouse button has been depressed until the light intensity increases beyond the threshold value 1 (Refer to FIG. 14B). At a point of time when the light intensity has increased beyond the threshold value 1, the state of the pointing body A is regarded as a state in which the mouse button has been released (Refer to FIG. 14A). Namely a zone between the threshold value 1 and threshold value 2 corresponds to a state where the mouse button is released while the pointing body A is being inserted into the entry area 2, but a state in which the pointing body A is pulling off after it is once regarded that the mouse button has been depressed is regarded as the state in which the mouse button is depressed.

A method of deciding a state of the pointing body A according to the state shift rule will be described with reference to FIG. 7. The light emitting/receiving devices 3L and 3R emit a fan-shaped light comprising probe light fluxes. It is assumed herein that, a user points an arbitrary position in the entry area 2 with the pointing body A. As a result of the user's operation, of the probe light reflected by the recursively reflecting members 4 (reflected light), light intensity of the probe light at a time of blocking of and at a position blocked by the pointing body A reduces. The light emitting/receiving devices 3L and 3R receive light reflected by the recursively reflecting members 4, and detect intensity distribution of the received light.

The line memories 42L and 42R receive and store therein waveform data corresponding to the light intensity from the corresponding light receiving elements 15 respectively. The minimum value computing units 43L and 43R read the waveform data from the corresponding line memories 2L and 42R respectively, and compute the relative positions of the dark point on the light receiving elements 15. After the relative positions of the dark point are computed, the minimum value computing units 43L and 43R compute light intensity values for the computed relative positions (minimum values in the light intensity distributions) respectively.

The coordinate position computing unit 44 receives the information concerning the relative positions for a dark point from the minimum value computing units 43L and 43R, and computes a coordinate position of the dark point in the entry area 2 where the pointing body A has been inserted according to the relative positions of the dark point as well as to positions of the light emitting/receiving devices 3L and 3R. As a method of computing a coordinate position of the pointing body A, either one of the method using the equation described in Embodiment 1 or the method using the table described in Embodiment 2 may be used.

Then the differentiator 45 receives the coordinate position computed by the coordinate position computing unit 44, executes time differentiation computing according to the received coordinate position, and computes a time differentiation value for the coordinate position.

In the process described above, the light intensity values computed by the minimum value computing units 43L and 43R are correlated to each other and stored in the corresponding minimum value memories 46L and 46R (at least one of the light intensity values must be stored). Further, the coordinate position computed by the coordinate position computing unit 44 is stored in the coordinate value memory 47 and the time differentiation value computed by the differentiator 45 is stored in the differentiation value memory 48 respectively.

Then the state determining unit 49 receives a light intensity value (minimum value) from either one of the minimum value memories 46L and 46R and a time differentiation value from the differentiation value memory 48, and determines a state of the pointing body A using the received minimum values and time differentiation value referring to the condition table decided according to the state shift rule. An example of the condition table is shown in FIG. 16.

The processing of determining whether the pointing body A is in a pointing device or in a not-pointing device will be described below. The state determining unit 49 determines whether the received light intensity value is smaller or larger than the threshold values 1 and 2 described in FIGS. 14A to 14C and FIG. 15 or not and also whether an absolute value of the received time differentiation value is larger or smaller than a specified threshold value. The state determining unit 49 decides the state shown state of the pointing body A according to FIG. 16. Herein the not-pointing state corresponds to a state where the mouse button is released, and the pointing state corresponds to a state where the mouse button is depressed. For instance, when an absolute value of the time differentiation value is larger than the threshold value and the light intensity value is smaller than the threshold value 1 but is larger than the threshold value 2, a state of the pointing body A is regarded as the pointing state.

Further a condition table enabling reflection of the current state of the pointing body A to the next processing for determination can be used. An example of this condition table is shown in FIG. 17. When the condition table shown in FIG. 17 is used, a state of the pointing body A can be determined based on only the light intensity value.

For instance, when the current state of the pointing body A is the not-pointing state, if the minimum value used for next determination is smaller than the threshold value 1 but is larger than the threshold value 2, the current state of the pointing body A is determined as the not-pointing state. Namely in this case, as shown in FIG. 15, even if the pointing body A is inserted into the entry area 2, the light intensity value is between the threshold value 1 and threshold value 2, so that the state is determined as the not-pointing state. On the other hand, if the current state is determined as the pointing state, the next state is also determined as the pointing state. This state corresponds to an operation of the pointing body A in a range lower than the threshold value in the button-depressed side of FIG. 15, so that the state is determined as the pointing state.

A result of determination by the state determining unit 49 is transmitted together with values for a coordinate position of the pointing body A to a computer to which the controller 41 is connected, and the result appears as execution of an application program or processing like drawing.

Detailed description is not made herein, when determining of a state of the pointing body A by the state determining unit 49 as described above, when the values for a coordinate position of the pointing body A are also used, not only whether the mouse button has been pressed or not can be determined, but also whether a user is drawing a character or a figure by using the pointing body A or not (drawing state) can be determined. Also by using data for a coordinate position, when the pointing body A is moved up and down twice, the operation is determined as a double-clicking operation without fail.

As described above, with the controller 41 of the coordinate position inputting/detecting device according to Embodiment 3 of the present invention, it is possible to determine how the pointing body A is moving by using information stored in each of the memories shown in FIG. 13. Thus, even when the pointing body A is moved largely (up and down, left and right, back and forth), a desired continuous line can be inputted, and a double-clicking operation can be executed smoothly, and thus operability of the coordinate position inputting/detecting device can be improved.

In other words, as a result of use of the state shifting rule described above, such troubles as that a continuous line is shown as a dotted line and that slight movement of the pointing body A in the vertical direction is determined as double-clicking can be prevented. On the other hand, by changing the values of the threshold values 1 and 2, the coordinate position inputting/detecting device 1 can sensitively respond to movement of the pointing body A in the vertical direction. Namely even when the pointing body A is moved up and down within a very short period of time for double-clicking, the operation can accurately be determined as double-clicking.

Also it is possible to compute an area in which the pointing body A blocks light according to a change in the light intensity as shown in FIG. 14 and to utilize this change for detecting a double-clicking operation.

Operation for determining a state of the pointing body A with the coordinate position inputting/detecting device according to Embodiment 1 is described above. Basic configuration of the coordinate position inputting/detecting device is not limited to that of the coordinate position inputting/detecting device according to Embodiment 1, and the controller 41 described in Embodiment 3 can be applied to the coordinate position inputting/detecting device as described above. Coordinate position inputting/detecting devices in which the controller 41 described in Embodiment 3 can be applied are described below.

Figure 18:
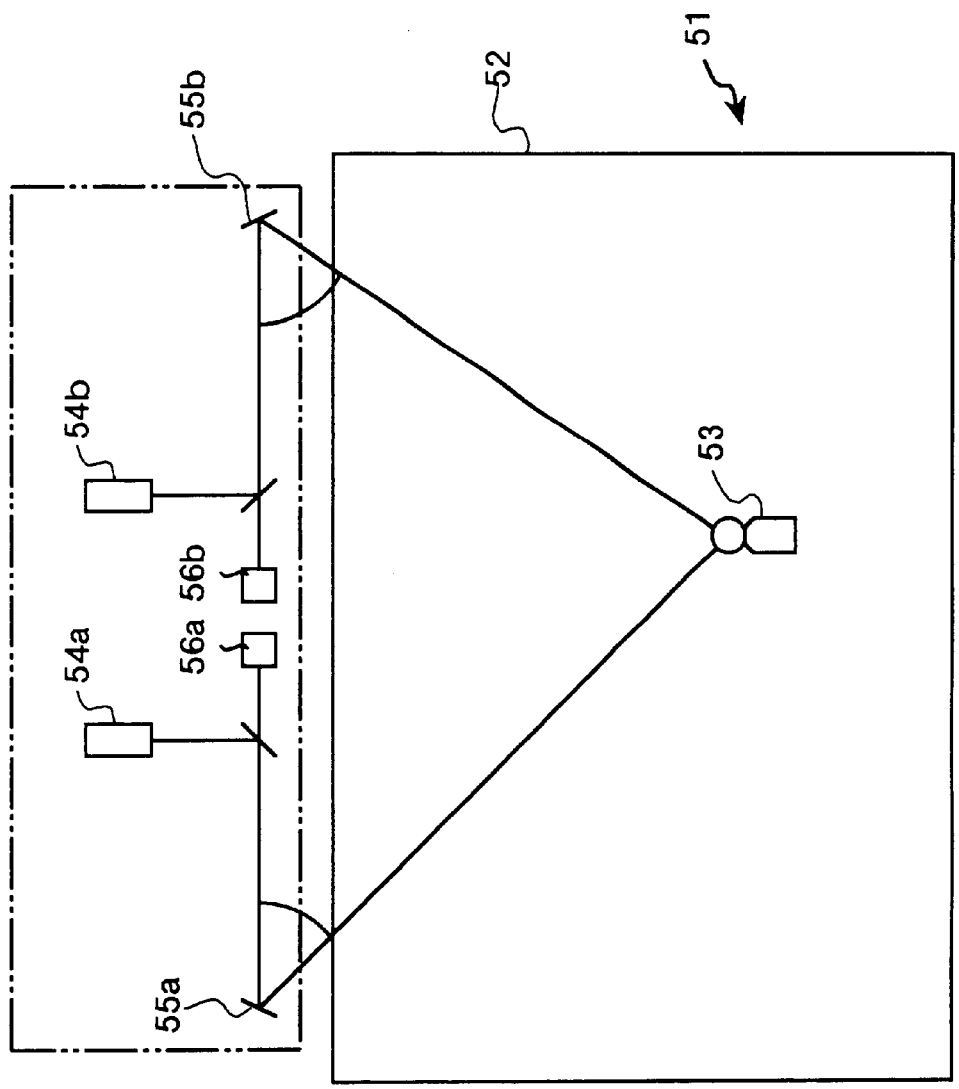
FIG. 18 shows a general configuration of another coordinate-position inputting/detecting device in which the controller according to Embodiment 3 of the present invention is applicable.

As a first example, there is the coordinate position inputting/detecting device shown in FIG. 18 (Refer to Japanese Utility Model Publication No. HEI 6-37467). This coordinate position inputting/detecting device 51 comprises a position pointer 53 located on a coordinate system surface, a pair of rotational mirrors 55a and 55b each for emitting a light beam for scanning the coordinate system surface 52, and light receiving sections 56a and 56b each for receiving a reflected light reflected on the position pointing section 53 and detecting a position of the position pointer 53. In Embodiment 3, minimum values of intensity distribution are computed as light intensity for a dark point on the light receiving elements 15, however maximum values are computed when the controller 41 is applied in this coordinate position inputting/detecting device 51.

Figure 19:
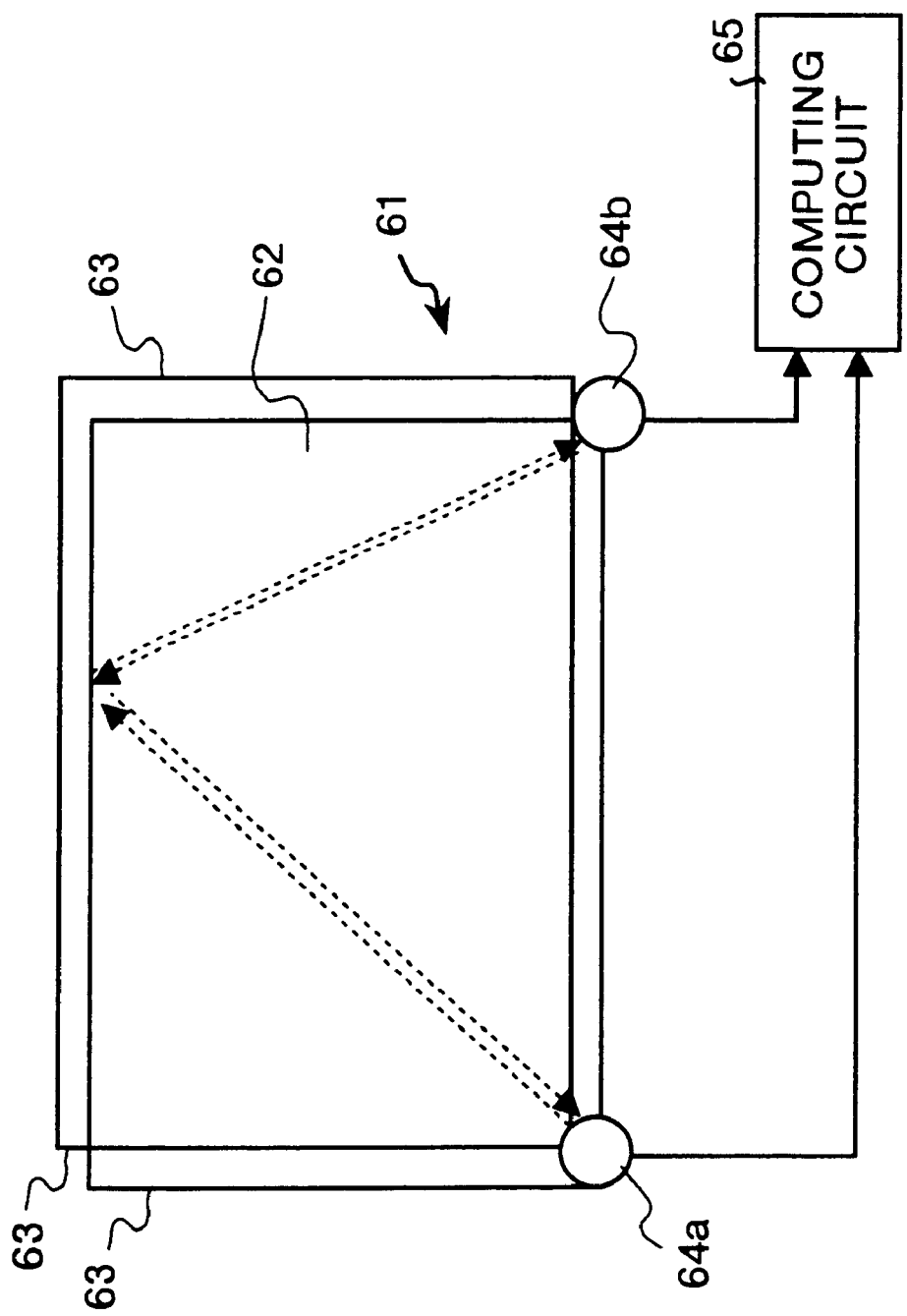
FIG. 19 shows a general configuration of still another coordinate-position inputting/detecting device in which the controller according to Embodiment 3 of the present invention is applicable.

As a second example thereof, there is the coordinate position inputting/detecting device shown in FIG. 19 (Refer to Japanese Patent Laid-Open Publication No. HEI 9-91094). This coordinate position inputting/detecting device 61 comprises light scanners 64a and 64b located at different positions on a touch panel 62. The light scanners 64a and 64b emit light beams substantially in parallel to the touch panel 62 by rotating around the located positions and receive the light beams recursively reflected from the reflecting members 63. A computing circuit 65 is provided for computing coordinates of light blocked points on the light scanners 64a and 64b. By applying the controller 41 described in Embodiment 3 above in this coordinate position inputting/detecting position 51, a state of the pointing body A can easily be determined.

Figure 20:
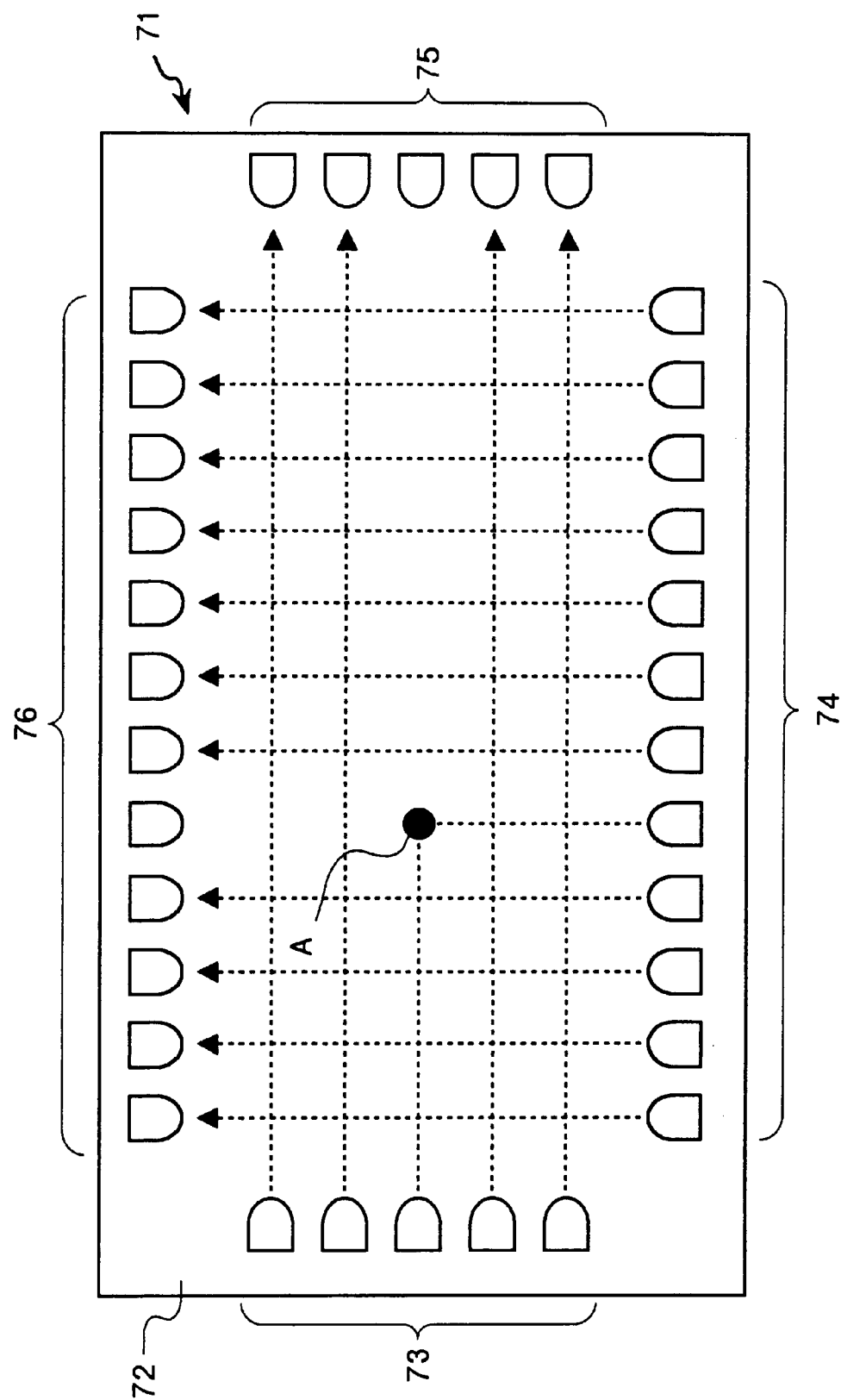
FIG. 20 shows a general configuration of still another coordinate-position inputting/detecting device in which the controller according to Embodiment 3 of the present invention is applicable.

As a third example thereof, there is the coordinate position inputting/detecting device shown in FIG. 20 (Refer to Japanese Patent Publication No. 2678231). This coordinate position inputting/detecting device 71 comprises a plurality pairs of light receiving elements 73, 74 and light receiving elements 75, 76 arrayed around a touch panel 72. When an arbitrary position on the touch panel 72 is pointed with the pointing body A, a position of the pointing body A is computed according to a result of light-receiving by the light receiving elements 75, 76. Positions of dark points on the light receiving elements in Embodiment 3 correspond to each of the light-receiving elements in the coordinate position inputting/detecting device 71.

The coordinate position inputting/detecting devices described above are only the example of the present invention, and the controller 41 according to Embodiment 3 can be applied to coordinate position inputting/detecting devices based on other optical systems.

As Embodiment 4 of the present invention, a display board system using the coordinate-position inputting/detecting device described in Embodiments 1 to 3 will be described. The display board system according to Embodiment 4 will be described hereinafter in detail in the order of:

1. System configuration,
2. Operation, and
3. Effects.

1. System Configuration

Figure 21:
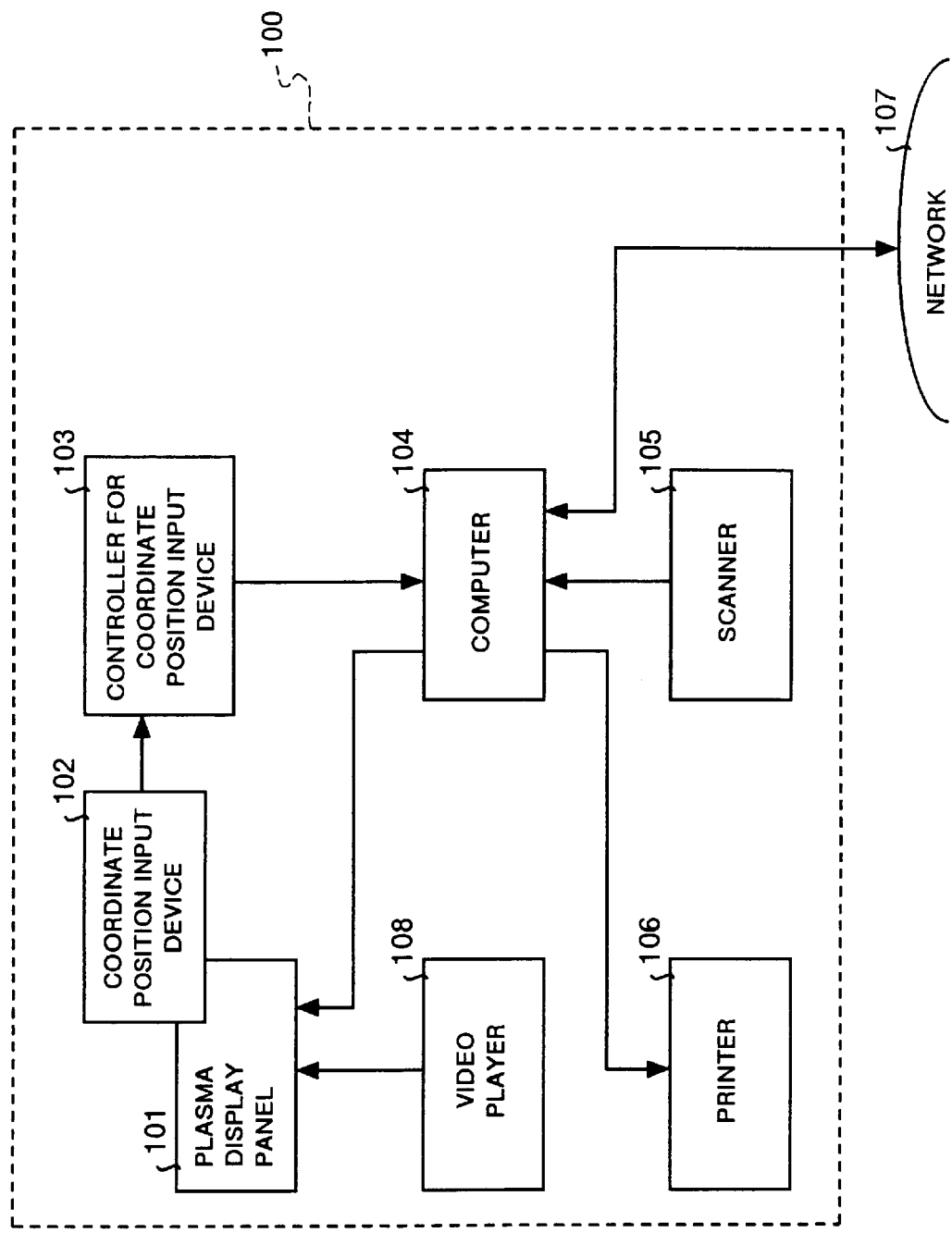
FIG. 21 is a block diagram of a display board according to Embodiment 4 of the present invention.

FIG. 21 is a block diagram showing the display board system according to Embodiment 4. The display board system 100 shown in FIG. 21 principally comprises a plasma display panel (Described "PDP" hereinafter) 101 for displaying the images. A coordinate-position input device 102 is provided on the front surface of the PDP 101 with an entry area (Refer to FIG. 1) used as a touch surface (write-in surface) for inputting characters and graphics written with a fingertip or a pen through the touch surface (which corresponds to the coordinate-position inputting/detecting device described in Embodiments 1 to 3). A controller 103 for the coordinate-position input device (which corresponds to the controller 16 in Embodiment 1, controller 31 in Embodiment 2, and controller 41 in Embodiment 3) is provided for performing an operation of calculation of a position of coordinates on the touch surface when touched with a fingertip or a pen. A computer 104 (a personal computer) is provided for receiving positional information for coordinates from the controller 103 and providing controls over the system as a whole such as processing for illustrating characters and graphics inputted through the coordinate-position input device 102 onto the PDP 101.

Various types of peripheral equipment can be connected to the computer 104 of the display board system 100. As an example, FIG. 21 shows a scanner 105 for reading images of a document and a printer 106 for outputting image data onto a recording paper connected to the computer 104. Furthermore, the display board system 100 can be connected to a network 107 through the computer 104. This allows data prepared by other computers that are connected on the network 107 to be displayed on the PDP 101 or data prepared by the display board system 100 to be transferred to other computer.

Furthermore, a video input terminal and a speaker are provided in the PDP 101 although they are omitted from the figure, and by connecting various types of information equipment and AV equipment such as a video player 108, a laser disk player, a DVD player, or a video camera, the PDP 101 can be used as a large sized screen monitor.

Herein, a 40-inch or 50-inch large sized screen usable as a display board is used as the PDP 101. A plasma display is employed as a display in Embodiment 4 because the plasma display has characteristics such that the display can be upsized, has high brightness so that it is not required to darken the room as required when a projector is used, and that a view field angle is wide as compared to that of a liquid crystal display and further moving images can smoothly be reproduced. As described above, as the plasma display is used, the display unit according to Embodiment 4 can be made thinner (down sized). However, although it is assumed that the PDP 101 is used herein, it is needless to say that some other display unit such as a CRT or a crystal liquid display can be used instead of the PDP 101.

As the coordinate-position input device 102, the coordinate-position inputting/detecting device described in Embodiments 1 to 3 is used as already described above. Therefore, in Embodiment 4, description of the coordinate-position input device 102 is omitted. It should be noted that the controller 103 inputs an operation performed on the touch surface of the coordinate-position input device 162 to a computer as positional information for coordinates, and the computer 104 executes various processing described later such that a mouse cursor is displayed at the position where a user touches the touch surface of the PDP 101.

Figure 22:
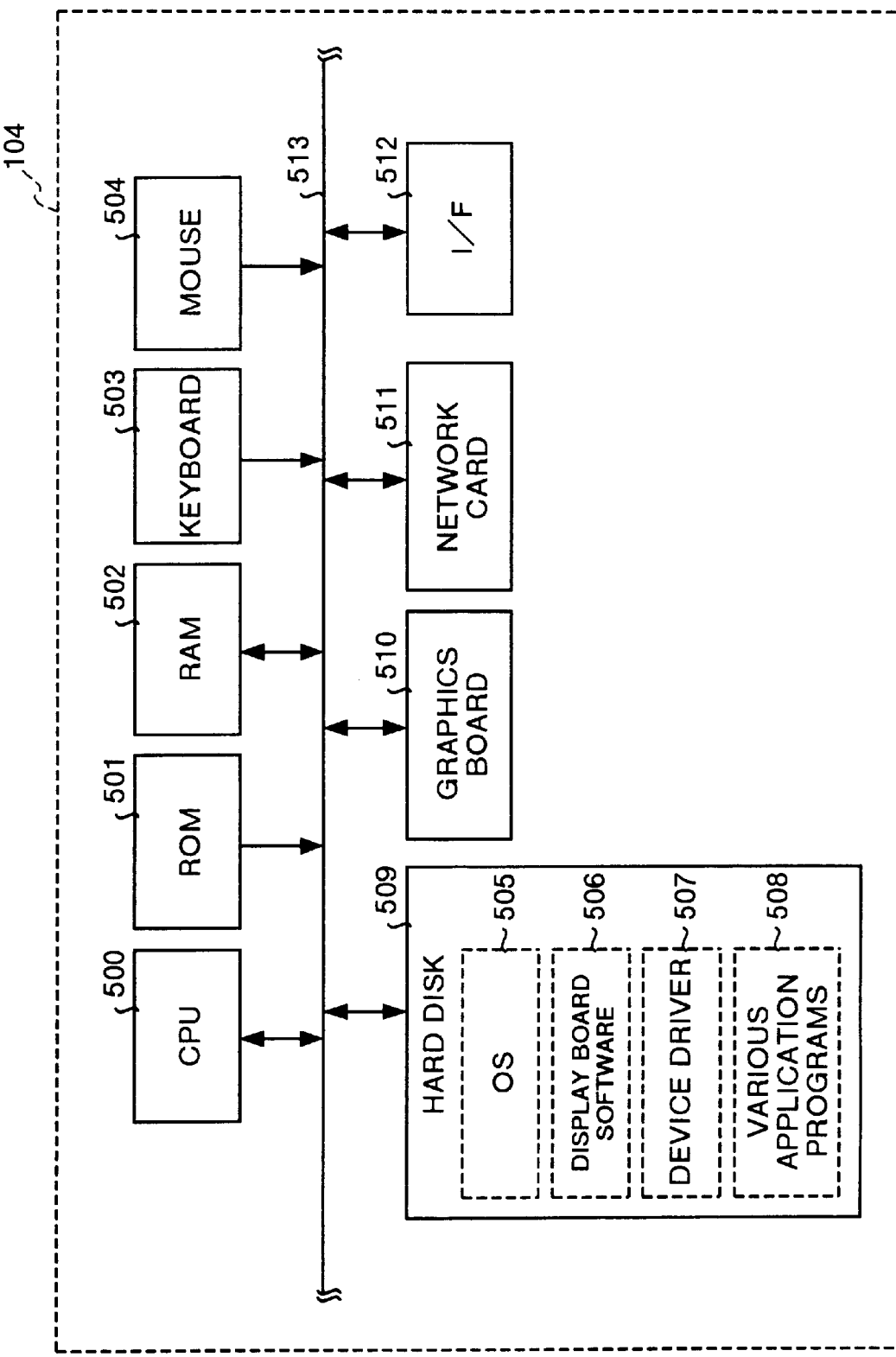
FIG. 22 is a block diagram of a computer (personal computer) of a display board system according to Embodiment 4 of the present invention.

A general configuration of the computer 104 shown in FIG. 21 will be described below. FIG. 22 is a block diagram of the computer 104. The computer 104 shown in FIG. 22 is a personal computer which comprises a CPU 500 for providing controls over the entire system. A ROM 501 is provided for storing therein a boot program or the like. A RAM 502 is utilized as a work area of the CPU 500. A keyboard 503 is utilized for inputting characters, numerical values, and various instructions or some other data. A mouse 504 is provided for moving a cursor and selecting an area. A hard disk 509 stores therein an operating system (OS) 505, display board software 506 for making the display board system 100 function as a display board, a device driver 507 for making the coordinate-position input device 102 and controller 103 operate on the computer 104, and various application programs 508 such as word processor and spreadsheet software. A graphics board 510 connected to the PDP 101 provides controls over display of images on to the PDP 101. A network card 511 (or may be a modem) is provided for connecting the display board system 100 to the network 107 through the computer 104. An interface (I/F) 512 for connecting thereto the controller 103, scanner 105 and printer 106. A bus 513 is utilized for connecting the above mentioned component devices to each other.

Although the interface for connecting peripheral equipment to the computer 104 is shown as one block indicated by the I/F 512 in FIG. 22 for convenience, I/F 512 actually comprises a serial interface such as RS-232C for connecting thereto the controller 103, a parallel interface such as Centronics for connecting thereto the printer 106, and a SCSI for connecting thereto the scanner 105.

It should be noted that, as shown in FIG. 21, the controller 103 is configured independently from the computer 104, however, the controller 103 may be integrated with the computer 104, and the function of the controller 103 may be added to the computer 104 itself. Although not shown in FIG. 22, a floppy disk drive, a CD-ROM drive, and an MO drive can be incorporated in the computer 104.

The component devices constituting the display board system 100 as described above are accommodated in the frame unit in an integrated form, and downsizing of a system as a whole, operability, adaptability for handling and convenience can be improved. The display board system 100 is accommodated in the frame unit as described above is because, a wide space for installation thereof is required if the component devices are discretely managed and a long time is required for moving the whole device from one place to another as the display board system 100 comprises a plurality of component devices as shown in FIG. 21.

Figure 23:
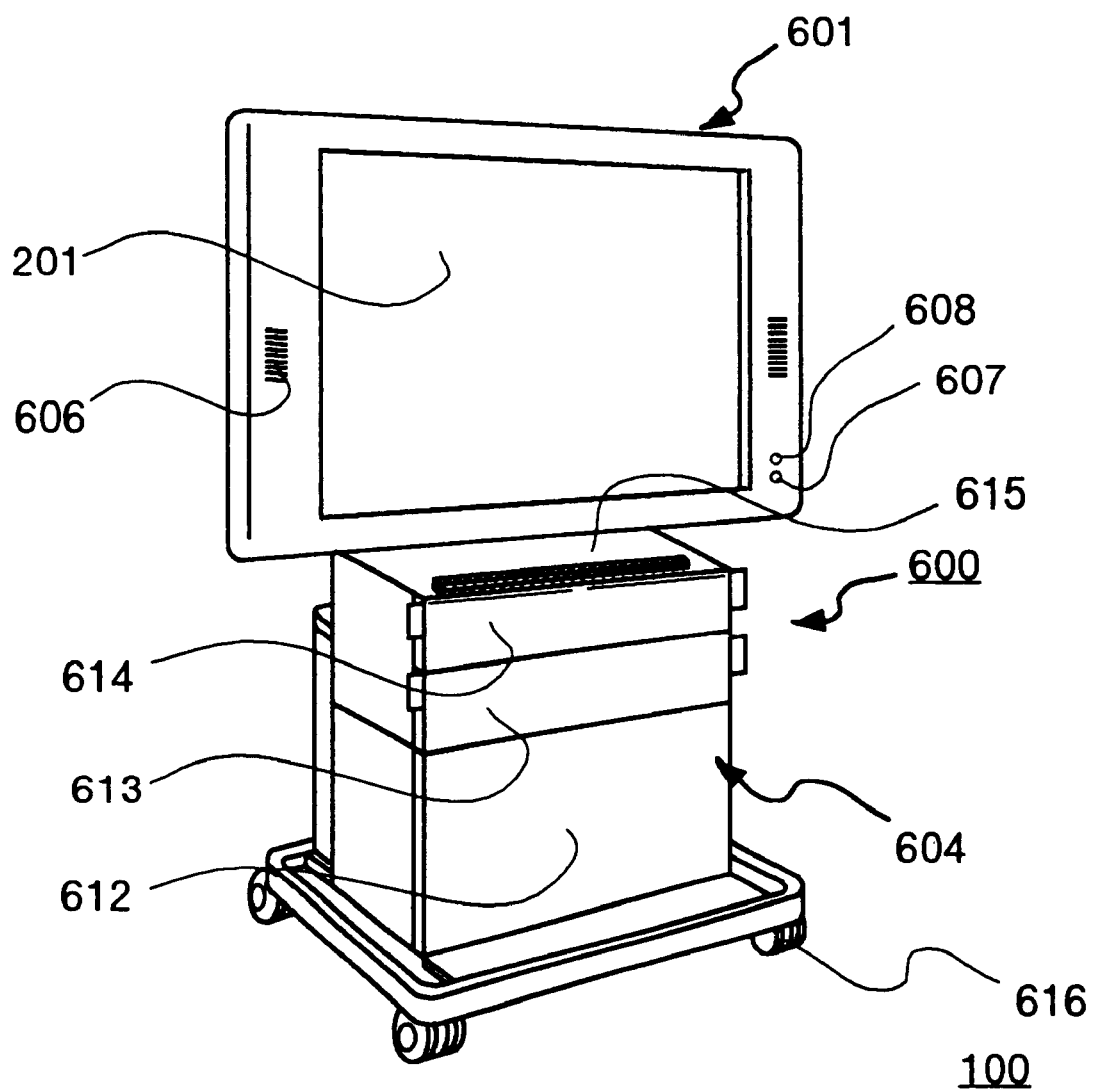
FIG. 23 is a perspective front view of a frame unit with the display board system according to Embodiment 4 of the present invention accommodated therein.
Figure 24:
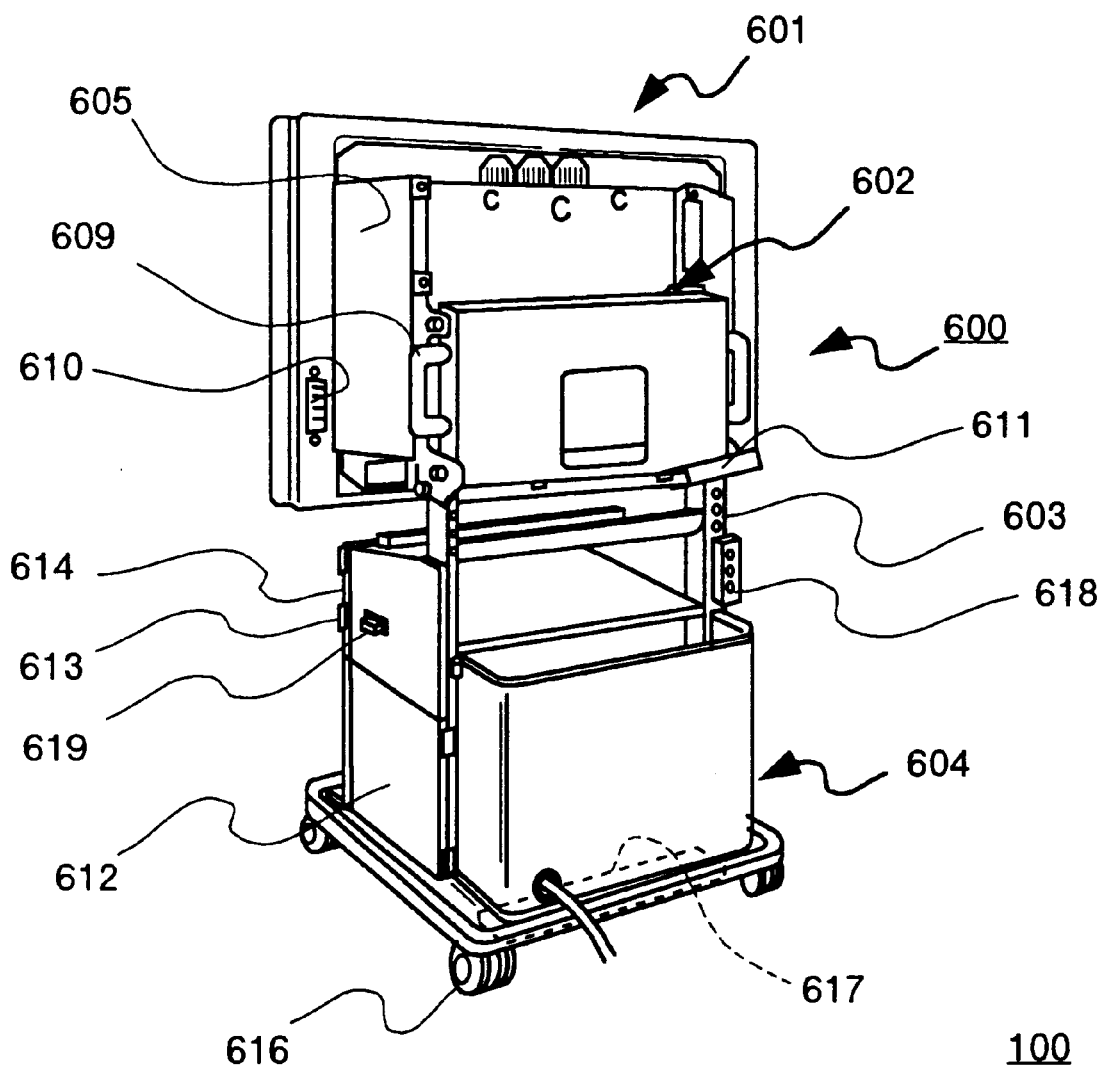
FIG. 24 is a perspective rear view of the frame unit with the display board system according to Embodiment 4 of the present invention accommodated therein.

FIG. 23 is a perspective view of the frame unit with the display board system 100 accommodated therein viewed from the front side thereof, and FIG. 24 is a perspective view thereof viewed from the rear side thereof. The frame unit 600 shown in FIG. 23 and FIG. 24 comprises a panel section 601 for accommodating the PDP 101 and coordinate-position input device 102 therein. A controller accommodating section 602 accommodates the controller 103 therein. A stand 603 supports the panel section 601 and the controller accommodating section 602 at a specified height. Finally an equipment accommodating section 604 accommodates the computer 104, scanner 105, printer 106, and a video player 108 or the like therein.

The PDP 101 and coordinate-position input device 102 are integrated so that the coordinate-position input device 102 is positioned in front of the PDP 101, and as shown in FIG. 23, the coordinate-position input device 102 is accommodated in the panel section 601 so that the touch surface 201 of the coordinate-position input device 102 is positioned in the front section of the panel section 601. As described above, the panel section 601 accommodates therein the PDP 101 and coordinate-position input device 102, and constitutes a display surface and a write-in surface (touch surface 201) of the display board.

Furthermore, the controller 103 is accommodated, as shown in FIG. 24, in the controller accommodating section 602 provided on the rear side of the panel section 601. The panel section 601 is mounted on the stand 603 of the equipment accommodating section 604 through a stay 605 to be supported so that the image display surface of the PDP 101 and the touch surface 201 of the coordinate-position input device 102 are positioned at a specified height. The controller accommodating section 602 is also similarly mounted on the stand 603.

It should be noted that, in the front side of the panel section 601 shown in FIG. 23, the reference numeral 606 indicates a speaker and the reference numeral 607 indicates a power lamp of the PDP 101. Furthermore, in the display board system 100 according to Embodiment 4, although detailed description is omitted herein, switching of output sources of images from the PDP 101 to the computer 104 or the video player 108 and the like and adjustment of volume can be operated with a remote control unit, and the reference numeral 608 corresponds to a remote control light receiving section for receiving light from a remote control unit.

Designated at the reference numeral 609, on the rear side of the panel section 601 shown in FIG. 24, is a handle for moving the display board system 100. 610 is a control panel for setting brightness and contrast or the like of the PDP 101, and 611 is an angle adjusting lever for adjusting the angle of the panel section 601 described later. Furthermore, a connector panel for connecting the computer 104 or video player 108 and the like to the PDP 101 or the controller 103 and the like is provided on the bottom side of the controller accommodating section 602 although it is not shown in the figure.

Namely, an image output cable and an audio output cable for the computer 104 are connected to the PDP 101 through this connector panel, and the computer 104 and the controller 103 are connected to each other through this connector panel. Furthermore, various types of information equipment and AV equipment such as the video player 108 and the like are also connected to the PDP 101 through this connector panel.

The equipment accommodating section 604 of the frame unit 600 comprises computer accommodating section 612 a for accommodating the computer 104 therein. There is a video accommodating section 613 for accommodating various information equipment and AV equipment such as the video player 108, a laser disk player, or a DVD player. A printer accommodating section 614 accommodates the printer 106. The computer accommodating section 612, video accommodating section 613 and printer accommodating section 614 are provided in this order from bottom to top. As described, by arranging the devices in the order of the heaviest one to a lighter one from the bottom in the vertical direction, stability of the frame unit 600 at the time of movement and installation thereof can be insured even if there is the board section 601 having the PDP 101 and coordinate-position input device 102 in the upper side. Although an accommodating section for accommodating the scanner 105 shown in FIG. 21 is not provided in the equipment accommodating section 604, the accommodating section for the scanner 105 may be provided therein on condition that the devices are arranged in the order of the heaviest one at the bottom and the lighter ones at the top of the heavier ones.

The computer accommodating section 612 has doors on both sides thereof, through which a floppy disk and a CD-ROM can be inserted thereinto. The video accommodating section 613 has a door on the front side thereof, through which a video tape or a laser disk and the like can be inserted into. Furthermore, the printer accommodating section 614 has a door on the front side thereof, through which a printer can be operated, and there is a place on this door so that a pen (not shown in the figure) used for touching the touch surface 201 of the coordinate-position input device 102 can be accommodated therein. In addition, the rear surface of the printer accommodating section 614 is not covered with the frame, therefore, the printer 106 can be accommodated such that a paper feed tray is positioned in the outside of the frame unit 600 (Refer to FIG. 25), and operability can be enhanced.

It should be noted that, in the front side of the equipment accommodating section 604 shown in FIG. 23, the reference numeral 615 indicates a keyboard base for placing thereon a keyboard 503 for the computer 104 so that it can be used at any time. Further, the reference numeral 616 indicates casters for moving the display board system 100 with the entire frame unit 600. Designated at the reference numeral 617, in the rear surface of the equipment accommodating section 604 shown in FIG. 24, is a power tap for supplying power to the PDP 101, the controller 103, and the computer 104. 618 is a cable guide for wiring various cables, and 619 is a main power switch for the display board system 100.

As described above, by accommodating the display board system 100 in the frame unit 600, the display board system 100 can easily be moved and installed only by moving the frame unit 600. Furthermore, stability of the frame unit 600 when it is moved and installed can be insured because the devices are arranged in the order of the heaviest one to a lighter one from the bottom in the direction of gravity (vertical direction) in the equipment accommodating section 604 of the frame unit 600.

Furthermore, taking into consideration that, for instance, light of a fluorescent tube directly enters the display surface of the PDP 101, which may cause an image appearing on the PDP 101 to be difficult to be seen, an angle adjusting mechanism section for adjusting an angle of the board section 601 (a display surface and a write-in surface of a display board) is provided in the frame unit 600 described above. An example of configuration of this angle adjusting mechanism section is described below.

Figure 25:
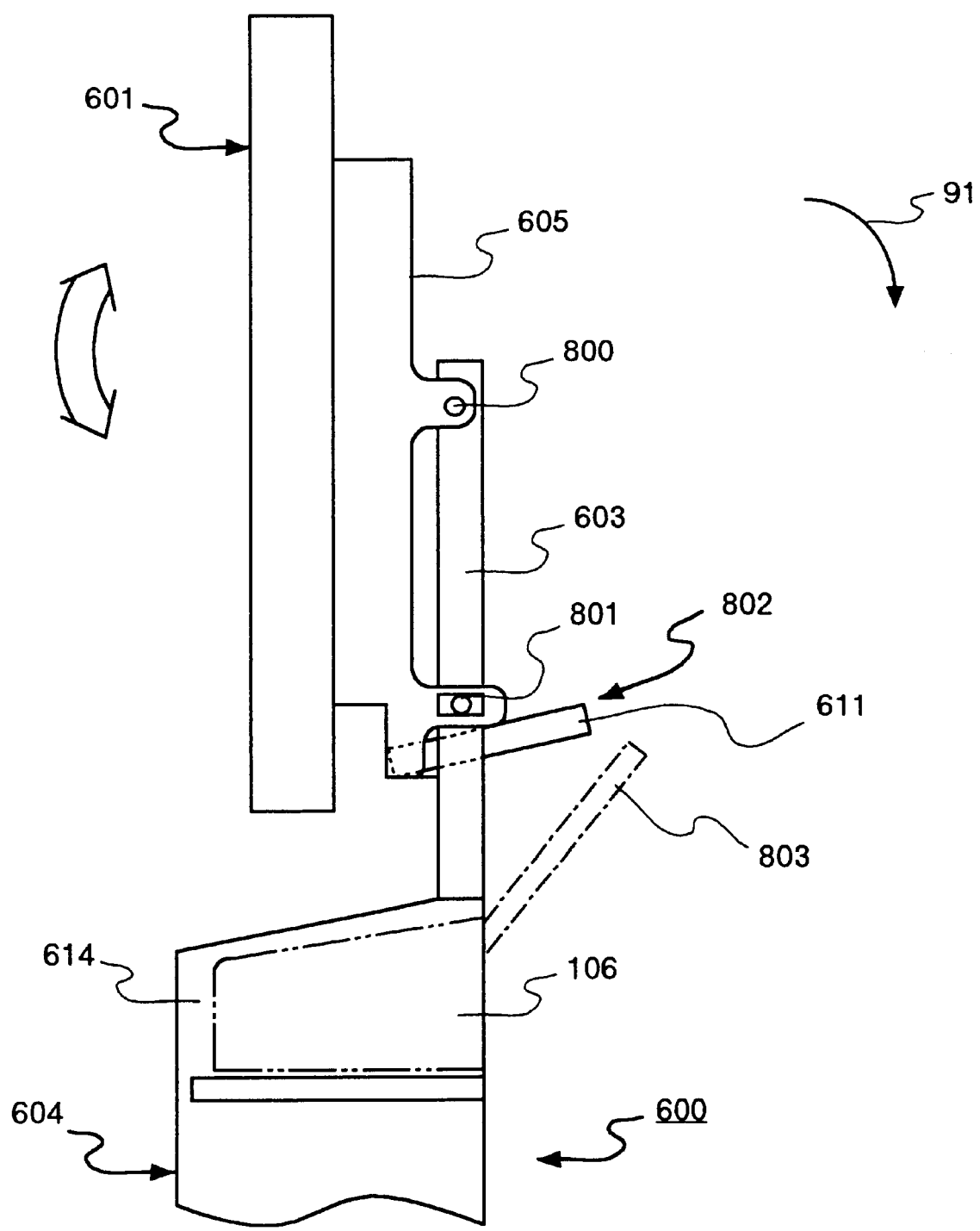
FIG. 25 is a side view of the frame unit according to Embodiment 4 of the present invention viewed from the right side thereof.

FIG. 25 is a side view of the frame unit 600 viewed from the right side thereof. In FIG. 25, the reference numeral 800 indicates a pivotal supporting point, and the reference numeral 801 indicates a pivotal guide. The board section 601 is pivotally mounted on the stand 603 existing on both sides of the frame unit 600 around the pivotal supporting point 800 through the stay 605. Namely, the board section 601 can be rotated in the direction indicated by the arrow q1 in FIG. 25 around the pivotal supporting point 800 just like nodding so that an angle at which light of a fluorescent tube is not reflected into the PDP 101 can be adjusted. Herein the pivot guide 801 restricts the angle of the board section 601 pivoting around the pivotal supporting point 800, and the angle adjusting lever 611 pivots the board section 601 through a mechanism described later to adjust an angle thereof.

In Embodiment 4, it is assumed that the angle of the board section 601 can be adjusted in a range from zero degree (the board section 601 in an upright position) to five degrees (the board section 601 in a downward-slanting position) by operating of the angle adjusting lever 611. It is also assumed that the angle adjusting mechanism section 802 comprises the pivotal supporting point 800, pivot guide 801, angle adjusting lever 611, and each component member described below.

It should be noted that, in FIG. 25, the reference numeral 803 indicates a tray of the printer 106 that is accommodated in the printer accommodating section 614. As shown in FIG. 25, the angle adjusting lever 611 for adjusting an angle of the board section 601 is provided at such a position that it does not hinder the feeding of recording paper to the tray 803.

Figure 26:
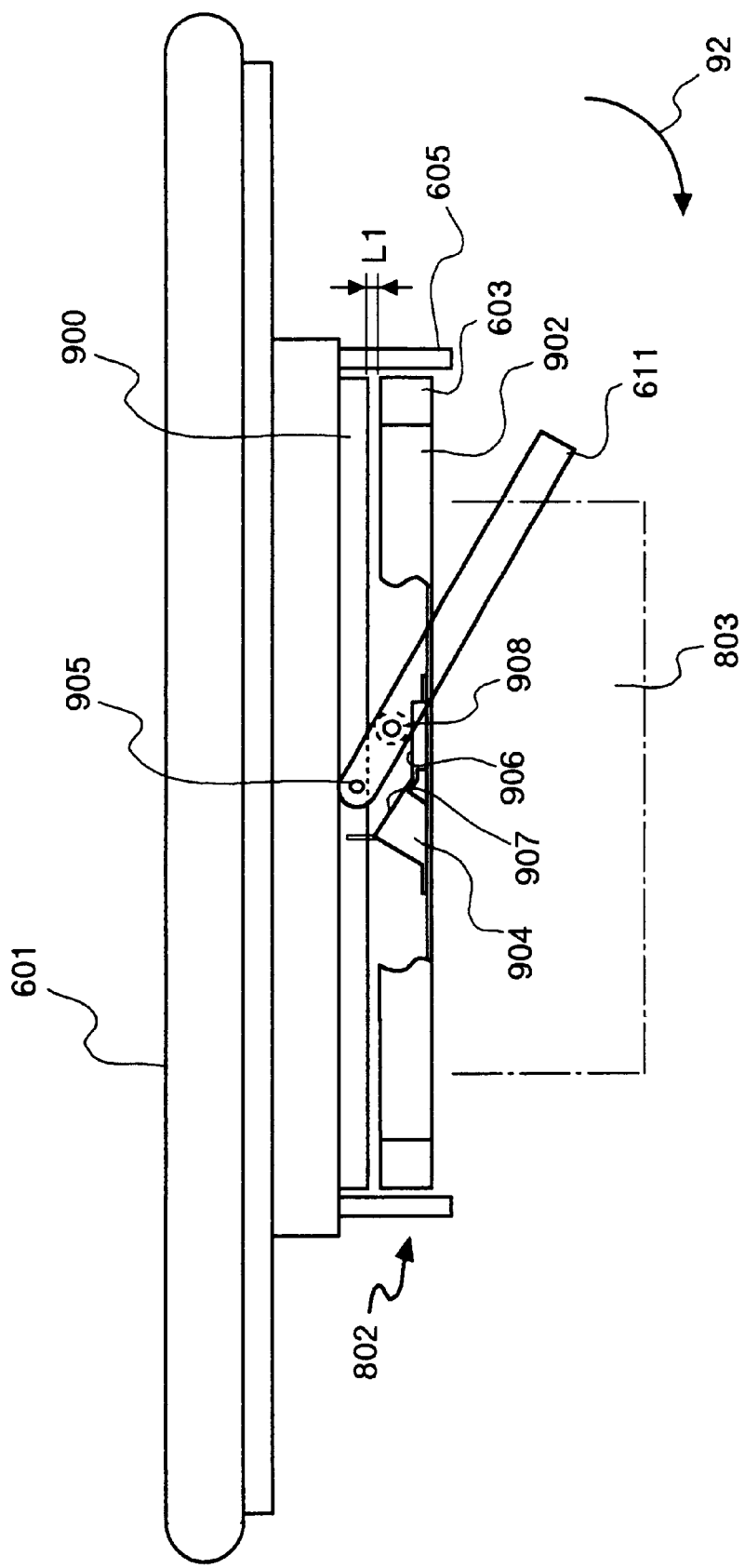
FIG. 26 shows the configuration of an angle adjusting mechanism section according to Embodiment 4 of the present invention viewed from the upper side of the frame unit (angle of the board section is five degrees)
Figure 27:
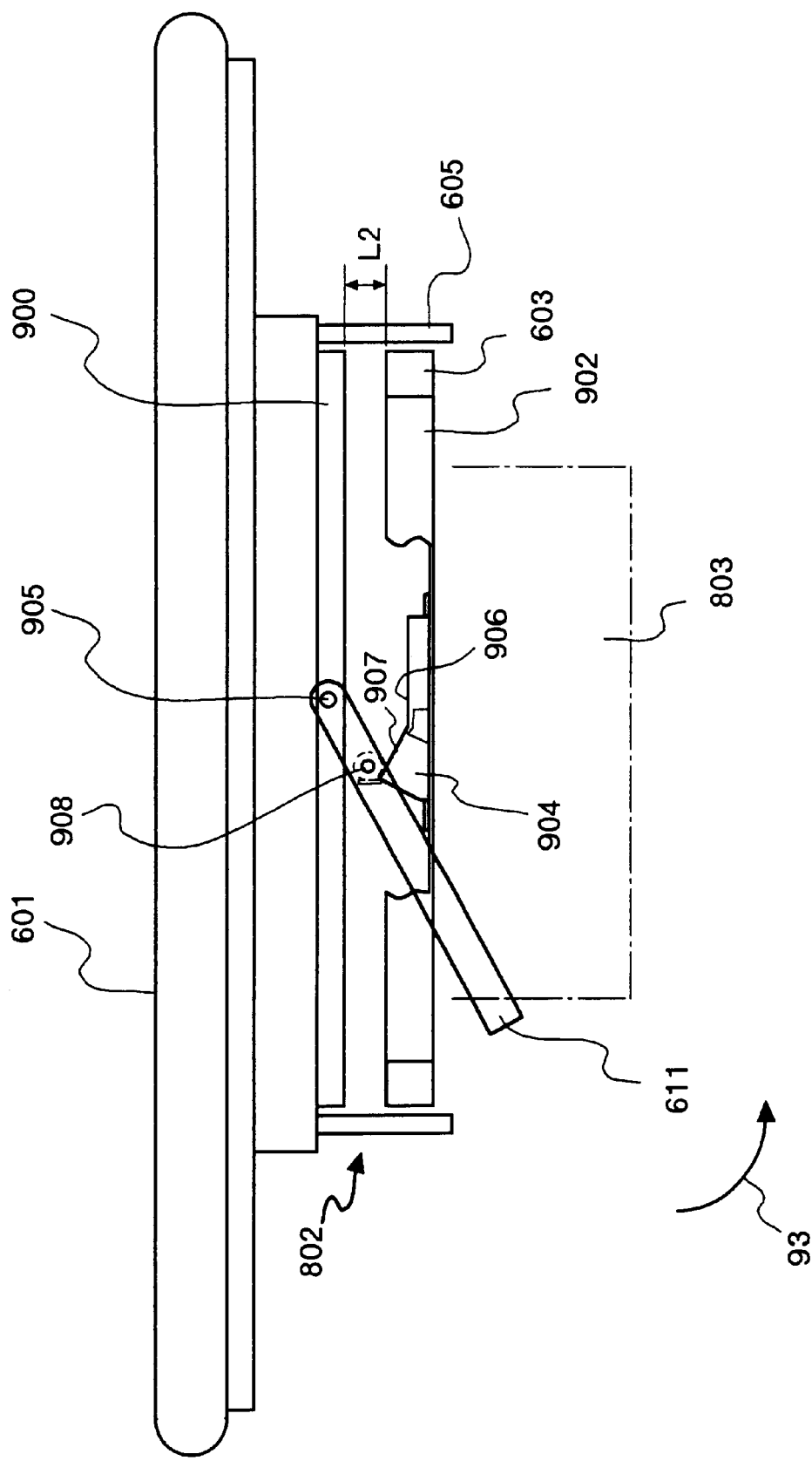
FIG. 27 shows the configuration of the angle adjusting mechanism section according to Embodiment 4 of the present invention viewed from the upper side of the frame unit (angle of the board section is zero degree)
Figure 28:
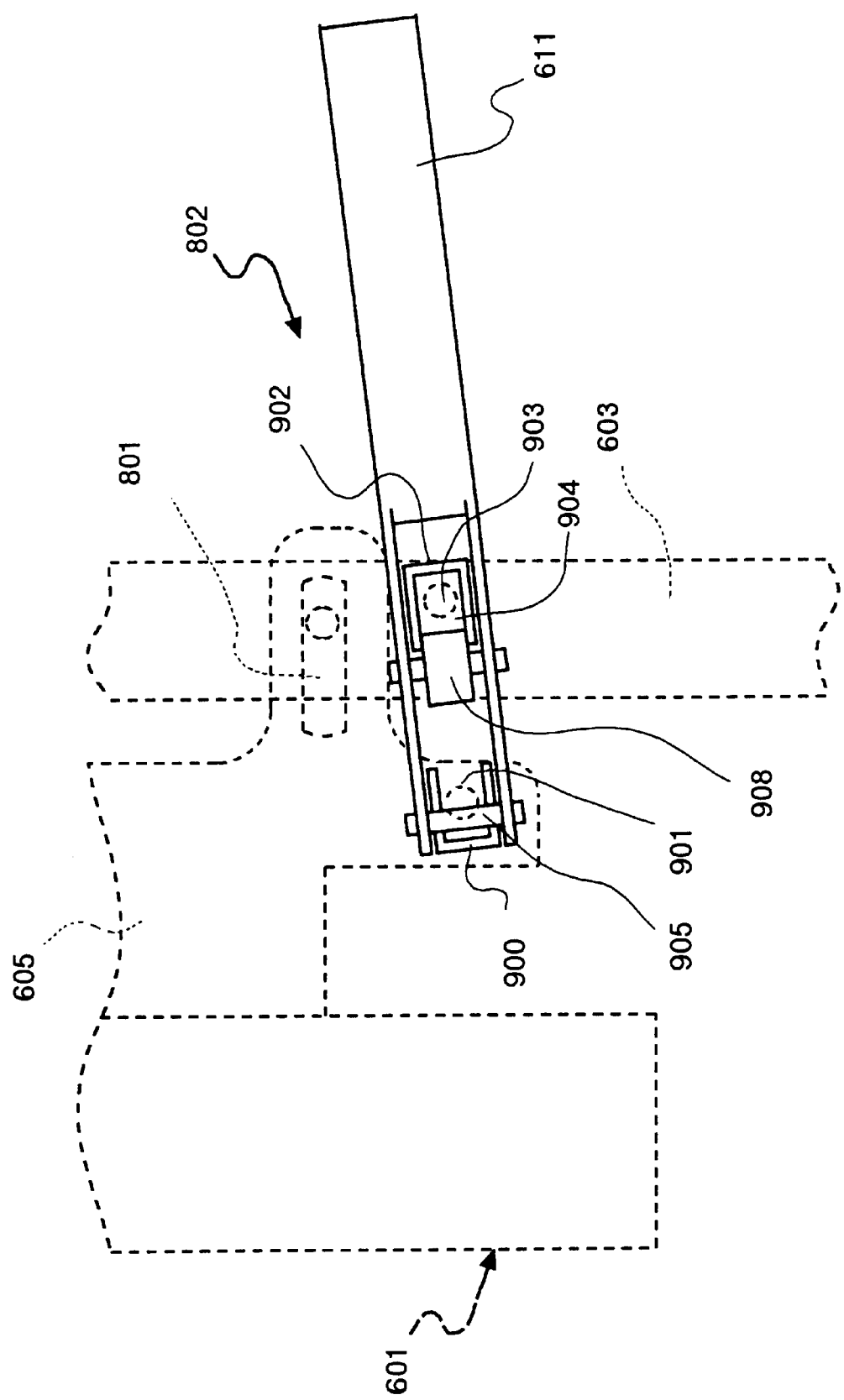
FIG. 28 shows the configuration of the angle adjusting mechanism section according to Embodiment 4 of the present invention viewed from the side of the frame unit.

FIG. 26 and FIG. 27 are view showing configuration of the angle adjusting mechanism section 802 viewed from the upper side thereof. FIG. 26 shows the board section 601 positioned at an angle of five degrees and FIG. 27 shows the board section 601 positioned at an angle of zero degree. Furthermore, FIG. 28 is a view showing configuration of the angle adjusting mechanism section 802 shown in FIG. 26 and FIG. 27 viewed from the side thereof. FIG. 28 corresponds to the board section 601 shown in FIG. 27 positioned at an angle of zero degree.

In FIG. 26 to FIG. 28, the reference numeral 900 indicates a PDP angle pivotally mounted between the stays 605 with a PDP supporting point 901. The reference numeral 902 indicates a stand stay pivotally mounted between the stands 603 with a stand supporting point 903 and with a lever bearer 904 used for angle adjustment of the board section 601 together with the angle adjusting lever 611 mounted thereon.

The angle adjusting lever 611 has such a shape that it can sandwichably hold the PDP angle 900 and the stand stay 902 therebetween and is pivotally mounted on a lever supporting point 905 in the side of the PDP angle 900. In addition, provided in the angle adjusting lever 611 is a bearing 908 contacting a flat section 906 as well as a slant section 907 of the lever bearer 904 mounted on the stand stay 902 for rotating in association with pivot of the angle adjusting lever 611.

Herein, it is assumed that the angle adjusting mechanism section 802 is in a state shown in FIG. 26 and the board section 601 is positioned at an angle of five degrees. When a user operates the angle adjusting lever 611 to the left direction (to the direction indicated by the arrow q2 in the FIG. 26), the angle adjusting lever 611 pivots around the lever supporting point 905, the bearing 908 of the angle adjusting lever 611 moves along the flat section 906 of the lever bearer 904 in association with the pivot and also moves upward along the slope of the slant section 907, and as a result, a force that pushes the PDP angle 900 forward is generated. Namely, the lever bearer 904 is fixed to the stand 603 through the stand stay 902, and the PDP angle 900 is mounted on the stays 605 pivotally supporting the board section 601 at the pivotal supporting points 800 and the pivot guides 801, therefore, the board section 601 can pivot together with the PDP angle 900 (the lower edge of the board section 601 can be pushed forward) by operating the angle adjusting lever 611.

Through this operation of the angle adjusting lever 611, the angle adjusting mechanism section 802 is changed from the state shown in FIG. 26 to that shown in FIG. 27, and the angle of the board section 601 can be changed from five degrees to zero degree. Namely, as shown in FIG. 26 and FIG. 27, by increasing the distance between the PDP angle 900 and the stand stay 902 from L1 to L2, the angle of the board section 601 can be changed from five degrees to zero degree.

Similarly, when a user operates the angle adjusting lever 611 from the state shown in FIG. 27 to the right direction (in the direction indicated by the arrow q3 in the FIG. 27), the angle of the board section 601 can be changed from zero degree to five degrees.

It should be noted that the angle of the angle adjusting lever 611 shown in FIG. 28 is changed in association with changing of the angle of the board section 601 although it is not shown in the figure. However, each of the PDP angle 900 and the stand stay 902 is pivotally fixed, therefore, both of these sections are not affected even by a change in the angle of the board section 601.

Figure 29:
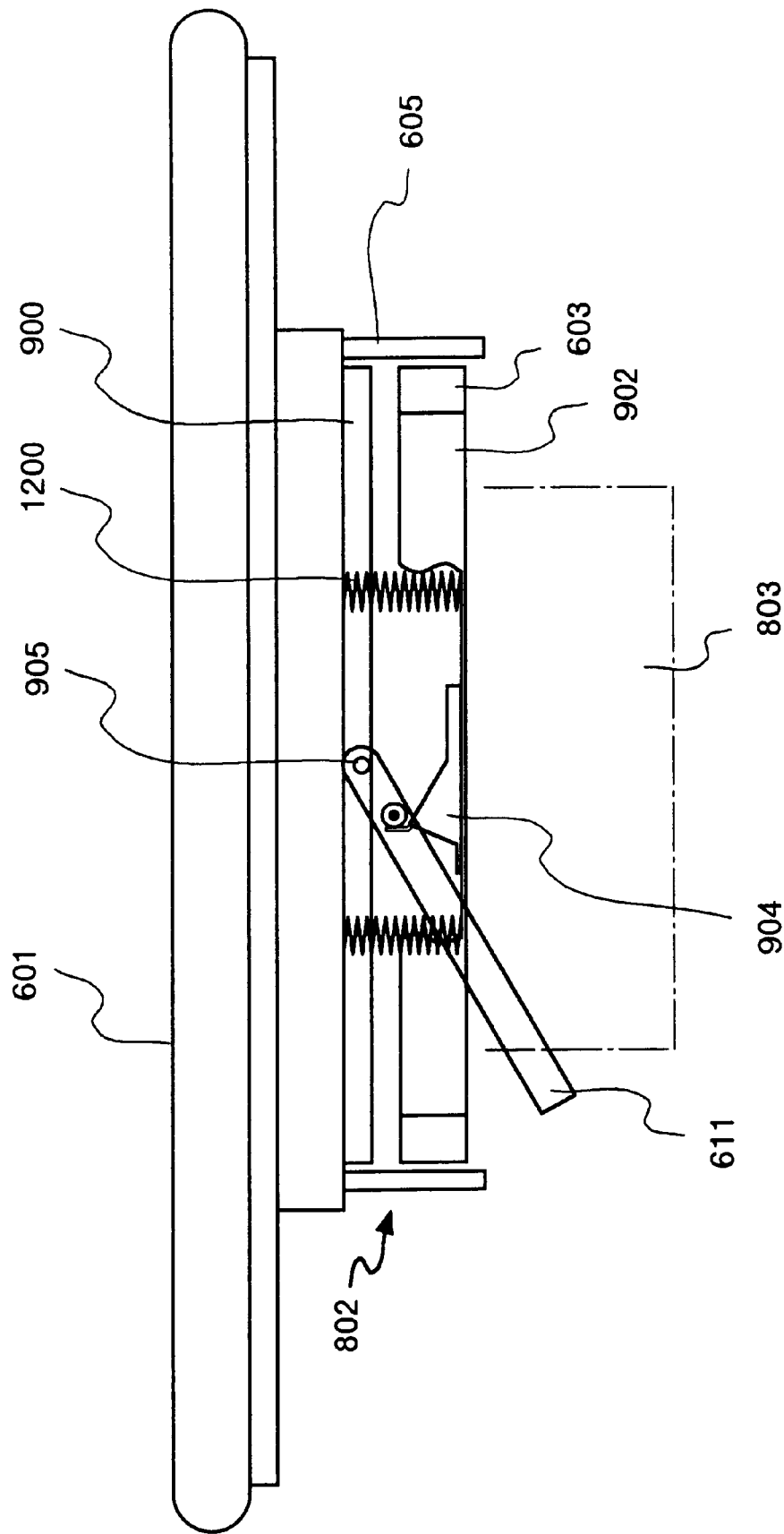
FIG. 29 shows modification of the angle adjusting mechanism section according to Embodiment 4 of the present invention.

As shown in FIG. 29, by providing one or a plurality of springs 1200 between the PDP angle 900 and stand stay 902, operability of the angle adjusting lever 611 can be enhanced. This configuration is obtained based on the consideration that the operation of the angle adjusting lever 611 may be heavy depending on the weight of the board section 901 and the length of the angle adjusting lever 611. Therefore, number of springs 1200 and their force are adjusted according to the weight of the board section 601, which allows operability to be further enhanced.

Also the lever bearer 904 is fixed to the stand stay 902 with, for instance, a screw, and a hole (not shown) on the stand stay 902 into which the screw is put is preferably a rectangular hole. As a result, a fixing position of the lever bearer 904 can be changed to meet the user's need, therefore, an adjustable range of an angle of the board section 601 can be changed.

Figure 30:
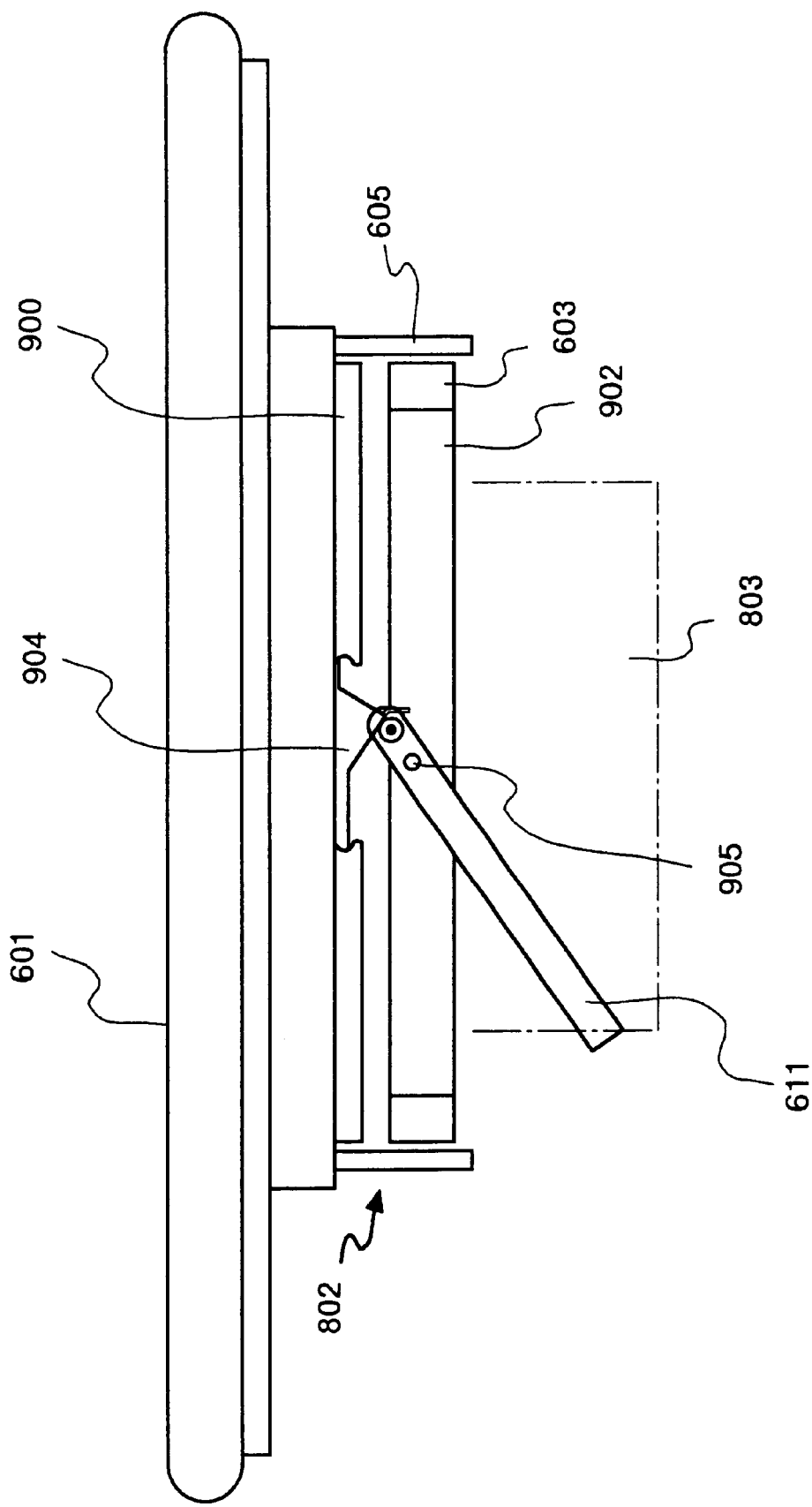
FIG. 30 shows another modification of the angle adjusting mechanism section according to Embodiment 4 of the present invention.

Furthermore, even when the lever bearer 904 is provided on the PDP stay 900 as shown in FIG. 30 with the lever supporting point 905 provided on the stand stay 902 and the configuration is reverse to that of the angle adjusting mechanism section 802 shown in FIG. 26 to FIG. 29, the angle of the board section 601 can also be adjusted.

The configuration of the angle adjusting mechanism section 802 described above is only one of the examples, and it is clear that various designs and modifications are possible. For example, a component member of the angle adjusting lever 611 may be provided in the upper side of the board section 601 and the pivotal supporting point 800 and the pivot guide 801 may be reversibly positioned.

As described above, by providing an angle adjusting mechanism section 802 for adjusting an angle of the board section 601 in the frame unit 600, incoming interference light into the PDP 101, especially, light from lighting equipment such as a fluorescent tube provided on the ceiling can be avoided. Therefore, an image on the screen can easily be seen and convenience of the display board system 100 can be improved.

2. Operation

Next, description is made for an operation of the display board system 100 having the same configuration as described above in the order of:

(1) Outline,
(2) Case of using the system as a display board,
(3) Case of using the system as a computer,
(4) Adjustment of a coordinate-position input device,
(5) Use of AV equipment, and
(6) Connection to a network.

(1) Outline

The display board system 100 according to Embodiment 4 can be considered as a communication tool applicable to a conference, a meeting or similar occasions by merging the PDP 101 having a large-sized screen with the coordinate-position input device 102, and enabling free write-in onto a large-sized screen such as a projector with a fingertip or a pen and clear view of computer data thereon.

More specifically, when a user writes characters and draws graphics on the touch surface 201 of the coordinate-position input device 102 with a user's fingertip or a pen, the characters and graphics can be displayed on the PDP 101 as they are. Furthermore, a screen of word processor or spreadsheet program may be captured, and it is possible to write characters and graphics onto the captured screen and underline a part of the written data on the screen with a pen tool.

In the system, a screen displayed on the PDP 101 is set to one page, and written information is managed as page units, therefore editing processing such as displaying a list of whole pages, sorting the pages, adding pages thereto, and deleting pages therefrom can be performed. Each created page can be saved as a file, and used by calling it any number of times when a conference on the same subject is held several times. The called file can be processed, and the called file can be reused for preparing a new material.

A file prepared using a presentation software on other computer may be read in through the network 107, and a presentation can also be performed using the read-in file. As presentation can be performed using data in a file, an OHP film required for presentation using a projector is not needed. As described above, during the presentation, marking can be made onto certain data using the coordinate-position input device 102 on the screen on which any file prepared with the presentation software is open, therefore more effective presentation can be carried out.

Furthermore, the system is applicable as an ordinary computer, and can also be utilized for an educational activity on a computer operating method or the like using the large-sized PDP 101.

(2) Case of Using the System as a Display Board

Description is made hereinafter for the case of using the display board system 100 as a display board in the order of:

1) Display board software,
2) Write-in of freehand characters and graphics,
3) Deletion of freehand characters and graphics,
4) Drawing of graphics,
5) Creation of a new page,
6) Operation for opening a previously prepared file,
7) Operation for capturing a screen of word processor, a spreadsheet program, or presentation software,
8) Operation for displaying pages in creation in a list form,
9) Operation for saving created pages,
10) Printing, and
11) Other.

1) Display Board Software

The display board system 100 can be operated as a display board by executing the display board software 506 shown in FIG. 22 using the CPU 500. This display board software 506 is one of the application programs operating under the control by the OS 505 in the same manner as the various types of application program 508 such as the word processor and the spreadsheet program or the like. In Embodiment 4, it is preferable from the viewpoint of workability to set the sequence of execution of the program such that, in response to turning ON the main power switch 619 of the system shown in FIG. 24, the OS 505 is started and then the display board software 506 is immediately started. However, the next sequence may be allowable in which a desktop screen provided by the OS 505 is displayed on starting the system, one of the icons appearing on the desktop screen is selected, and the display board software 506 is started.

Figure 31:
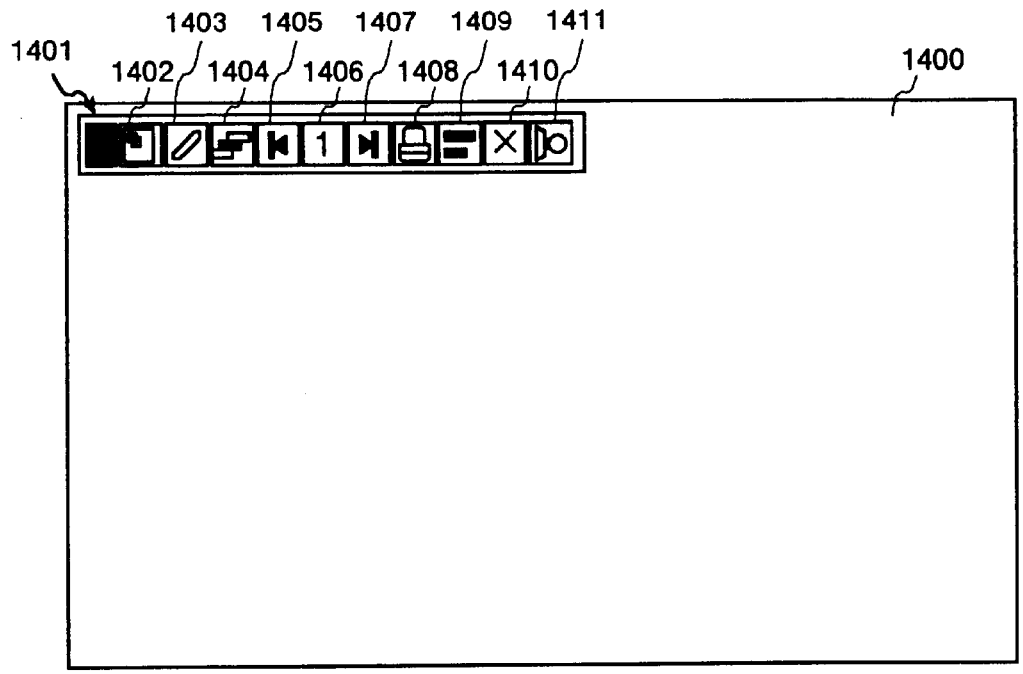
FIG. 31 shows an example of the screen of the display board and a toolbar displayed on the PDP in the display board system according to Embodiment 4 of the present invention.

When the display board software 506 is started, a display board screen 1400 as shown in FIG. 31 appears on the PDP 101. This display board screen 1400 corresponds to, for instance, a write-in surface of a whiteboard. When a user draws characters and graphics with his or her fingertip or a pen on the touch surface 201 of the coordinate-position input device 102 positioned in the front side of the PDP 101 that displays this display board screen 1400, the characters and graphics created by the user on the touch surface 201 appear on the display board screen 1400 of the PDP 101 through the coordinate-position input device 102, controller 103, and computer 104 as they are as if the characters and graphics were created on a whiteboard with a pen.

The display board software 506 is designed so as to manage information in units of pages, and the display board screen 1400 corresponds to an information write-in area of one page managed by the display board software 506. A user can create a plurality of pages by operating the display board software 506, and an arbitrary page of the pages can be displayed as the display board screen 1400.

Furthermore, the display board software 506 displays a toolbar 1401 including a plurality of buttons corresponding to various operations on the display board screen 1400 as shown in FIG. 31. Description is made herein for an outline of functions assigned to the buttons in the toolbar 1401. It should be noted that, in addition to the toolbar 1401, an extension toolbar (Refer to FIG. 32) and a graphics drawing toolbar (Refer to FIG. 33) are prepared in the toolbar appearing on the display board screen 1400 as described later.

With the computer screen button 1402 a display on the PDP 101 can be switched to a screen for a computer (a desktop screen or a screen for other application program).

With the pen button 1403 characters and lines can be drawn freehand on the PDP 101 (use of a pen tool is specified).

With the eraser button 1404 characters and lines drawn freehand can be deleted.

With the previous page button 1405 a previous page can be displayed.

In the page number window 1406 a page number of a page currently displayed as a display board screen 1400 is displayed.

With the next page button 1407 a next page can be displayed.

With the print button 1408 a page or pages in creation can be printed.

With the thumbnail button 1409 pages constituting a file in preparation can be displayed in a list form.

With the end button 1410 the display board software 506 can be terminated.

Figure 32:
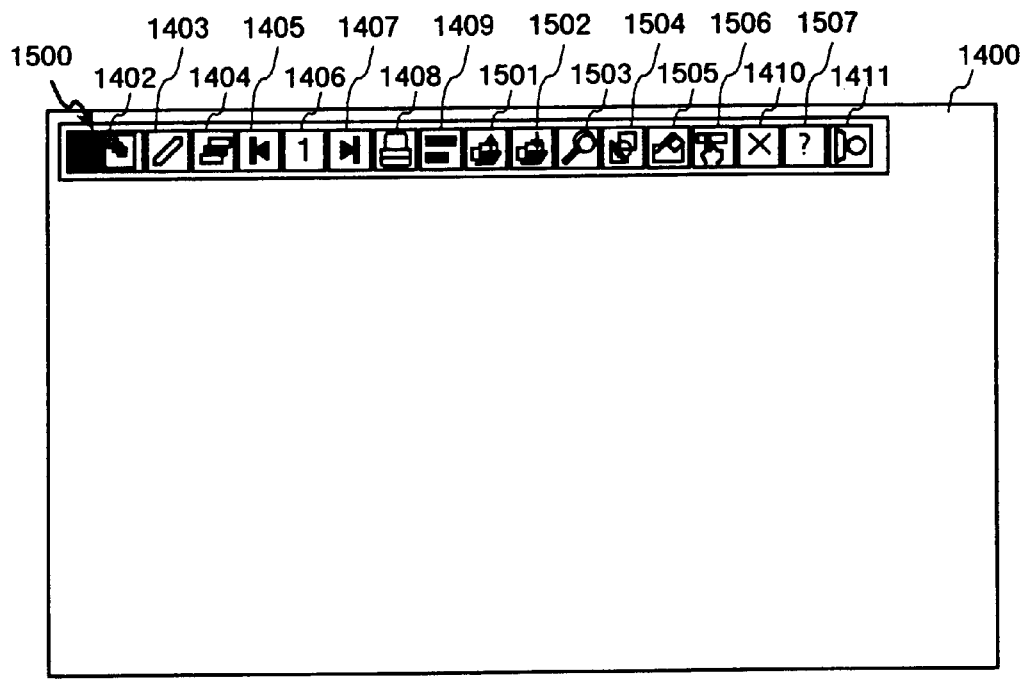
FIG. 32 shows an example of an extension toolbar displayed on the PDP in the display board system according to Embodiment 4 of the present invention.

With the extension button 1411 the extension toolbar 1500 shown in FIG. 32 can be displayed. When the extension button 1411 in the extension toolbar 1500 is touched, the extension toolbar is returned to the toolbar 1401 shown in FIG. 31.

The functions assigned to the buttons in the extension toolbar 1500 that is displayed when the extension button 1411 is touched will be described with reference to FIG. 32. It should be noted that, the same reference numerals are assigned to the buttons corresponding to those in the toolbar 1401 shown in FIG. 31 and description thereof is omitted herein.

With the file button 1501 a new page or a previously prepared file can be opened.

With the save button 1502 a currently prepared file is saved.

With the display button 1503 switching to any of thumbnail display, full display, or to window display, and zoom (enlarged) display can be set.

Figure 33:
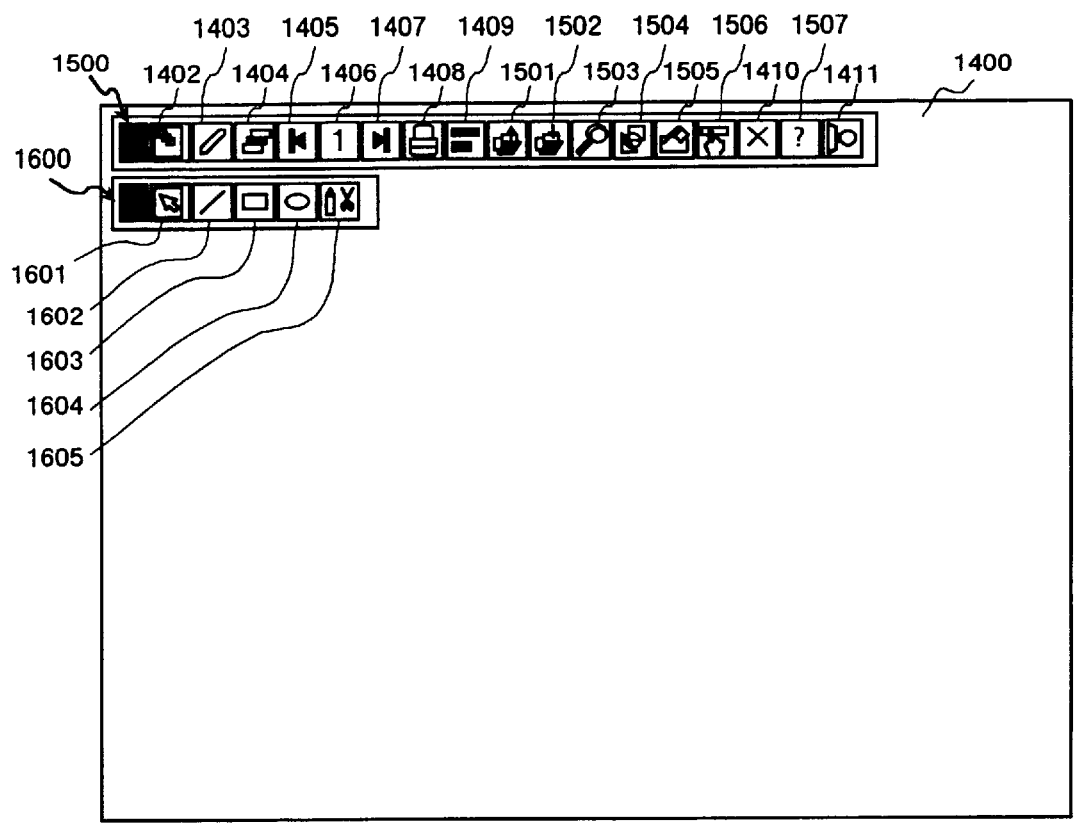
FIG. 33 shows an example of a drawing toolbar together with the extension toolbar displayed on the PDP in the display board system according to Embodiment 4 of the present invention.

With the graphics drawing button 1504 the graphics drawing toolbar 1600 shown in FIG. 33 is displayed, and lines, rectangles, ellipses can be created (Use of Graphics drawing tool is specified). Each button in the graphics drawing toolbar 1600 is described later.

With the background setting button 1505 a background color of the display board screen 1400 displayed on the PDP 101 can be set.

With the option button 1506 display of the display board software 506 when power is ON and processing is ended and insertion of a page when other screen is captured can be set, which is described later. Furthermore, change of work folders can be set.

With the help button 1507 a help screen with operations and instruction of functions described thereon can be displayed.

Furthermore, functions assigned to buttons in the graphics drawing toolbar 1600 displayed when the graphics drawing button 1504 is touched will be described with reference to FIG. 33.

With the select button 1601 when created graphics is to be edited, that graphics to be edited can be selected.

With the line button 1602 a line can be drawn.

With the rectangle button 1603 a rectangle can be drawn.

With the ellipse button 1604 an ellipse can be drawn.

With the edit button 1605 created graphics can be edited.

It should be noted that, in the display board software 506, it can be found which of the buttons a user has touched according to positional information for coordinates inputted from the controller 103.

Also the user may touch a specified position of each of the toolbars shown in FIG. 31 to FIG. 33 with his fingertip and moves the fingertip as it is, in order to move the toolbar to a desired place.

Furthermore, the display board screen 1400 shown in FIG. 31 is displayed on the whole display area of the PDP 101 in a display format so-called full screen display. The user touches the display button 1503 in the extension toolbar 1500 and carries out a specified operation, and the display board screen 1400 can be switched to window display. Furthermore, as the display board software 506 is one of the application programs operating on the OS 505, by touching the computer screen button 1402 in the toolbar 1401 (or extension toolbar 1500) as described later, the display of the PDP 101 can easily be switched from the display board screen 1400 to a desktop screen or a display screen of the word processor or the like.

Furthermore, an operation of the coordinate-position input device 102 (touch the touch surface 201) may be performed with any tool, in addition to a fingertip and a pen, on condition that it can block a light beam. Therefore, even if expression of, for instance, "touch with a fingertip" is found in the description below, the same operation can be carried out by touching the touch surface with a pen or some other object.

2) Write-in of Freehand Characters and Graphics

Description is made for various operations using the display board software 506 one after another. Herein, description is made for a method of writing in characters and drawing a freehand graphics.

Figure 34:
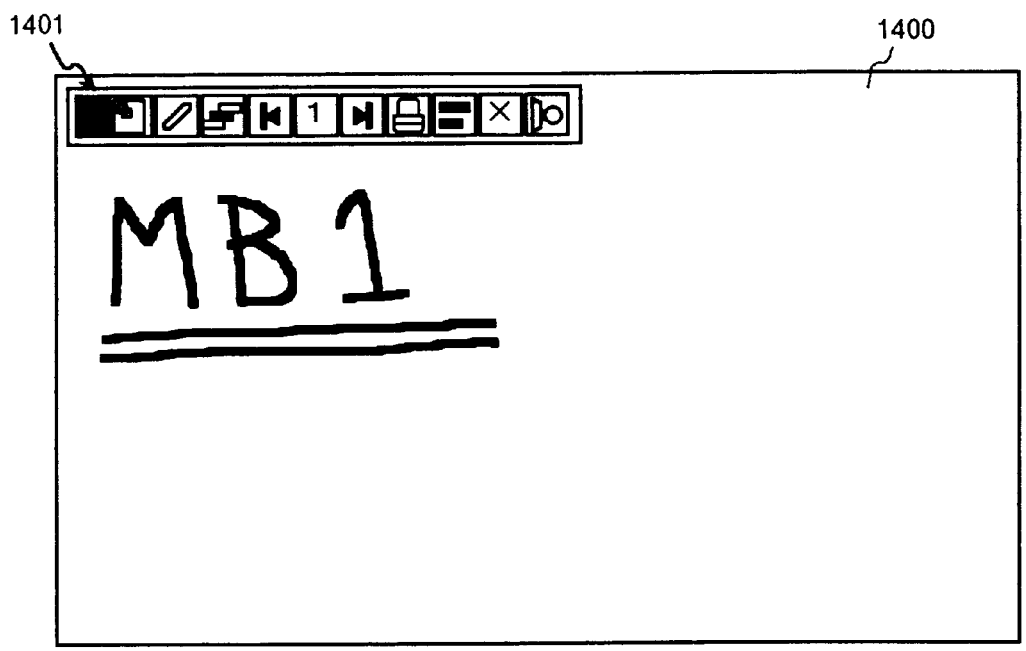
FIG. 34 shows an example of how a result of freehand characters and lines on the touch surface is displayed on the screen of the display board on the PDP in the display board system according to Embodiment 4 of the present invention.

Prepared in the display board software 506 is a pen tool for writing characters and drawing freehand graphics on the display board screen 1400 using a user's fingertip just like a real pen. This pen tool is made available when a user touches the pen button 1403 in the toolbar 1401 (or extension toolbar 1500). The user writes a character or a line with his fingertip on the touch surface 201 as when a character is written freehand on a blackboard or a whiteboard, which makes it possible to display the corresponding character and line on the display board screen 1400. In a case of this pen tool, the user's fingertip works like a real pen, and it is also possible to set characters which can be written with the fingertip, a color of graphics and a thickness of a line. FIG. 34 is an explanatory view showing one example of how a result of writing characters and lines freehand is displayed on the display board screen 1400 on the PDP 101.

Herein, simple description is made for processing of displaying a character on the display board screen 1400 with reference with FIG. 21 and FIG. 22. When the user writes a character with his fingertip on the touch surface 201, a flux of light on the touch surface 201 is blocked. As a result, the controller 103 can obtain positional information for coordinates corresponding to a trail of the fingertip according to reduction of the light intensity, and the obtained positional information for coordinates is successively inputted into the computer 104. In the computer 104, the display board software 506 and the OS 505 generate drawing information for drawing a line with the preset color and thickness of the line when receiving the positional information for coordinates from the controller 103, and write the generated information in a video memory (not shown) of the graphics board 510 matching a position of corresponding coordinates. The graphics board 510 transmits an image signal to the PDP 101 according to the contents of the video memory, and provides controls for the processing of displaying the same character as that written on the touch surface 210 by the user on the PDP 101.

In simple words, the computer 104 recognizes the coordinate-position input device 102 and the controller 103 as a pointing device such as a mouse, therefore, the same processing as that when a character is written with a mouse on the drawing software is executed in the computer 104. It should be noted that, the processing is executed in the steps described above also in the processing for deleting a character and creating graphics described below.

3) Deletion of Freehand Characters and Graphics

Figure 35:
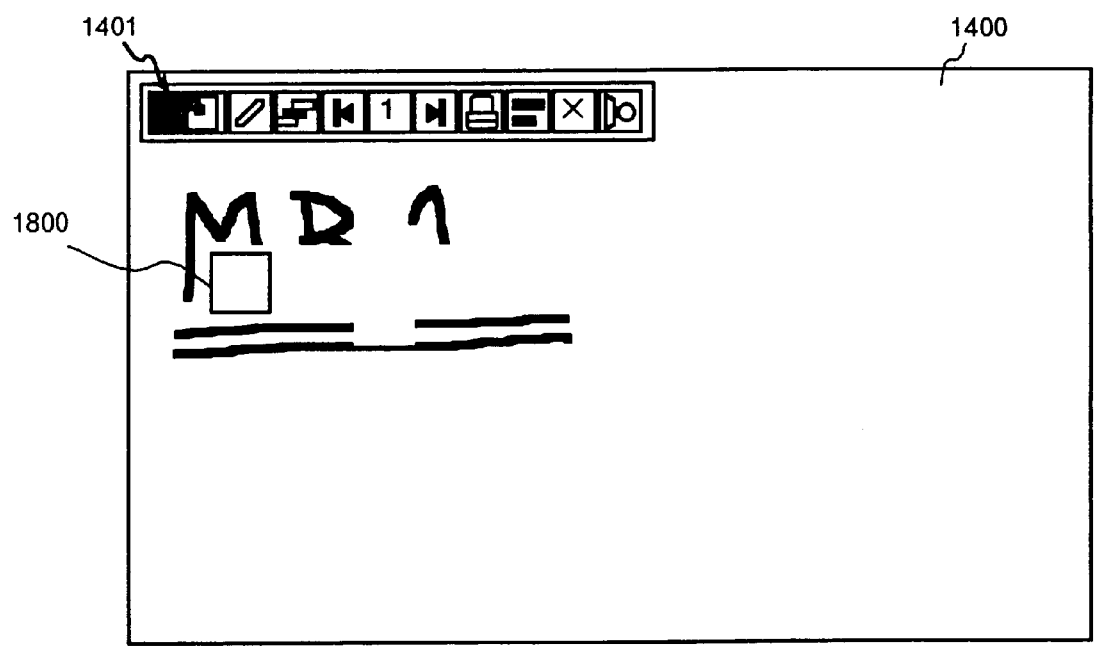
FIG. 35 shows an example of how the freehand characters and lines displayed on the screen of the display board are deleted with an eraser in the display board system according to Embodiment 4 of the present invention.

A user can delete freehand characters written and graphics drawn on the display board screen 1400 like deleting them with an eraser by touching the eraser button 1404. When the eraser button 1404 is touched, the user's fingertip or a pen can be used like a real eraser, and a size of the eraser, namely an area in which characters and graphics are to be deleted in one operation can be set. FIG. 35 is an explanatory view showing how the freehand characters and lines shown in FIG. 34 are deleted with an eraser 1800.

Figure 36:
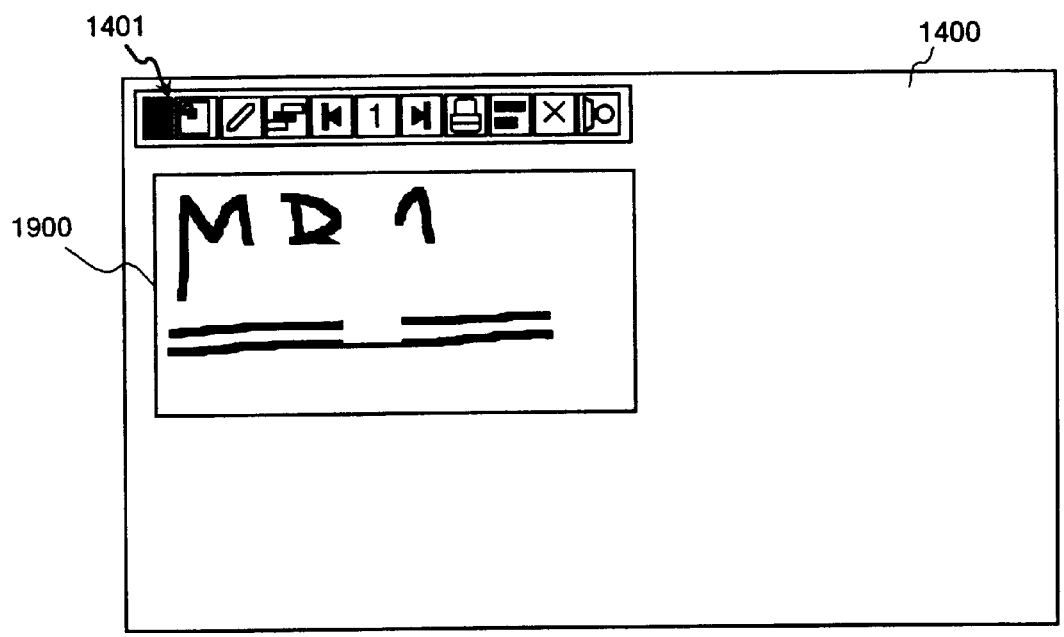
FIG. 36 shows an example of how the freehand characters and lines displayed on the screen of the display board are enclosed with a box and the characters and lines in the box are deleted in one operation in the display board system according to Embodiment 4 of the present invention.

In this mode of deleting freehand characters, as shown in FIG. 36, freehand characters and lines to be deleted may be enclosed with a box 1900 and the characters and lines in the box 1900 may be deleted in one operation (data enclosed and deleted).

4) Drawing of Graphics

In the display board software 506 graphics drawing tools for drawing graphics such as lines, rectangles and ellipses are made available. The graphics drawing tools can be used through the drawing toolbar 1600 shown in FIG. 33. A user touches the extension button 1411 in the toolbar 1400 (Refer to FIG. 31) and gets the extension toolbar 1500 displayed (Refer to FIG. 32), and then touches the graphics drawing button 1504 in the extension toolbar 1500, so that the drawing toolbar 1600 shown in FIG. 33 can be displayed on the display board screen 1400.

① Drawing of a Line

Figure 37:
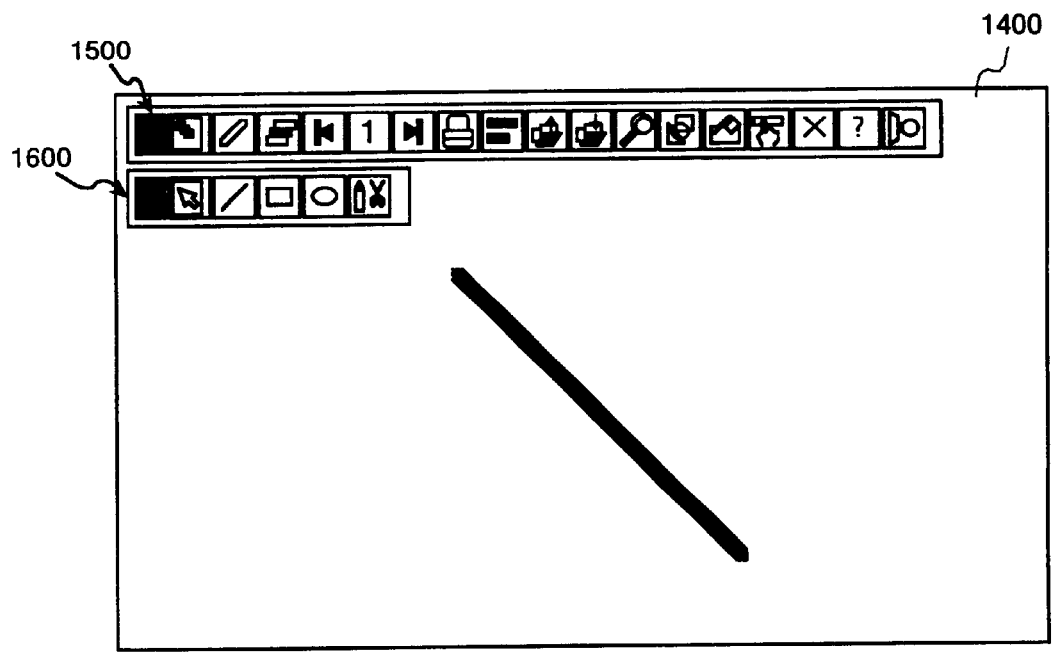
FIG. 37 shows a line drawn on the screen of the display board in the display board system according to Embodiment 4 of the present invention.

When a line is to be drawn, a user may perform operations of touching the line button 1602 in the drawing toolbar 1600 with his or her fingertip, touching an arbitrary place on the touch surface 201 as a starting point of the line with the fingertip, moving the fingertip kept in its state as far as a place which is the end point, and moving the fingertip of f the touch surface 201. As a result, as shown in FIG. 37, a line is created on the display board screen 1400.

② Drawing of a Rectangle

Figure 38:
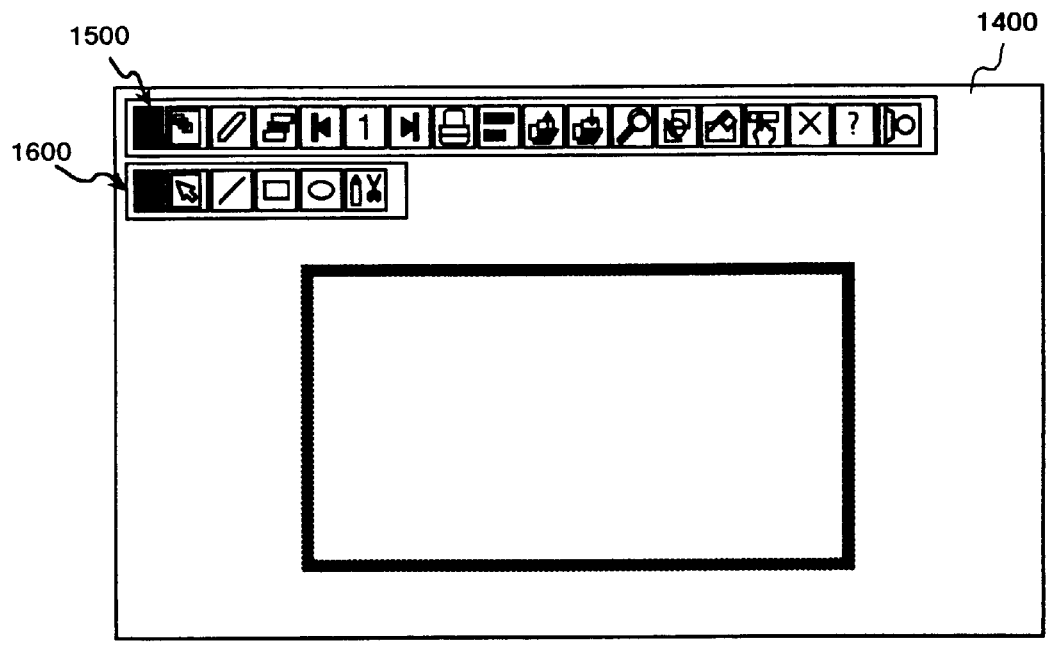
FIG. 38 shows a rectangle drawn on the screen of the display board in the display board system according to Embodiment 4 of the present invention.

When a rectangle is to be created, a user may perform operations of touching the rectangle button 1603 in the drawing toolbar 1600 with his fingertip, touching an arbitrary place on the touch surface 201 with the fingertip, moving the fingertip kept in its state in an arbitrary direction, and moving the fingertip off the touch surface 201. As a result, as shown in FIG. 38, a rectangle is created on the display board screen 1400.

Furthermore, in the display board software 506, a function enabling easy creation of a table using the rectangle created as described above is made available. At first, there is performed setting of touching the background setting button 1505 in the extension toolbar 1500 to display a setting screen (not shown), and displaying a grid on the background of the display board screen 1400. In that case, longitudinal and lateral distance of a grid, and a left-start position and a upper-start position can be specified. In addition, for convenience of use when a table is created with a grid, there is prepared a setting that a created rectangle is displayed so as to match the grid.

Figure 39:
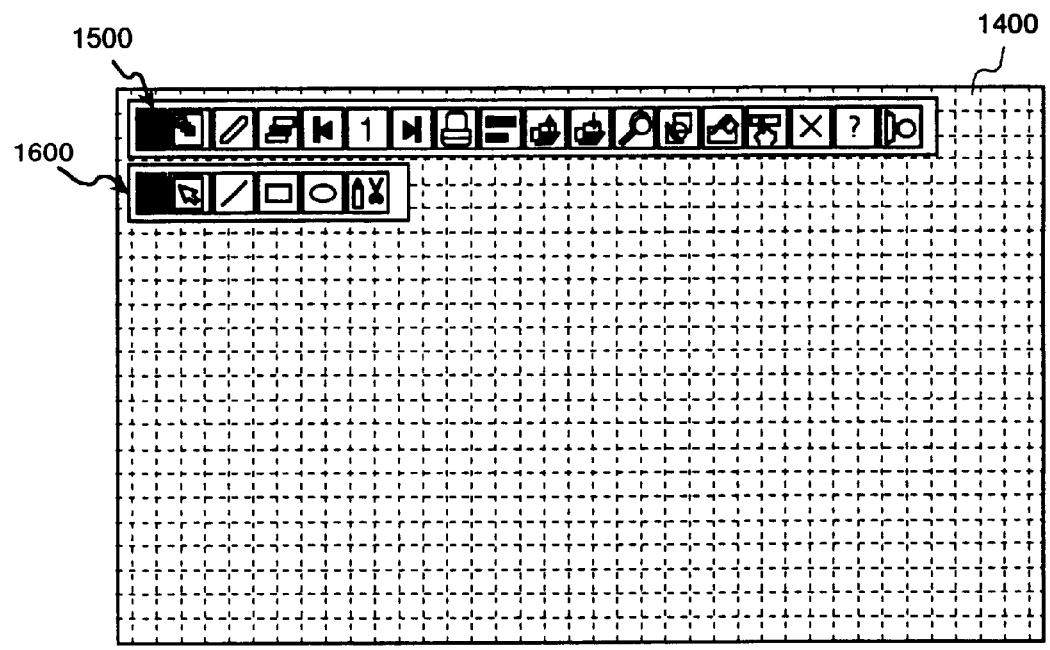
FIG. 39 shows a grid pattern displayed as a background of the screen of the display board in the display board system according to Embodiment 4 of the present invention.
Figure 40:
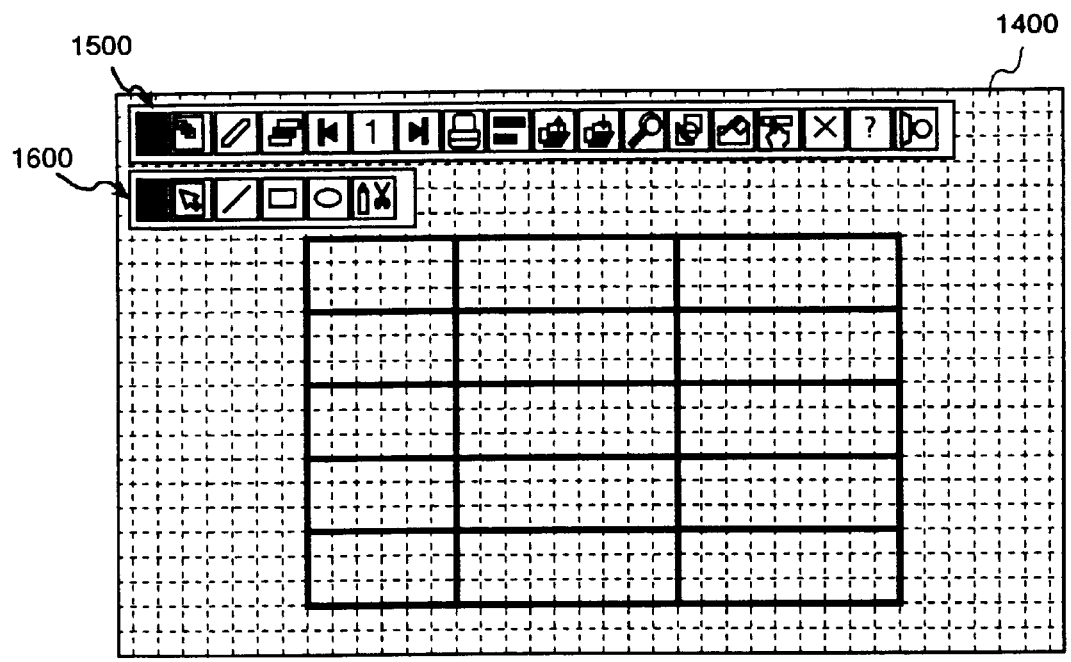
FIG. 40 shows a table created on the screen of the display board in the display board system according to Embodiment 4 of the present invention.

When a setting for the grid is ended, the grid appears on the display board screen 1400 as shown in FIG. 39. By repeatedly drawing a rectangle as described above, the table as shown in FIG. 40 can be created. It should be noted that, if a setting that a created rectangle is displayed so as to match the grid is executed when a grid is to be set, the display board software 506 executes the processing of drawing rectangles along the grid.

③ Drawing of an Ellipse

Figure 41:
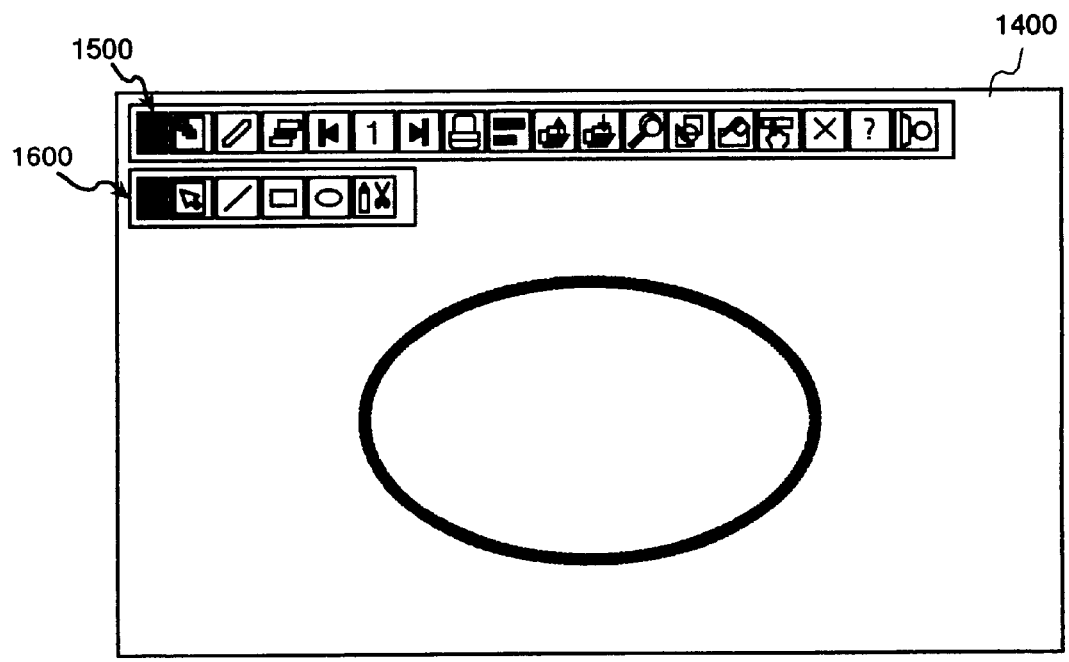
FIG. 41 shows an ellipse created on the screen of the display board in the display board system according to Embodiment 4 of the present invention.

When an ellipse is to be created, a user may perform operations of touching the ellipse button 1604 in the drawing toolbar 1600 with his or her fingertip, touching an arbitrary place on the touch surface 201 with the fingertip, moving the fingertip kept in its state in an arbitrary direction, and moving the fingertip off the touch surface 201. As a result, as shown in FIG. 41, an ellipse is created on the display board screen 1400.

④ Modification of a Created Graphics

Figure 42A:
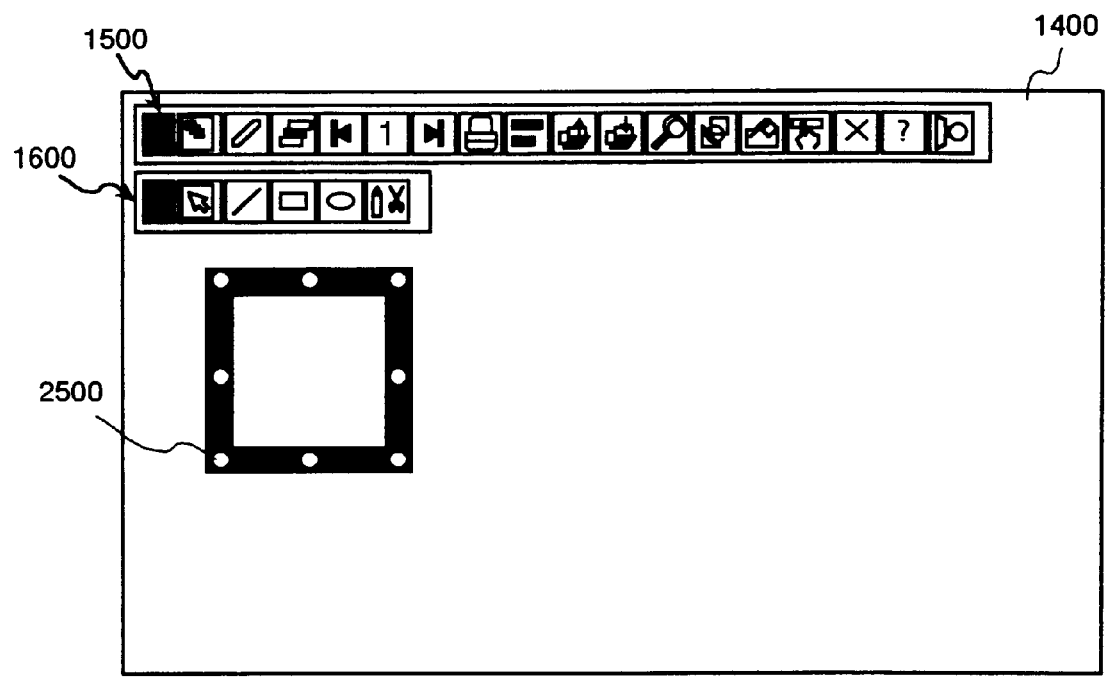
FIG. 42A explains selection of a graphics as an object for modification and FIG. 42B shows the graphics after its modification in the display board system according to Embodiment 4 of the present invention.

When a created graphics is to be modified, a user touches the select button 1601 in the drawing toolbar 1600 with his fingertip, touches any part of a line of the graphics to be modified, and selects the graphics. As a result, as shown in FIG. 42A, a rectangular mark (handle) 2500 surrounding the selected graphics is displayed.

Figure 42B:
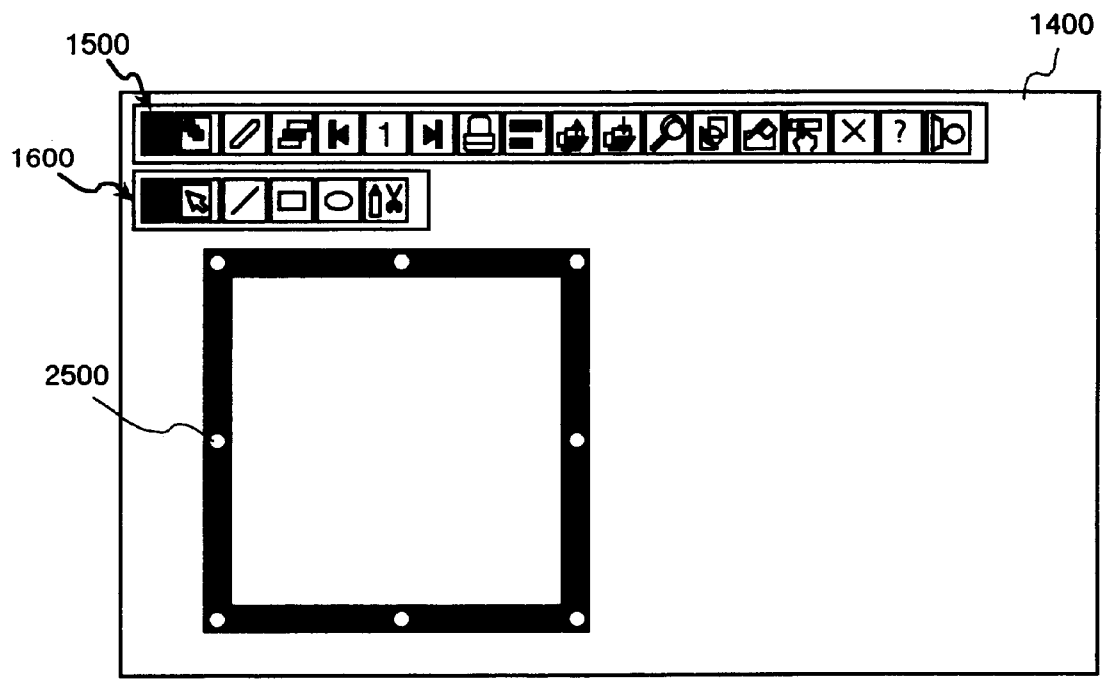

Then, the user touches any part of the handle 2500 with his or her fingertip, and moves the fingertip kept in its state, so that a size and a shape of the graphics can be changed in association with its movement. FIG. 42B shows how the graphics is enlarged by moving the part of the handle 2500 in the right lower side of the handle 2500 shown in FIG. 42A.

⑤ Movement of a Created Graphics

Figure 43A:
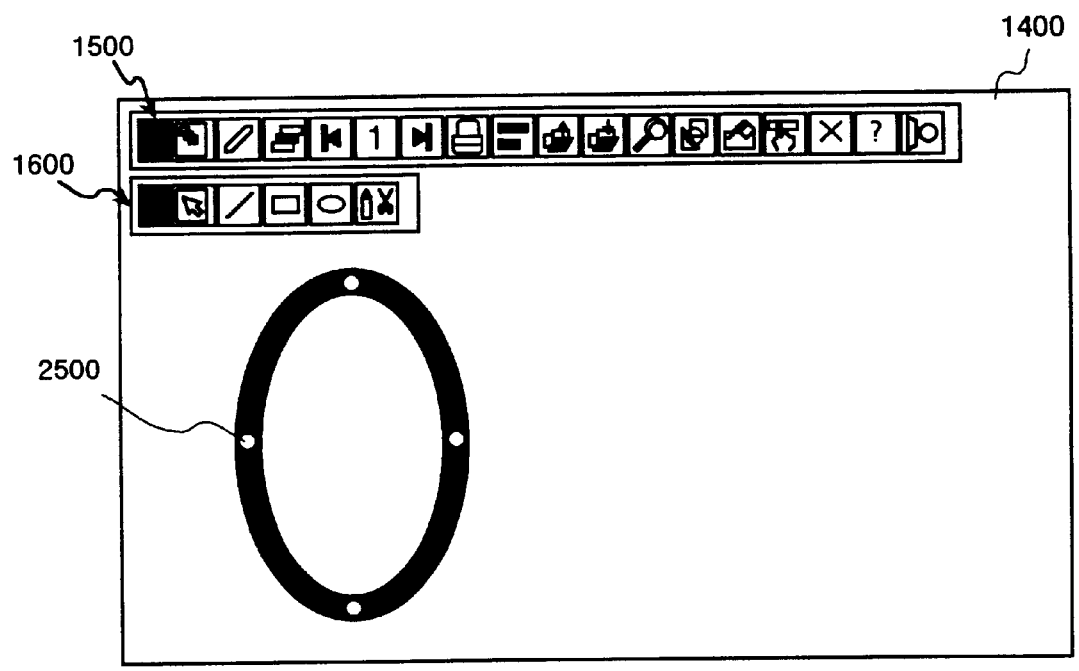
FIG. 43A shows selection of a graphics as an object to be moved and FIG. 43B shows the graphics after its movement in the display board system according to Embodiment 4 of the present invention.

When an already created graphics is to be moved, a user touches the select button 1601 in the drawing toolbar 1600 with his or her fingertip, touches any part of a line of the graphics to be moved, and selects the graphics. As a result, as shown in FIG. 43A, a handle 2500 surrounding the selected graphics is displayed.

Figure 43B:
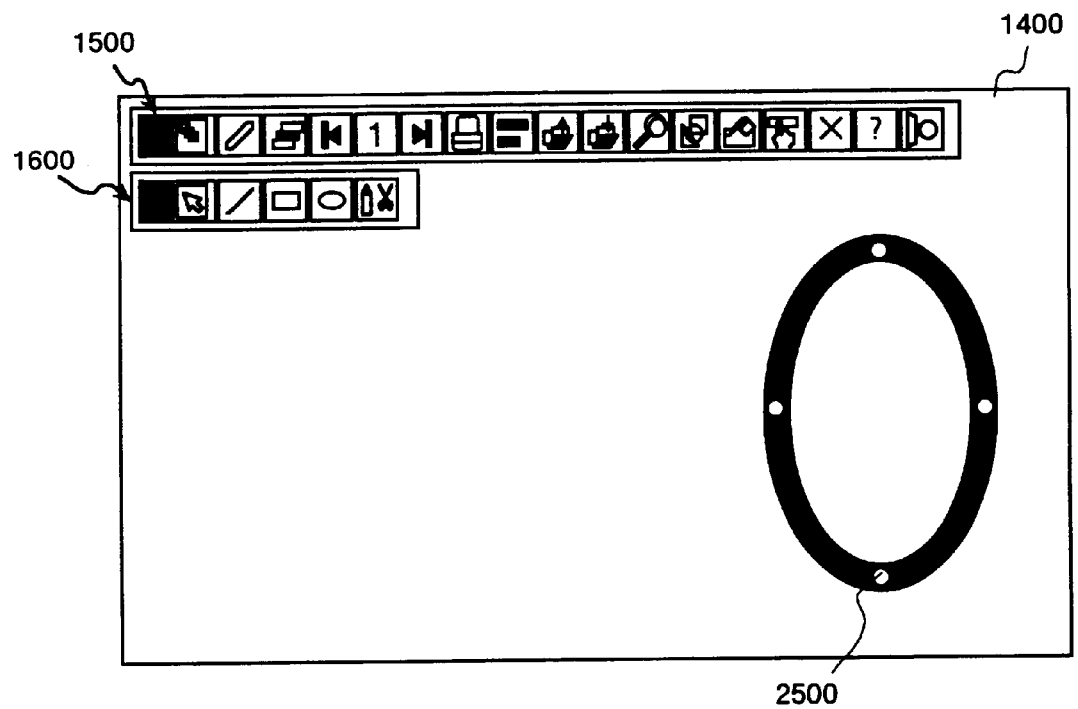

Then, the user touches any part of a line of the graphics with his fingertip, and moves the fingertip kept in its state, so that the graphics can be moved in association with its movement. FIG. 43B shows how the graphics shown in FIG. 43A has been moved in the right direction.

⑥ Edition of a Created Graphics

Figure 44:
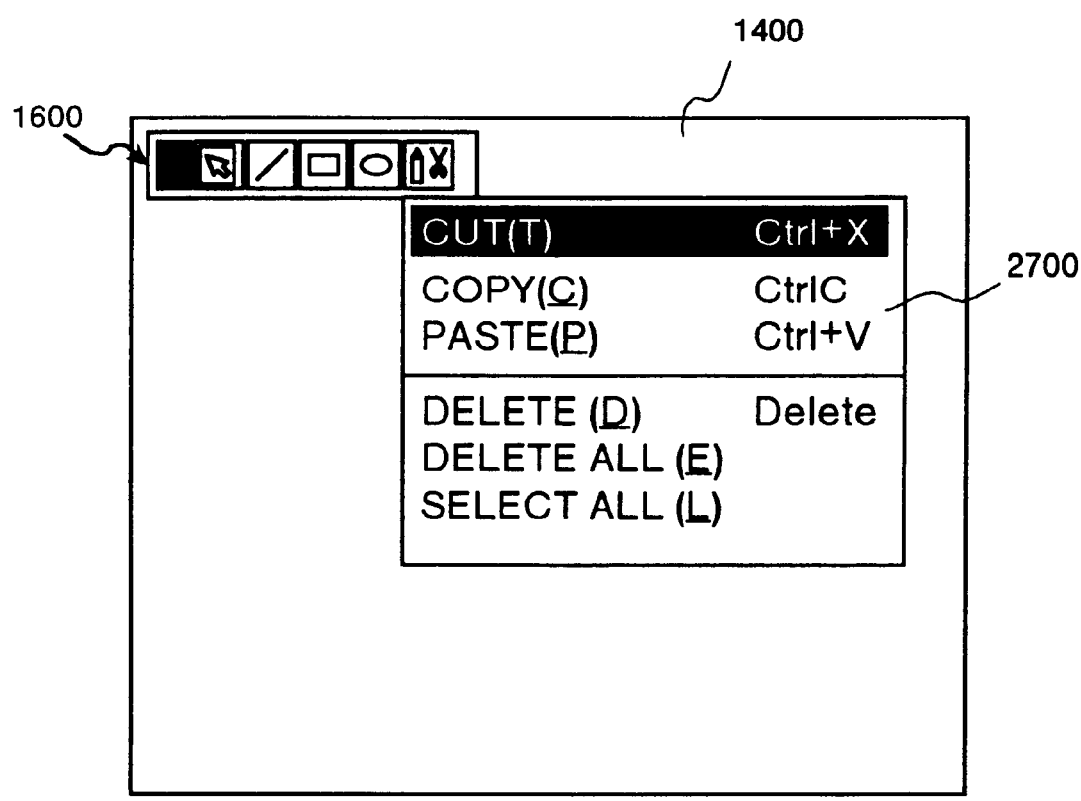
FIG. 44 shows an example of a edit menu displayed when an already created graphics is to be edited in the display board system according to Embodiment 4 of the present invention.

Herein, edition of a created graphics indicates cut or copy of the graphics or the like. At first, when a created graphics is to be cut out and pasted at an arbitrary position, the user touches the select button 1601 in the drawing toolbar 1600 with his or her fingertip, and touches any part of a line of the graphics to be cut out to select the graphics. Then, when the edit button 1605 in the drawing toolbar 1600 is touched with the fingertip, an edit menu 2700 shown in FIG. 44 is displayed on the display board screen 1400. When the user touches "cut" in the edit menu 2700, the selected graphics is cut out.

In order to paste the cut-out graphics, the edit menu 2700 is displayed again and "paste" is touched, and when an arbitrary place on the display board screen 1400 is touched, the cut-out graphics is pasted at the touched place.

However, when the cut-out graphics is to be pasted not in a currently displayed page but in another page, the user may perform operations of touching the previous page button 1405 or the next Page button 1407 in the extension toolbar 1500, displaying a desired page, and pasting the graphics as described above.

When a created graphics is to be copied and pasted in an arbitrary place, the same operation as those in the case of "cut" may be performed except touching "copy" in the edit menu 2700.

Next description is made for a case of deleting a created graphics. As described in the operation for cutting a graphics, a graphics to be deleted is selected and the edit menu 2700 is displayed. When "delete" in the edit menu 2700 is touched, the selected graphics is deleted.

It should be noted that, when a user wants to select all of the created graphics and cut, copy, or delete it, "select all" in the edit menu 2700 is touched, so that all of the created graphics is selected and the operation of cut, copy, or delete can be carried out to all the graphics. It should be noted that, if "select all" is touched, a handle surrounding all the graphics is displayed, and all the graphics can be moved with the fingertip.

5) Creation of a New Page

When a new page other than a page currently displayed as the display board screen 1400 is to be created, a user may touch the next page button 1407 in the toolbar 1401 (or the extension toolbar 1500). When the next page button 1407 is touched, the display board software 506 generates a new page and display it as display board screen 1400.

It should be noted that, if a plurality of pages are currently created, the next page button 1407 is touched to display the final page, and by touching the next page button 1407 again, a new page can be created.

Furthermore, when a previous page is to be opened, the user may touch the previous page button 1405 in the toolbar 1401 (or the extension toolbar 1500). When the previous page button 1405 is touched, the display board software 506 displays a corresponding page as a display board screen 1400.

6) Operation for Opening a Previously Prepared File

Figure 45:
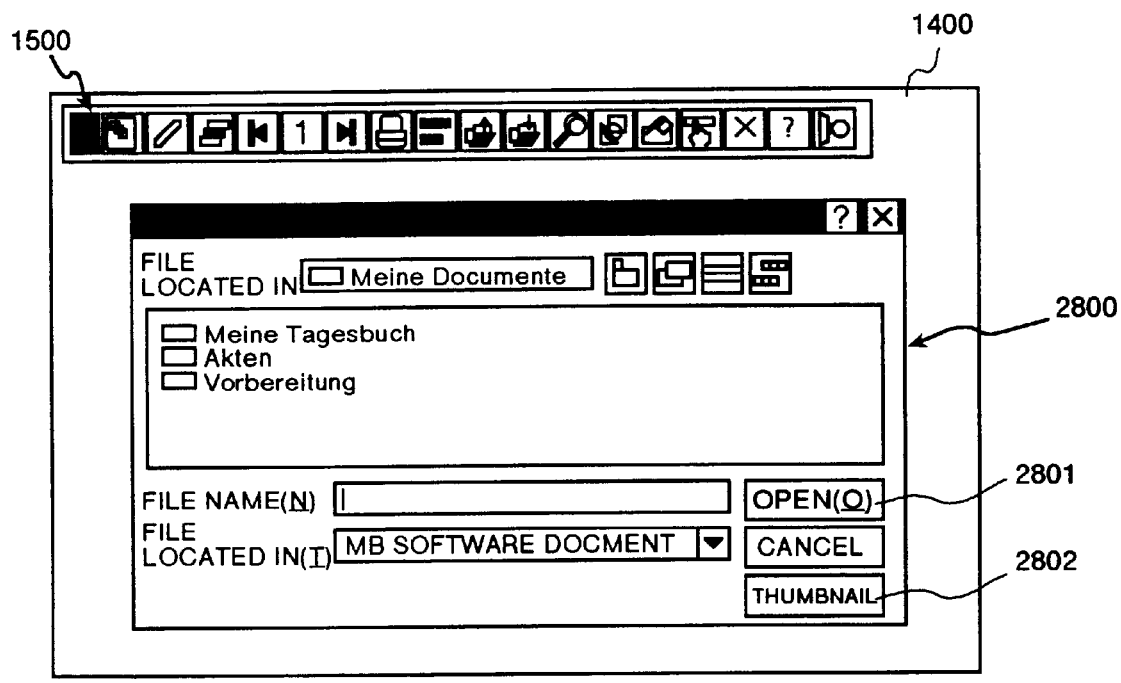
FIG. 45 explains the processing for opening an already generated file in the display board system according to Embodiment 4 of the present invention.

In order to open a previously prepared file, the file button 1501 in the extension toolbar 1500 is touched to display a file menu (not shown), and "open" in the file menu is touched to display a dialog box 2800 shown in FIG. 45. Then, a desired file name is touched for selection, and an "open" button 2801 is touched, so that a page of a corresponding file is displayed as the display board screen 1400. It should be noted that a file can be opened also by touching a file name twice in a row (described "double touch" hereinafter) like so-called "double click".

Figure 46:
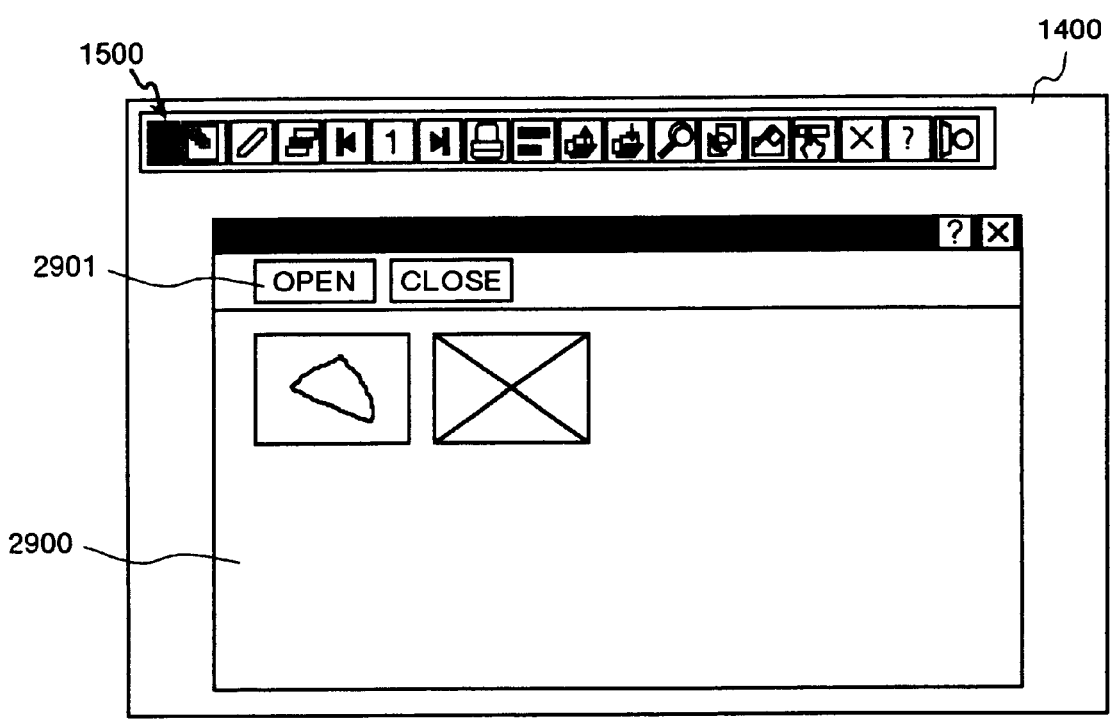
FIG. 46 explains the processing for opening an already generated file using thumbnail images in the display board system according to Embodiment 4 of the present invention.

When the contents of previously prepared file is not clear, operations of displaying a list of the files by using a file thumbnail function, confirming the contents, and opening the target file can be performed. To use the file thumbnail function, a "thumbnail" button 2802 in the dialog box 2800 is touched to display the thumbnail dialog box 2900 as shown in FIG. 46, and a list of the files is displayed in the thumbnail form in the box. Thumbnail images to be displayed here are header pages of the files respectively. Then, a desired thumbnail is touched to be selected, and "open" button 2901 is touched, or the desired thumbnail image is double-touched, so that a page of a corresponding file is displayed as the display board screen 1400.

It should be noted that in order to create a new file, the file button in the extension toolbar 1500 is touched to display the File menu (not shown), and when "new file" in the file menu is touched, a new page is displayed on the display board screen 1400.

7) Operation for Capturing a Screen of Word Processor, a Spreadsheet Program, or Presentation Software (Capturing Function)

The display board software 506 has a "capture" function for capturing the contents of a file created with the word processor, a spreadsheet program, or presentation software as a background of the display board screen 1400. Description is made hereinafter for the processing of capturing the screen of word processor, spreadsheet program, or presentation software by using this capturing function.

Figure 47:
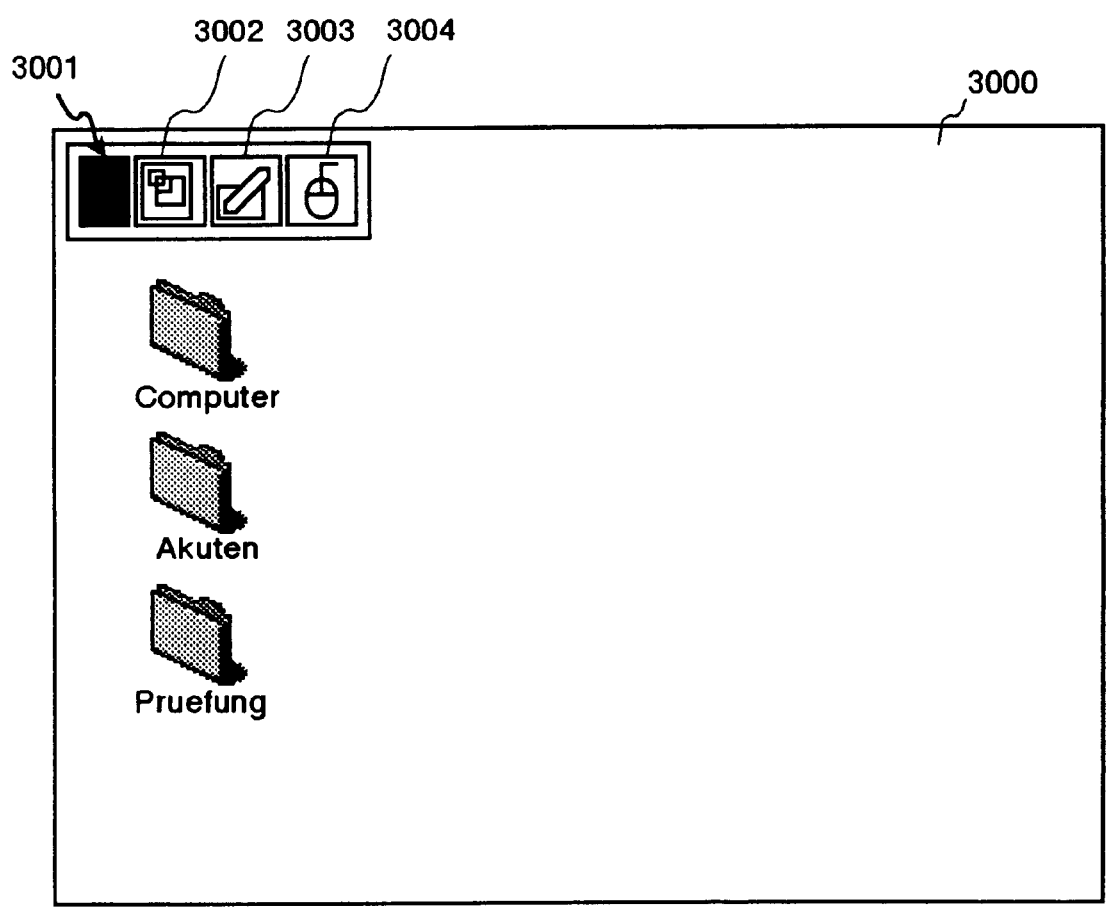
FIG. 47 shows an example of a screen of the computer and a capture toolbar displayed on the PDP in the display board system according to Embodiment 4 of the present invention.

At first, by touching the computer screen button 1402 in the toolbar 1401 (or the extension toolbar 1500) by a user, the display of the PDP 101 is switched from the display board screen 1400 to a computer screen 3000 as shown in FIG. 47. In FIG. 47, the reference numeral 3001 indicates a capture toolbar displayed when the display is switched to the computer screen 3000. Functions allocated to the buttons in the capture toolbar 3001 are as follows.

With the display board screen button 3002 display can be switched from the computer screen 3000 to the display board screen 1400.

With the capture button 3003 a screen displayed on the computer screen 3000 can be captured.

With the mouse button 3004 in an environment where a right button of a two-button type of mouse is usable (e.g., when Windows (trademark) of Microsoft is used as OS), functions assigned to the right button of the mouse become available.

Then, in the computer screen 3000 shown in FIG. 47, the user touches (double touch) an icon of a desired application program or an icon of a desired file to start a corresponding application program, and also touches the capture button 3003 after displaying the target file on the PDP 101. As a result, the display board software 506 captures the currently displayed screen and switches the display on the PDP 101 to the display board screen 1400, as shown in FIG. 48, to display the captured screen as a background of the display board screen 1400.

Figure 49:
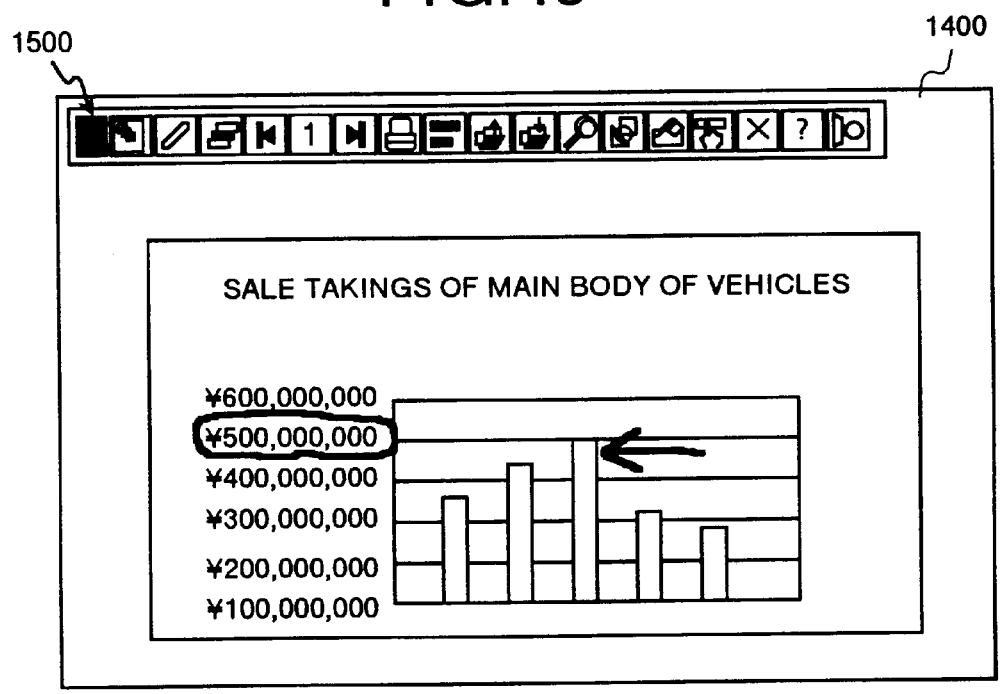
FIG. 49 explains an example of how a screen of a captured application program is displayed as a background of the screen of the display board and how the characters or the like are written on the screen in the display board system according to Embodiment 4 of the present invention.

Then, as shown in FIG. 49, the user can write characters and graphics on the display board screen 1400 utilizing the method as described above. As the screen of word processor, a spreadsheet program, or presentation software or the like can easily be captured as a background of the display board screen 1400 as described above, effective presentation can be carried out by using the display board system 100.

Figure 48:
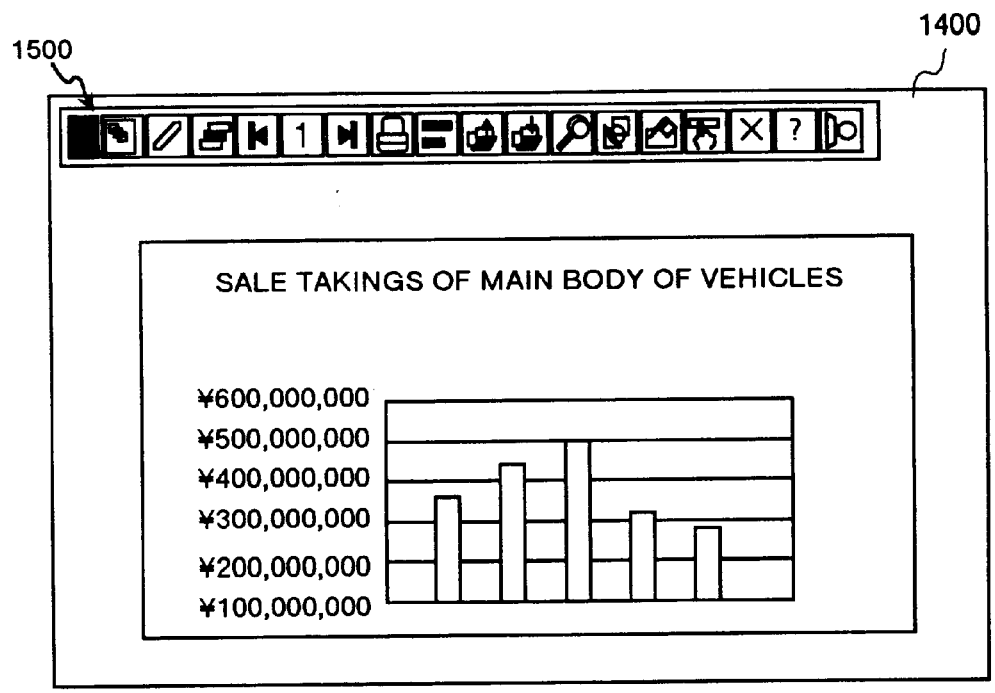
FIG. 48 explains an example of how a screen of a captured application program is displayed as a background of the screen of the display board in the display board system according to Embodiment 4 of the present invention.

Namely, while presentation is being carried out by using presentation software on the display board system 100, if a user wants to write something on the screen to describe it, the current screen is captured as soon as the capture button 3003 is touched to switch to the display board screen 1400 as shown in FIG. 48, and the user can write a desired topic on the screen. Then, when the user wants to return to the presentation software, the screen is switched to the screen of the presentation software (computer screen 3000) in response to touching the computer screen button 1402 by the user. The captured screen with characters or the like written thereon can be saved as described later.

It should be noted that, description has been made here for the method of displaying the computer screen 3000 first, starting the application program, and then capturing a desired screen. However, by directly specifying a file of the word processor or spreadsheet program from the display board software 506, a corresponding application program is started directly from the display board screen 1400 and a specified file can be opened. When the user wants to capture the screen of the application program, the same operations as those described above may be carried out. Furthermore, when other screen of the application program is captured, touching the next page button 1407 allows the screen of the application program to be displayed again on the PDP 101.

8) Operation for Displaying Pages in Creation in a List Form

Figure 50:
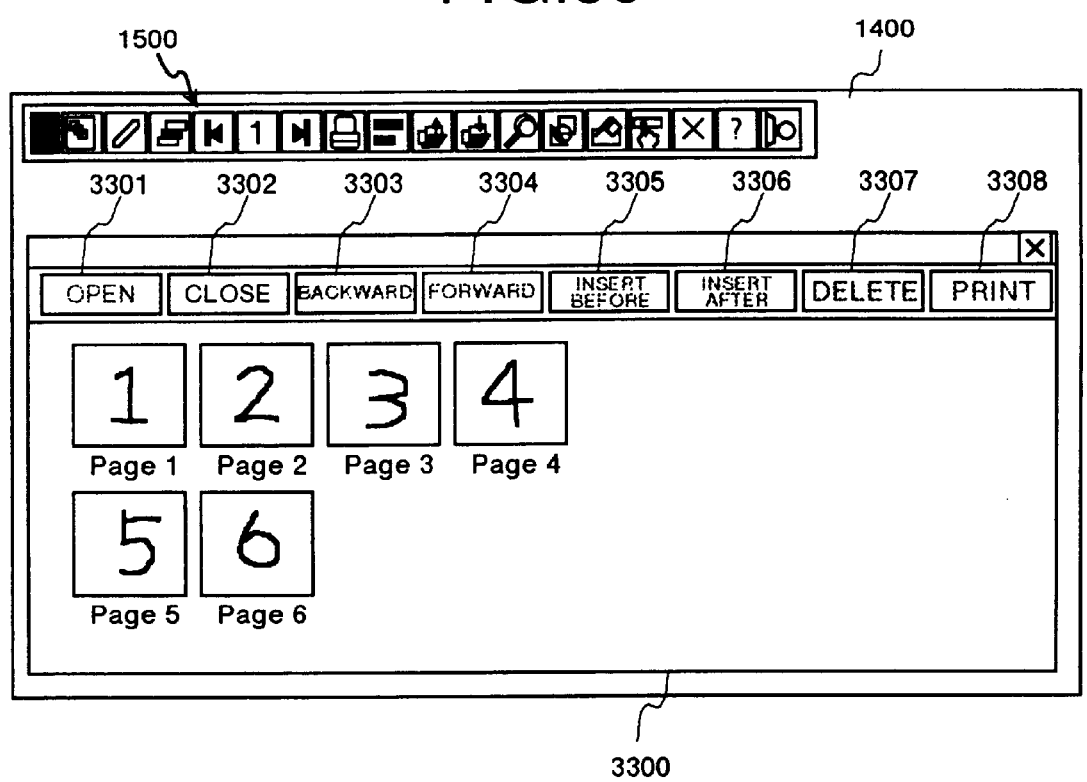
FIG. 50 shows how a thumbnail display dialog box for displaying the pages in creation in a list form is displayed in the display board system according to Embodiment 4 of the present invention.

In the display board software 506, all of the pages in creation can be displayed in a thumbnail form. When the pages are to be displayed in a list form with thumbnails, a user touches the thumbnail button 1409 in the toolbar 1401 (or the extension toolbar 1500). The display board software 506 displays, when the thumbnail button 1409 is touched, a thumbnail display dialog box 3300 for displaying pages in creation in a thumbnail form on the display board screen 1400 as shown in FIG. 50.

In this thumbnail display dialog box 3300 the reference numeral 3301 indicates an Open button, 3302 indicates a close button, 3303 indicates a backward button, 3304 indicates a forward button, 3305 indicates an insert before button, 3306 indicates an insert after button, 3307 indicates a delete button, and 3308 indicates a print button respectively.

When the thumbnail display dialog box 3300 is displayed, the user can perform operations described below.

① Operation for Specifying and Opening a Page

A desired thumbnail (page) in the thumbnail display dialog box 3300 is touched and selected, and the open button 3301 is touched in order to display the selected page on the display board screen 1400. Similarly, a desired page may be double-touched in order to display the page as the display board screen 1400.

② Movement of a Page

A page to be moved in the thumbnail display dialog box 3300 is touched and selected, and when the page is to be moved backward from the current page, the backward button 3303 is touched, and the forward button 3304 is touched when the page is to be moved forward from the current page. By moving the page as described above, an operation for replacing pages can be carried out.

③ Operation for Inserting a New Page

A previous page or a next page of a page to be inserted anew in the thumbnail display dialog box 3300 is touched and selected, and when the page is to be inserted before the selected page, the insert before button 3305 is touched, and the insert after button 3306 is touched when the page is to be inserted after the selected page. By operating as described above, a new page can be inserted in a desired position.

It should be noted that, by selecting the final page and touching the insert after button 3306, the same operation as that for creating a new page by touching the above mentioned next Page button 1407 can be performed.

④ Operation for Deleting a Page

A page to be deleted in the thumbnail display dialog box 3300 is touched and selected, and the delete button 3307 is touched, so that the selected page can be deleted.

⑤ Operation for Printing a Page

A page to be printed in the thumbnail display dialog box 3300 is touched and selected, and the print button 3308 is touched, so that the selected page can be printed. It should be noted that, various settings can be performed when printing is executed. Print setting will be described later.

9) Operation for Saving Created Pages

As described above, a page created on the display board software 506 can be saved as a file. For saving, the save button 1502 in the extension toolbar 1500 is touched, and either "save (overwrite)" or "save as . . . " is selected. When "save as . . . " is selected, the display board software 506 provides current date/month/year and file names having serial numbers on the date as a default. The user inputs a file name and specifies a folder as required, and instructs to save them, and then a created page can be saved as a file. It should be noted that, a file name can be entered through the keyboard 503 (Refer to FIG. 22).

On the other hand, when "save (overwrite)" is selected, the display board software 506 overwrites a corresponding file and saves it.

It should be noted that the display board software 506 divides the display board screen 1400 into a plurality of layers for management. They are, for instance, a background layer for managing a background of the display board screen 1400 (which includes a captured screen: bitmap data), a grid layer for managing the grid lines (vector data), a graphics layer for managing the graphics created with graphics drawing tools (vector data), and a freehand layer for managing the freehand characters and graphics (vector data). When the "save as . . . " is selected, the display board software 506 generates a file with these layers maintained as they are. Therefore, when the file is read out again, the contents of each page thereof can easily be processed. In addition, depending on a setting, data for the plurality of layers is integrated as one bitmap data, which can be saved as a bitmap file.

10) Printing

Figure 51:
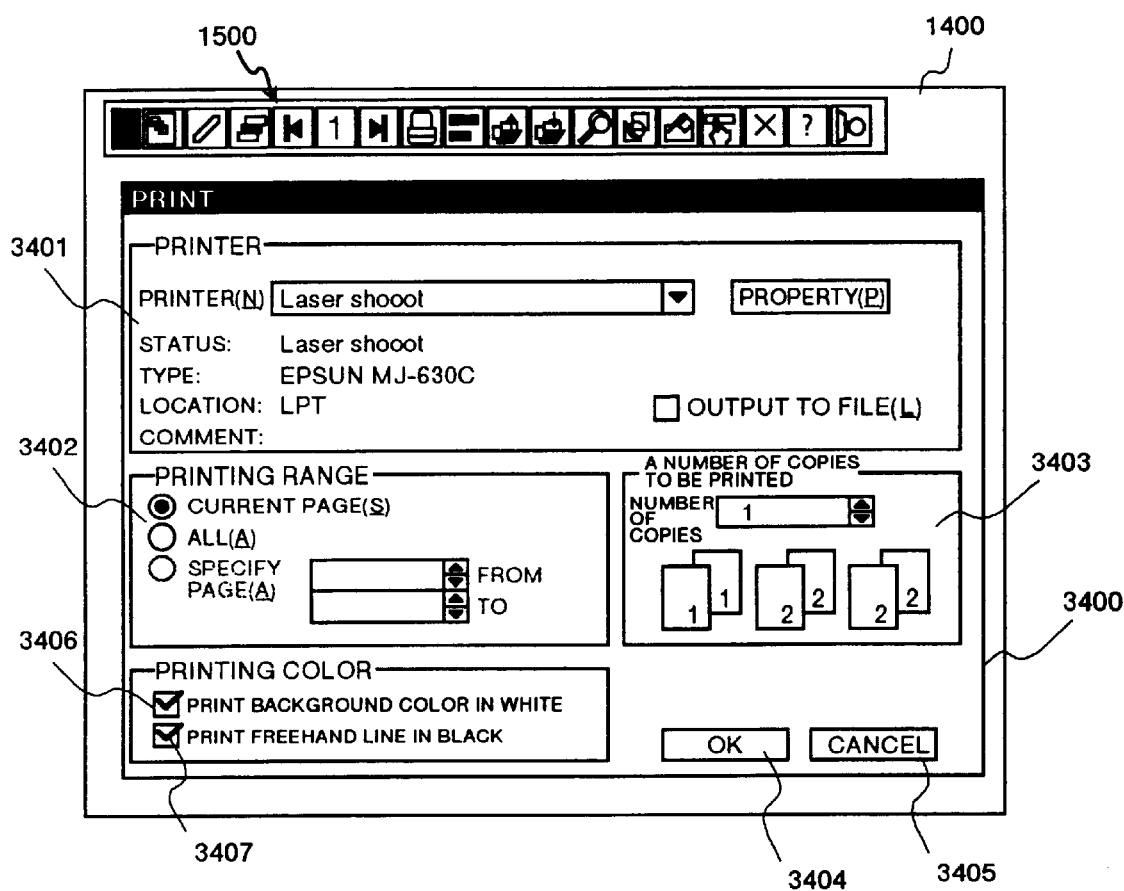
FIG. 51 shows how a printing dialog box for printing the pages in creation is displayed in the display board system according to Embodiment 4 of the present invention.

When pages in creation are to be printed, a user touches the print button 1408 in the toolbar 1401 (or the extension toolbar 1500), and touches "print" in the print menu (not shown). The display board software 506 displays a print dialog box 3400 shown in FIG. 51 according to the operation by the user. The user specifies an area to be printed and a number of copies to be printed in a printer specification column 3401, a print-area setting column 3402, and a number of copies setting column 3403 in this print dialog box 3400, and when the OK button 3404 is touched, printing is carried out by the preset printer (printer 106). It should be noted that, a cancel button 3405 is touched for stopping the printing.

Here, a background color of the display board screen 1400 can also be set to blank and printed. When such a processing of printing is to be executed, the user may perform operations for touching a check box 3406 "print background color in white" to select it, and touching the OK button 3404. The display board software 506 executes, when the check box 3406 "print background color in white" is selected, the processing of printing regarding the background color of the display board screen 1400 as blank. The provision of the setting described above allows consumption of ink or toner for the printer to be reduced.

A freehand line can also be printed in black. When such a processing of printing is to be executed, the user may perform operations for touching a check box 3407 "print freehand line in black" to select it, and touching the OK button 3404. The display board software 506 executes, when the check box 3406 "print freehand line in black" is selected, the processing of printing regarding the freehand line as black.

It should be noted that a size or a margin of recording paper for printing can be set and a printed image can be displayed although detailed description thereof is omitted herein.

11) Other

It is possible to set a display magnification of characters or the like displayed on the display board screen 1400 and a method of displaying the display board screen 1400 in a window form by touching the display button 1503 in the extension toolbar 1500 to open a menu.

It is also possible to set a background color of the display board screen 1400 using a color pallet by touching the background setting button 1505 in the extension toolbar 1500 to open a menu.

Furthermore, it is also possible to set a work folder in which files to be used for the display board software 506 are stored as a unit by touching the option button 1506 in the extension toolbar 1500 to open a menu.

(3) Case of Using the System as a Computer

In order to use the display board system 100 as a computer, like in a case of using the capture function, the screen is switched to the computer screen 3000 as shown in FIG. 47 by touching the computer screen button 1401 on the display board screen 1400 or ending the display board software 506. By switching the display on the PDP 101 to the computer screen 3000, the display board system 100 can be used as a computer. As the display board system 100 has a large-sized PDP 101, it is possible to make an effective use of the system for educational activities of operating a computer or the like.

Furthermore, the coordinate-position input device 102 is usable as a pointing device like a mouse, therefore various applications can be operated on the screen. Furthermore, by touching the mouse button 3004 shown in FIG. 47, the functions assigned to the right button of the mouse can be used with a fingertip or a pen in an environment where the right button of a two-button type of mouse is usable.

(4) Adjustment of a Coordinate-Position Input Device

In the device driver 507 shown in FIG. 22, a tool for matching a display position of a mouse cursor on the PDP 101 with a touch position obtained by touching the touch surface 201 with the fingertip or the pen is available. Description is made hereinafter for an operation of positional correction for matching a display position of a mouse cursor with a touch position.

Figure 52:
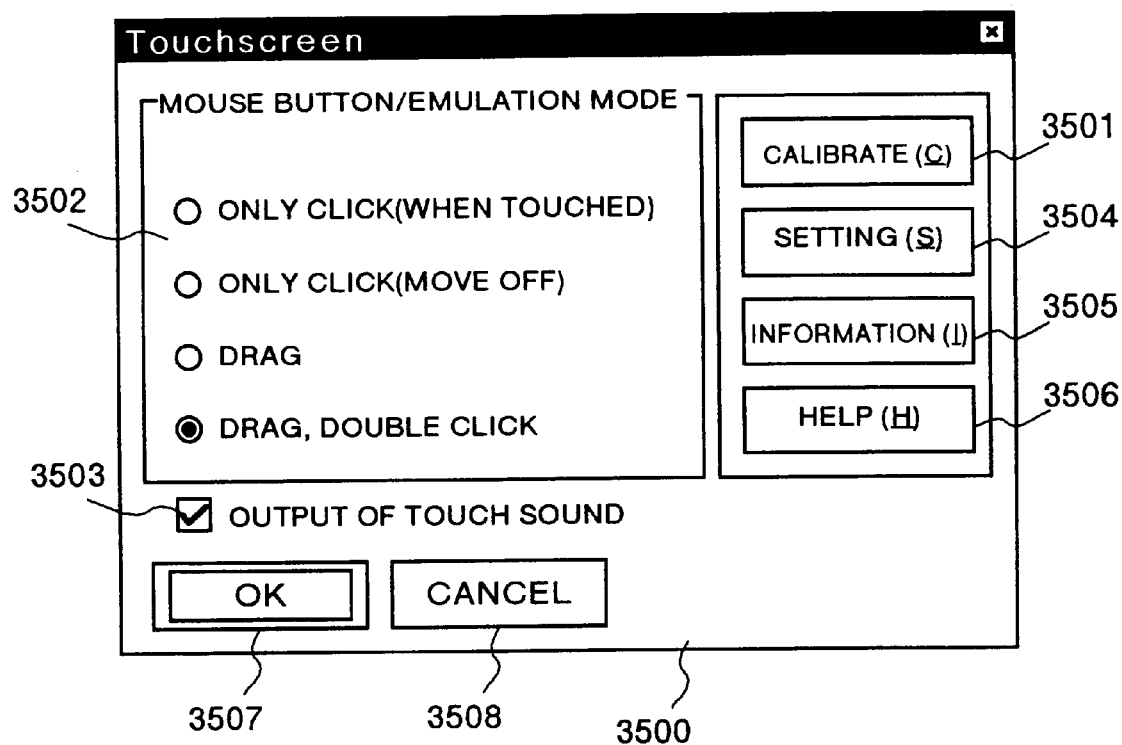
FIG. 52 shows an example of a setting screen for coordinate-position input device in the display board system according to Embodiment 4 of the present invention.

FIG. 52 is an explanatory view showing one example of a setting screen of the coordinate-position input device 102. When a calibrate button 3501 in the setting screen 3500 shown in FIG. 52 is touched, a display screen of the PDP 101 and a correction screen for adjusting coordinates of the touch surface 201 in the coordinate-position input device 102 appear on the PDP 101. This display screen displays, for instance, three correction points on the upper left side, upper right side, and lower right side of the PDP 101. The user may touch the three points on the PDP 101 with his fingertip or the pen.

When any of the three correction points are touched by the user, the device driver 507 executes positional correction processing for matching the display position of the mouse cursor with the touch position according to the touched position. The result of positional correction is saved in a prespecified file.

However, the operation for positional correction is previously performed when the display board system 100 is actually shipped as a product, therefore, a user need not perform the procedure for positional correction unless resolution of the PDP 101 or the like is changed.

It should be noted that, description is made for an outline of other setting items in the setting screen 3500. The reference numeral 3502 indicates a mouse button/emulation mode setting column, which is used for setting which processing is to be executed when the touch surface 201 is touched with the fingertip or the pen. In the mouse button/emulation mode setting column 3502, for instance, the following settings can be carried out:

① Setting so as to regard when the touch surface 201 is touched with a fingertip or a pen as a click, ② Setting so as to regard when a fingertip or a pen having touched the touch surface 201 is moved off as a click, ③ Setting so as to regard when a fingertip or a pen touching the touch surface 201 is moved along the surface in its touched state as drag, and ④ Setting so as to regard when the touch surface 201 is touched twice in a row with a fingertip or a pen (double touch) as a double click as well as to regard when a fingertip or a pen touching the touch surface 201 is moved along the surface in its touched state as drag (this setting is required when the display board software 506 is used).

Furthermore, the reference numeral 3503 indicates an output setting check box for touch sound, and when this check box 3503 is checked, a beep is outputted each time when the touch surface 201 is touched. The reference numeral 3504 indicates a setting button, and when the setting button 3504 is touched, a screen for setting a method of connecting the controller 103 appears. Furthermore, designated at the reference numeral 3505 in the figure is an information button for displaying information on the controller 103 as well as on the device driver 507. 3506 is a help button for displaying a help screen. 3507 is an OK button for validating an item or items set in the setting screen 3500, and 3508 is a cancel button for invalidating an item or items set in the setting screen 3500 respectively.

(5) Use of AV Equipment

Connected to the PDP 101 in the display board system 100, as shown in FIG. 21, are various types of information equipment and AV equipment such as a video player 108, a laser disk player, a DVD player, and a video camera to enable reproduction of video and audio. In addition, an external speaker can be connected to the PDP 101 through an amplifier, which allows a user to enjoy a powerful sound with a large-sized display. Signals inputted from the information equipment, AV equipment, or the computer 104 to the PDP 101 can easily be switched using a remote control or the like which is not shown.

As described above, various types of information equipment and AV equipment can be connected to the PDP 101 and operated without using the computer 104, so that the PDP 101 can be used as a large-sized screen monitor. Thus allows operability, adaptability for handling, and convenience of the display board system 100 to be improved without requiring other equipment such as a television to be prepared.

(6) Connection to a Network

Figure 53:
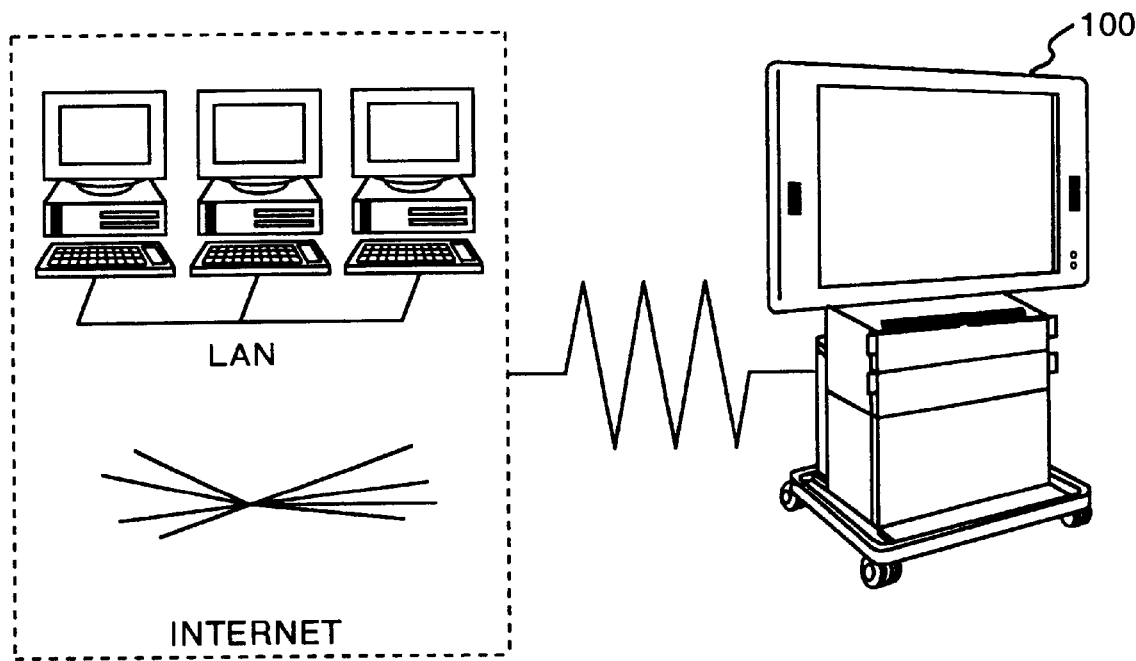
FIG. 53 explains the network connection of the display board system according to Embodiment 4 of the present invention.

Furthermore, as shown in FIG. 53, the display board system 100 can be connected to a network such as a LAN or the Internet. Therefore, applicability of the display board system 100 can be widened to the extent of: transmitting materials or the like for a conference prepared with the display board software 506 to other computer, reading in data prepared by other computer and using it in a conference, teleconferencing by connecting a plurality of display board systems 100 to each other, and applying the display board system 100 in a video conference system or some other occasions. In addition, the display board system 100 can be connected to a network using the radio signals from a Personal Handyphone System.

3. Effects

As described above, with the display board system according to Embodiment 4, as the coordinate-position input device described in Embodiments 1 to 3 is used, operability and reliability when input is performed to the display board system can be improved.

The display board system 100 is configured with the frame unit 600 comprising the board section 601 forming a display surface and a write-in surface of a display board with the PDP 101 and coordinate-position input device 102 and the equipment accommodating section 604 in which the computer 104, video player 108, and printer 106 are accommodated in the vertical direction from the bottom. Therefore, movement and installation of the system can easily be performed only by moving the frame unit 600. As the devices are arranged in the order of the heaviest one to at the bottom and the lighter ones above the heavier ones in the direction of gravity (vertical direction), stability of the frame unit 600 when it is moved and installed can be insured. Namely, with the display board system 100 according to Embodiment 4, it is possible to enhance downsizing and integration of the display board system 100 as a whole and also improve operability, adaptability of handling, and convenience thereof.

In addition, the display board system 100 has an angle adjusting mechanism section 802 for adjusting an angle of the board section 601 with the PDP 101 and coordinate-position input device 102 accommodated therein, so that incoming interference light into the display surface of the PDP 101, especially, light from lighting equipment such as a fluorescent tube provided on the ceiling can be avoided. Therefore, an image on the screen can easily be seen and convenience of the display board system 100 can be improved.

Furthermore, the PDP 101 can be used as a large-sized screen monitor by using a plurality of connecting terminals for connecting various types of information equipment and AV equipment such as a digital camera, a DVD player, and a video equipment to the system. Therefore, it is possible to provide a display board system 100 for enabling connection and operation of the various types of information equipment and AV equipment without using the computer 104.

Next, as Embodiment 5, another display board system applicable to the above mentioned display board system 100 according to Embodiment 4 will be described.

When the size of a screen of a display unit such as the PDP 101 according to Embodiment 4 is about 100 inches in a width across corners, for example, it will be difficult for a presenter standing at the left side to the screen to directly point to a display point (touch the touch surface 201) at the upper right corner. Therefore, in Embodiment 5, description is made for a display board system which allows a presenter to perform a pointing operation to an image displayed on the large-sized screen in his natural posture toward the audience.

The display board system according to Embodiment 5 displays an icon for selecting a create a point-operating area with the icon such as a press button at some corner of the display screen. When a presenter selects the create a point-operating area with this icon and specifies a position where the point-operating area is created, a pointer area creating section creates a rectangular point-operating area in an instructed position on an image display unit and displays the area. The presenter confirms the displayed point-operating area and points to a position corresponding to a display point on the display screen within the point-operating area instead of directly pointing to the display point on the display screen. When the presenter points to a position corresponding to a display point on the screen within the point-operating area, a pointer moving section moves a pointer (mouse cursor) on the display screen to the display point and points to the display point. Thus, the presenter can easily and accurately point to a display point on a large screen which the presenter can not reach.

Figure 54:
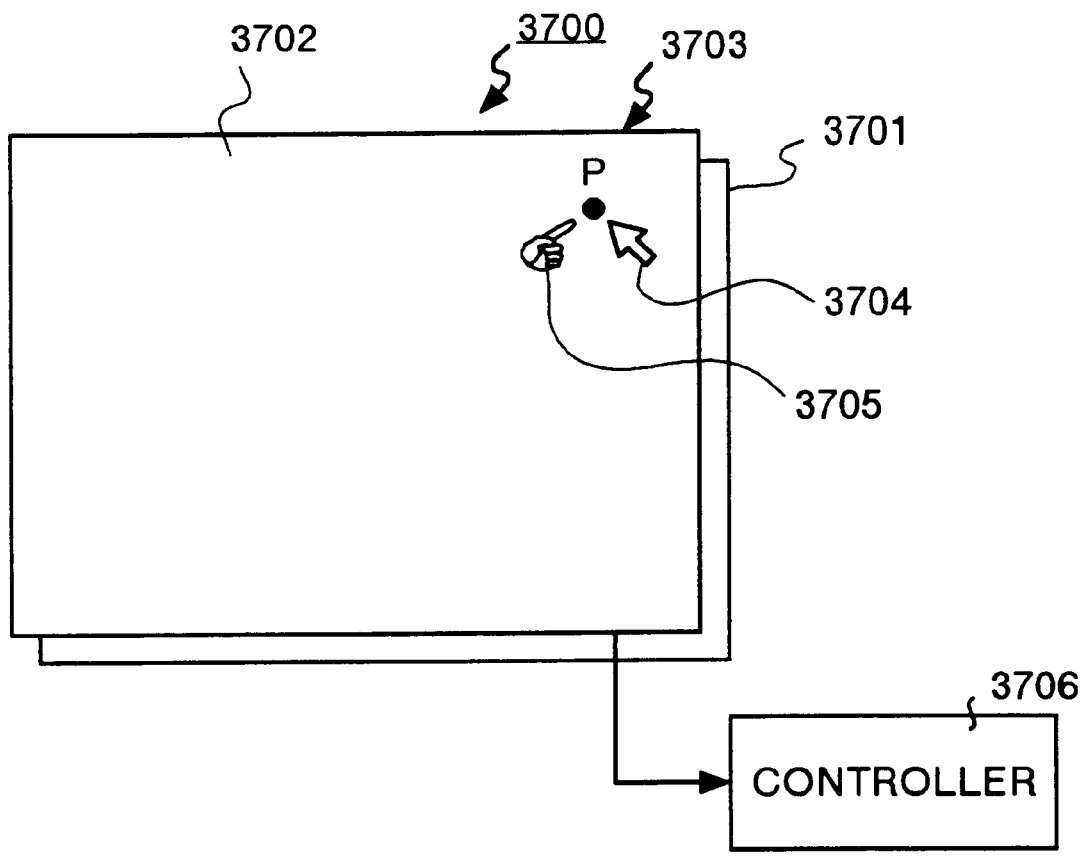
FIG. 54 shows the configuration of a display unit of a display board system according to Embodiment 5 of the present invention.

FIG. 54 is a view of a display unit forming the display board system according to Embodiment 5. The image display unit 3700 shown in FIG. 54 comprises an image display section 3701 (corresponding to the PDP 101 in Embodiment 4) and a large-sized screen display having a coordinate-position input device 3702 (corresponding to the coordinate-position input device 102 in Embodiment 4) provided on the surface of the image display section 3701. In FIG. 54, the reference numeral 3706 corresponds to the controller 103 in Embodiment 4 (Refer to FIG. 21).

Figure 55:
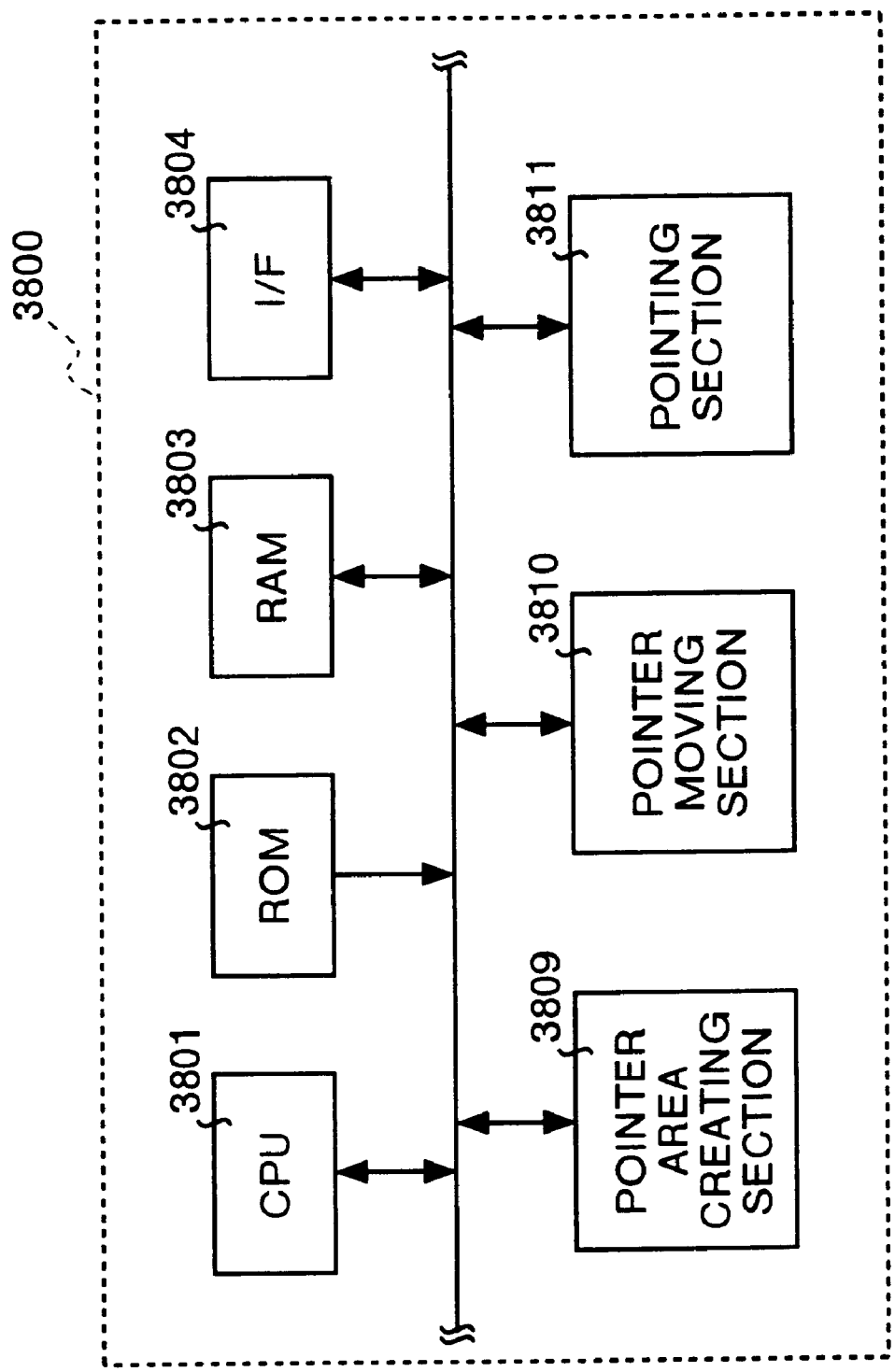
FIG. 55 is a block diagram showing a main control section of the display board system according to Embodiment 5 of the present invention.

FIG. 55 is a block diagram showing a main control section of the display board system according to Embodiment 5 of the present invention. The main control section 3800 comprises a CPU 3801, a ROM 3802, a RAM 3803, an I/F 3804 with the image display unit 3700 and coordinate-position input device 3702 connected thereto, a pointer area creating section 3809, a pointer moving section 3810 and a pointing section 3811. It should be noted that, the main control section 3800 corresponds to the computer 104 in Embodiment 4.

Figure 56:
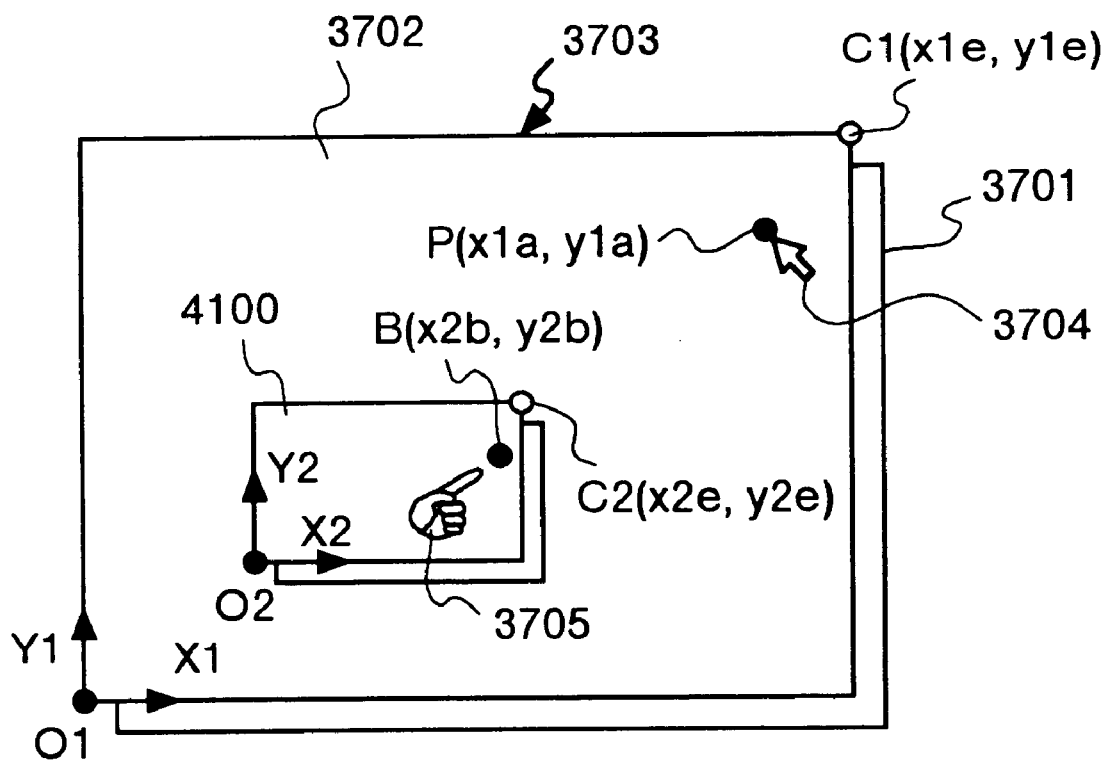
FIG. 56 shows a screen that displays a point-operation area in the display board system according to Embodiment 5 of the present invention.
Figure 57:
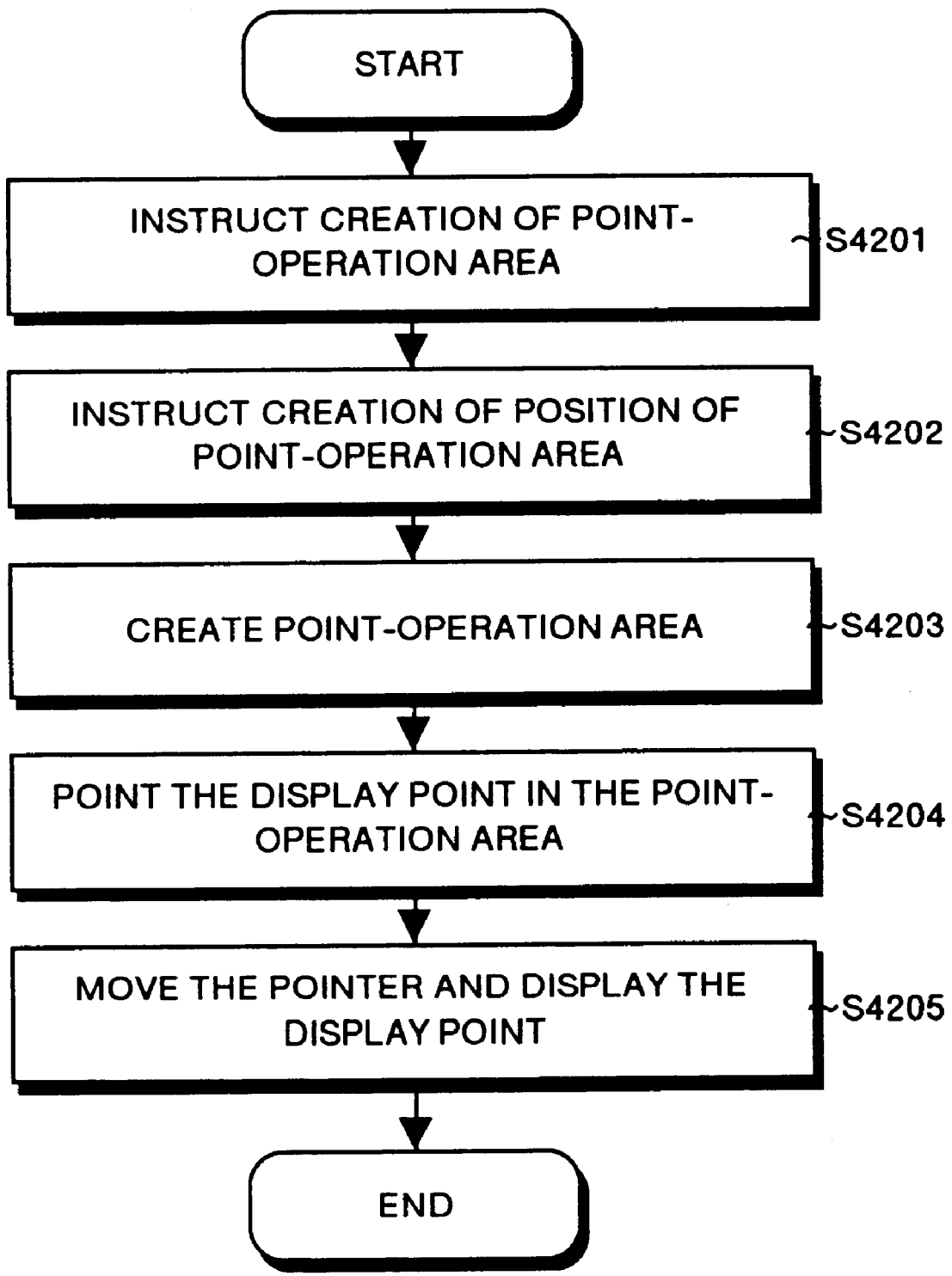
FIG. 57 is a flow chart of a point operation in the display board system according to Embodiment 5 of the present invention.

In the display board system having the configuration described above, description is made for an operation when a point P on the display screen of the image display section 3701 is pointed, for example, as shown in FIG. 54 with reference to the display view in FIG. 56 and the flow chart in FIG. 57. In an ordinary operating situation, when a presenter using the image display unit 3700 touches the point P on the screen 3703 with his or her fingertip, the situation is regarded as that the presenter points to the point P and the pointer 3704 is moved to the point P. However, when the size of a screen of the image display section 3701 is about 100 inches in a width across corners, for example, it will be difficult for the presenter standing at the left edge to the screen to directly point to the point P at the upper right side. Therefore, the CPU 3801 displays an icon for selecting a create a point-operating area with the icon such as a press button at some corner of the image display section 3701. When the presenter selects the create a point-operating area with this icon and specifies a position where the point-operating area is created (steps S4201 and S4202), the pointer area creating section 3809 reduces the image display section 3701 and the coordinate-position input device 3702 to an instructed size shown in FIG. 56, creates a rectangular point-operating area 4100, and displays the area on the image display section 3701 (step S4203).

The presenter having confirmed this point-operating area 4100 points to a point B corresponding to the point P within the point-operating area 4100 instead of directly pointing to the point P on the screen 3703 (step S4204). In response to this operation, the pointer moving section 3810 moves the pointer 3704 to the point P on the screen 3703 and points to the point P (step S4205). Thus, the presenter can indirectly point to the point P on the large screen which the presenter can not reach.

Figure 58A:
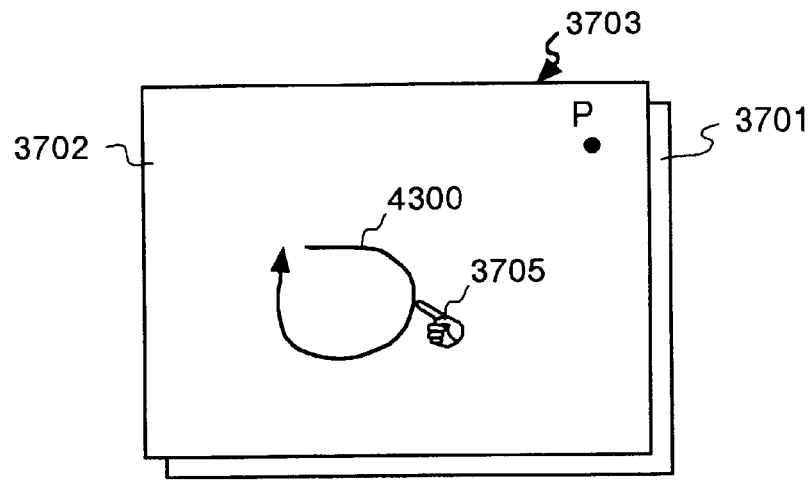
FIGS. 58A, 58B and 58C are processing steps showing display and deletion of a point-operation area in the display board system according to Embodiment 5 of the present invention.
Figure 58B:
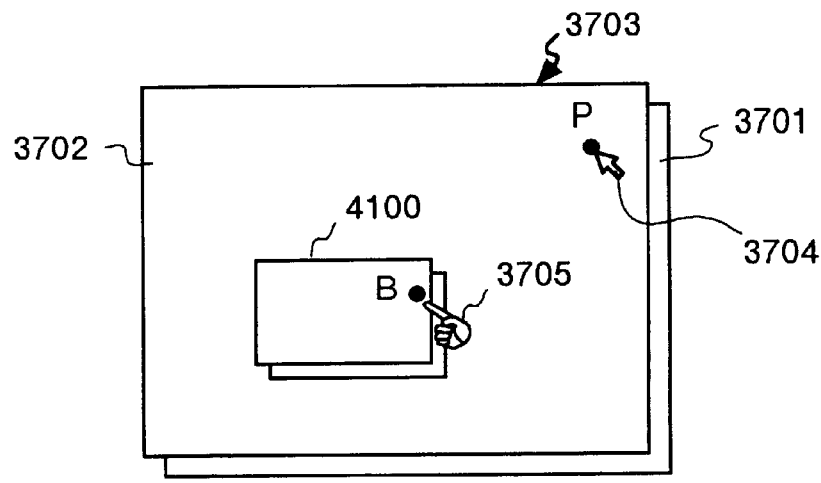
Figure 58C:
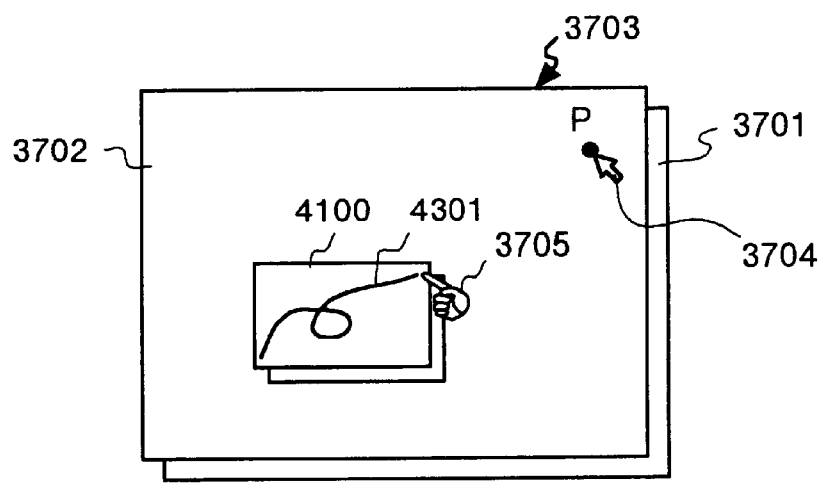
Figure 59:
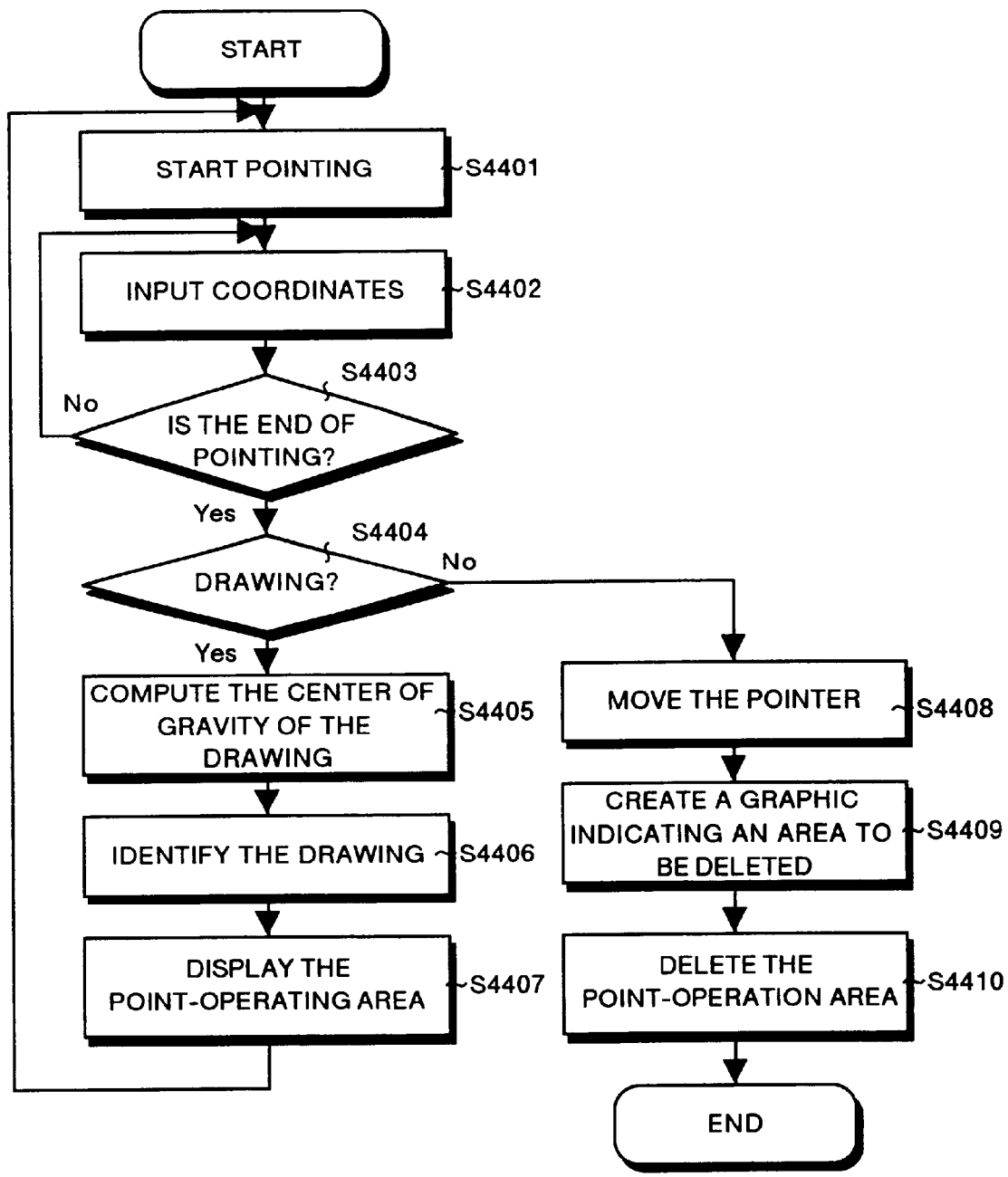
FIG. 59 is a flow chart of the processing for display and deletion of a point-operation area in the display board system according to Embodiment 5 of the present invention.

Then, detailed description is made for operations when a point-operating area 4100 is displayed on the image display section 3701 and when the displayed point-operating area 4100 is deleted with reference to the views for processing steps in FIGS. 58A to 58C and the flow chart in FIG. 59. As shown in FIG. 58A, on the screen 3703 of the image display section 3701 in its ordinary operating status, when a presenter creates a loop-shaped trail having a geometrical feature previously defined, for instance, a trail 4300 similar to a rectangle, the CPU 3801 determines that the presenter's fingertip have touched an entry area of the coordinate-position input device 3702 and continuously records coordinates and times from the point of time when the finger has touched it until the finger 3705 moves off the coordinate-position input device 3702 in the RAM 3803 (steps S4401 to S4403).

The pointer area creating section 3809 determines whether the presenter has created a drawing or has pointed to a point by touching the coordinate-position input device 3702 according to the coordinates and times recorded in the RAM 3803 (S4404).

The pointer area creating section 3809 computes, when it is determined that the drawing has been created as shown in FIG. 58A, the center of gravity in a created pattern according to the created drawing 4300 (step S4405), and identifies a type of pattern (step S4406). When it is determined that the identified pattern is, for instance, a rectangle, the pointer area creating section 3809 creates a point-operating area 4100 as shown in FIG. 58B at the position of the center of gravity n the created pattern as a reference and displays the area on the screen 3703 (step S4407).

When the presenter points, in the above state, to the point B corresponding to the point P on the screen 3703 by touching the coordinate-position input device 3702, the pointer area creating section 3809 determines that the pointing is instructed (steps S4401 to S4404). When it is determined by the pointer area creating section 3809 that the pointing has been instructed, the pointer moving section 3810 moves the pointer 3704 on the screen 3703 to the point P on the screen 3703 corresponding to the point B to which pointing is instructed and displays the moved pointer (step S4408).

In the above state, when a trail 4301 which is not a loop is created in the point-operating area 4100 by the presenter as shown in FIG. 58C and coordinates and each time of the trail 4301 are stored in the RAM 3803, the pointer area creating section 3809 determines that the created trail 4301 is a graphic to be deleted and deletes the point-operating area 4100 from the screen 3703 (steps S4409 and S4410). When this point-operating area 4100 is to be deleted, if the center of gravity in the trail 4301 to the center of gravity in the point-operating area 4100 is closer to a preset value, the trail 4301 is determined as a graphic to be deleted, which makes it possible to suppress redundancy of the operation.

Description is made for the processing, when the point B in the point-operating area 4100 is instructed to be pointed to as described above, for a case where the coordinates of the instructed point B are transformed to coordinates of the point P on the screen 3703. As shown in FIG. 56, it is assumed that the point-operating area 4100 is displayed by reducing the image display section 3701 and the coordinate-position input device 3702 at a specified reduction rate. Then, as shown in FIG. 56, it is assumed that, by setting the lower left edge of the screen 3703, for instance, to the origin O1, each point of the screen 3703 is expressed with X-Y coordinates, and coordinates of a point C1 diagonal to the origin O1 are (x1e, y1e), and that the lower left edge of the point-operating area 4100 corresponding to the origin O1 is the origin O2 of the point-operating area 4100 and the coordinates of a point C2 in the point-operating area 4100 corresponding to the point C1 are (x2e, y2e). As a result the coordinate (x2, y2) of each point in the point-operating area 4100 correspond to coordinate (x1, y1) of each point on the screen 3703 one for one through a factor K decided based on a relation between the coordinate (x1e, y1e) and the coordinate (x2e, y2e). Therefore, the pointer moving section 3810 can accurately move the pointer 3704 to the point P by transforming coordinates from the coordinate (x2b, y2b) of the point B pointed in the point-operating area 4100 to the coordinate (x1a, y1a) of the point P on the screen 3703.

Figure 60:
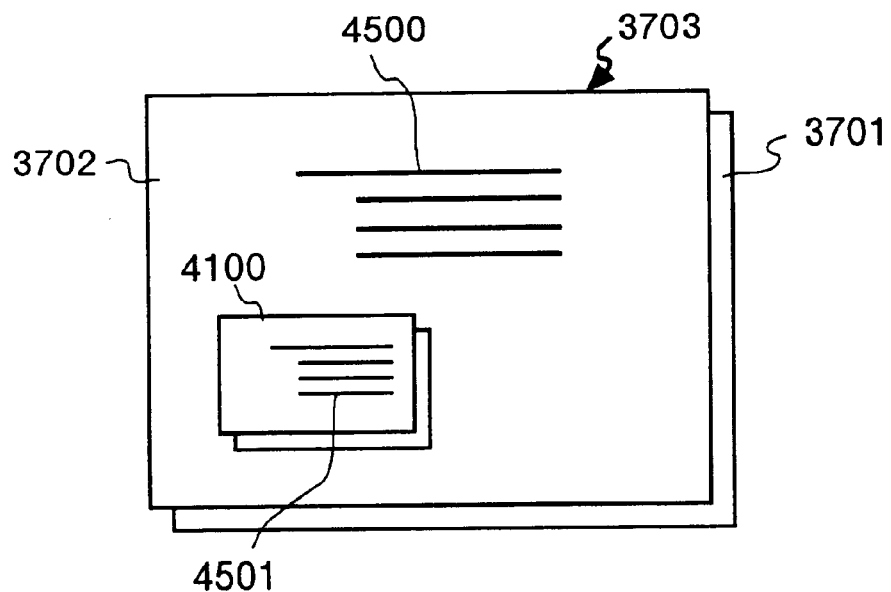
FIG. 60 is an explanatory view that shows display contents on the display screen appearing within the point-operation area in the display board system according to Embodiment 5 of the present invention.

As described above, as each point in the point-operating area 4100 corresponds to each point on the screen 3703 one for one, the point-operating area 4100 is recognized by a user as to be equivalent to a reduced screen of the full screen 3703. Therefore, when the point-operating area 4100 is displayed, as shown in FIG. 60, a similar reduced object 4501 obtained by reducing an object 4500 such as characters and graphics displayed on the full screen 3703 can be displayed in the point-operating area 4100.

Figure 61:
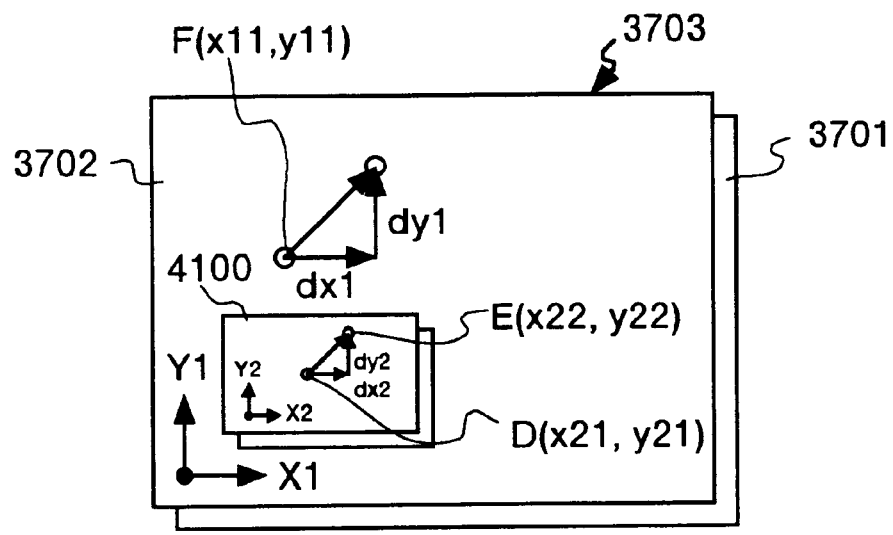
FIG. 61 explains a moving operation of the points in association with transformation of coordinates in the display board system according to Embodiment 5 of the present invention.

As the processing of transforming the coordinates of the instructed point B to the coordinates of the point P on the screen 3703, the case of transforming the coordinate (x2b, y2b) of the point B pointed in the point-operating area 4100 to the coordinate (x1a, y1a) of the point P on the screen 3703 has been described, but the pointer 3704 on the screen 3703 can also directly be moved. The processing in this case will be described with reference to FIG. 61.

Relative values in movement of coordinates in the point-operating area 4100 correspond to relative values in movement of the pointer 3704 on the screen 3703 through the factor K. Therefore, when the presenter instructs to move the pointer 3704 from a display position F (x11, y11) on the screen 3703 by keeping on pointing to and moving an arbitrary point D (x21, y21) on the coordinate-position input device 3702 to a point E (x22, y22) within the point-operating area 4100, a coordinate data row instructed within the point-operating area 4100 is inputted with coordinates of X2-Y2. By differentiating or executing differential operation of this inputted coordinate data row, the transform (dx2, dy2) of the inputted coordinate is operated in appropriate time intervals. The coordinate F (x11, y11) of the pointer 3704 on the screen 3703 can be transformed and displayed based on transformation (dx1, dy1) of the coordinate obtained by multiplying the transformation of the coordinate along time within the point-operating area 4100 by the factor K. In this case, although the point D within the point-operating area 4100 may not correspond to a display position F of the pointer 3704 on the screen 3703 one for one, by correlating the transformation (dx2, dy2) of the coordinate to transformation of coordinate of the point F on the screen 3703 through the factor K, and the pointer 3704 on the screen 3703 can be operated in much the same way the mouse is operated.

If this processing of operating the pointer 3704 on the screen 3703 in much the same way the mouse is operated and the processing of using coordinate of a point B pointed on the point-operating area 4100 are switched as required, a user can use properly either the mouse emulation or the pointing operation based on coordinate according to the situation.

The image display unit 3700 is premised on displaying an image generated by a computer. For moving an object in a displayed image or moving an icon or a window in an operating system, an ordinary mouse operation is carried out by moving a pointer over an object, pressing a button (pointing operation) thereon, and moving the object to a desired position in its pressed state. This operation is generally known as an operation of drag. Description is made hereinafter for an operation of drag for moving the pointer over the full screen 3703 by pointing to any coordinate within the point-operating area 4100.

The display board system according to Embodiment 5 has no button mechanism as that provided in an ordinary mouse because the coordinate-position input device 3702 is used therein. As a method of realizing an operation instead of the ordinary mouse operation, a cursor is moved up to target coordinate within the point-operating area 4100, and an object-displayed surface is momentarily pointed thereto with a finger or a pen at the target position.

Figure 62:
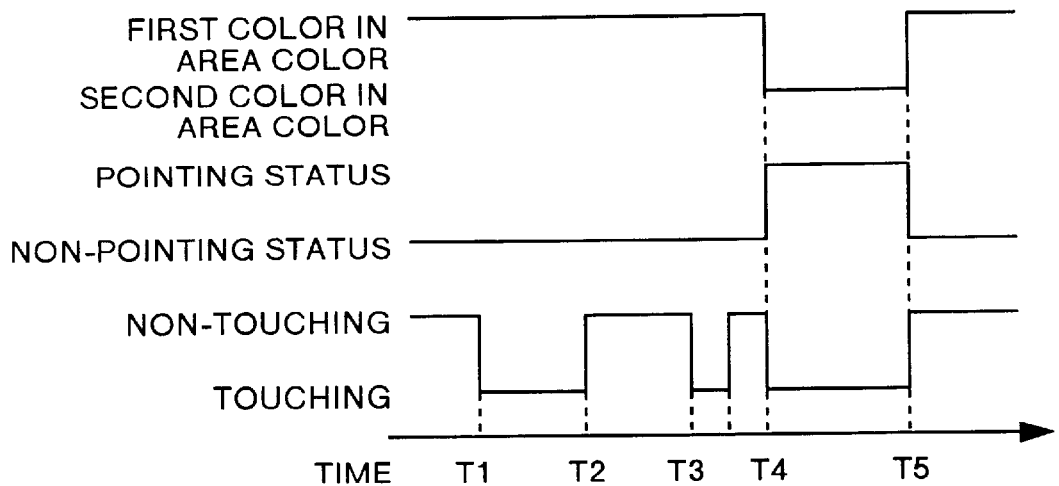
FIG. 62 is a time chart showing drag operations according to operations within a point-operation area in the display board system according to Embodiment 5 of the present invention.

FIG. 62 shows one example of changes of a state of pointing to an entry area of the coordinate-position input device 3702 with the fingertip 3705 on the time axis. During the time T1, the fingertip 3705 is moved keeping on its pointing to the point-operating area 4100 of the coordinate-position input device 3702, and the pointer 3704 is moved to a desired object on the screen 3703. During the time T2, when the pointer 3704 is moved up to the desired object, the fingertip 3705 is moved off the coordinate-position input device 3702 once, and at the point of time T3, the object at the position is momentarily pointed to with the fingertip. At the point of time T4 when the operation is ended and thereafter, the pointing section 3811 selects a desired object and shifts to a state in which the mouse button has been pressed down (a pointing state). This determination above can be made, for instance, by switching the state of pointing to the point-operating area 4100 of the coordinate-position input device 3702 to the non-pointing state and vice versa within an appropriate time interval. Furthermore, the pointing section 3811 changes the display color of the point-operating area 4100 from a first color at a state of not pointing to the area to a second color. According to this change in display color, a user can accurately recognize that the state has been changed to a pointing state even when there is no mechanical button thereon. In this state, the fingertip 3704 is touched again in the point-operating area 4100, the pointed object is moved, and the fingertip is moved off the object at the point of time T5, so that the movement of the object is completed and the state of pointing to the object is released.

Although description has been made for the case where the state is shifted to the pointing state when the point-operating area 4100 is momentarily pointed to at the point of time T3, one of a certain number of states may be selectively specified in the pointing section 3811 depending on a number of times of instant pointing. Furthermore, during a state shifting process for shifting to the pointing state, a user can recognize that the current state is in the process of shifting to the other state by switching the display color in the point-operating area 4100 to a third color, therefore, malfunction can be reduced.

As described above, with the display board system according to Embodiment 5, a point-operating area 4100 used for pointing to a display point on a displayed image appears on a desired position according to an instruction by a user, and the user can operate the pointer 3704 on the display surface 3703 in the point-operating area 4100. Therefore, a presenter can easily and accurately point to a position which the presenter can not reach even in the large-sized screen display unit.

Furthermore, a position and a size of the point-operating area 4100 are instructed on the coordinate-position input device 3702, so that the point-operating area 4100 can be displayed on an arbitrary position with a simple operation, and pointing to a display point on the screen 3703 can easily be performed.

In addition, each coordinate within the point-operating area 4100 are displayed in correlation to coordinate within all area on the image display surface one for one, so that a pointed position can easily be specified on the point-operating area 4100.

Furthermore, transform of the coordinate to which is pointed with the pointer within the point-operating area 4100 is correlated to movement of coordinate of the point on an image display surface, and the pointer 3704 is moved according to this transform so that the pointer 3704 on the screen 3703 can be operated in much the same way the mouse is operated.

In addition, a user selectably uses a pointing operation based on absolute coordinate and a pointing operation based on transform of coordinate as required, so that the user can use properly either the mouse emulation or the pointing operation based on absolute coordinate according to the situation.

Furthermore, layout information of display contents on a full display surface is displayed in the point-operating area 4100, so that a user can check the display contents in the point-operating area 4100, therefore, a pointing operation on a large-sized screen can easily be performed.

Furthermore, by momentarily pointing to some point within the point-operating area 4100 once or a plurality of times, a plurality of pointing states can be obtained according to a number of times of pointing, so that a pointing operation on a large-sized screen can easily be performed. By changing the display colors of the point-operating area 4100 according to a plurality of pointing states, malfunction and a miss operation of the system on pointing can be reduced.

For example, if a security function is provided in the display board system according to Embodiment 4 and a personal identification number is inputted through a coordinate-position input device, a PID number to be inputted may be seen by some other persons. Therefore, in Embodiment 6, a display board system that can prevent a PID number from being seen by other persons when a PID number is inputted in the display board system will be explained. Specifically, the display board system according to Embodiment 6 displays a ten-key on a position over which a person entering the number casts his shadow when viewed from other persons, so that the ten-key used for entering a PID number is hidden by the person entering it, which allows the ten-key not to be seen from other persons.

Figure 63:
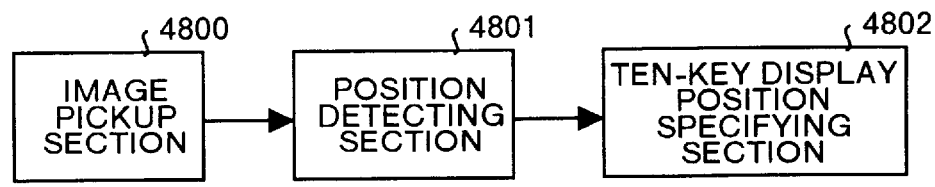
FIG. 63 is a block diagram showing a first example of the configuration of a display board system according to Embodiment 6 of the present invention.

FIG. 63 is a block diagram generally showing a first example of the configuration of the display board system according to Embodiment 6. This display board system comprises a coordinate-position inputting section (corresponding to the coordinate-position input device 102 in Embodiment 4) for detecting a position of a pointing body having pointed to an input surface (corresponding to the touch surface 201 in Embodiment 4) on the touch surface, and an image display section (corresponding to the PDP 101 in Embodiment 4) for displaying an image on a screen commonly used as the input surface. The display board system further comprises an image pickup section 4800 for picking up an image of a person who enters a PID number, a position detecting section 4801 for detecting a position of the person who enters a PID number according to the image picked up by the image pickup section 4800, and a ten-key display position specifying section 4802 for displaying the ten-key on the image display section according to the position obtained by the position detecting section 4801.

Figure 64:
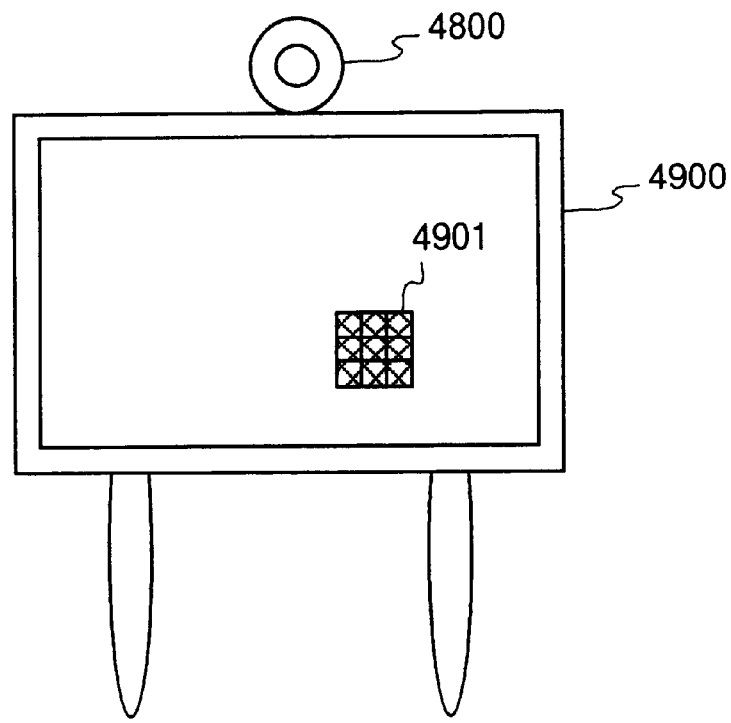
FIG. 64 is an appearance view of the first example of the configuration of the display board system according to Embodiment 6 of the present invention.

FIG. 64 is an appearance view showing a first example of the configuration of the display board system. In the first example of the configuration, the image pickup section (camera) 4800 for picking up an image of the person who enters a PID number standing in front of the section is provided in the display board system 4900. The image picked up by the camera 4800 as the image pickup section 4800 is sent to the position detecting section 4801 built in the display board system 4900. The position detecting section 4801 detects a position of the person from the image of the person picked up by the image pickup section 4800.

Figure 65:
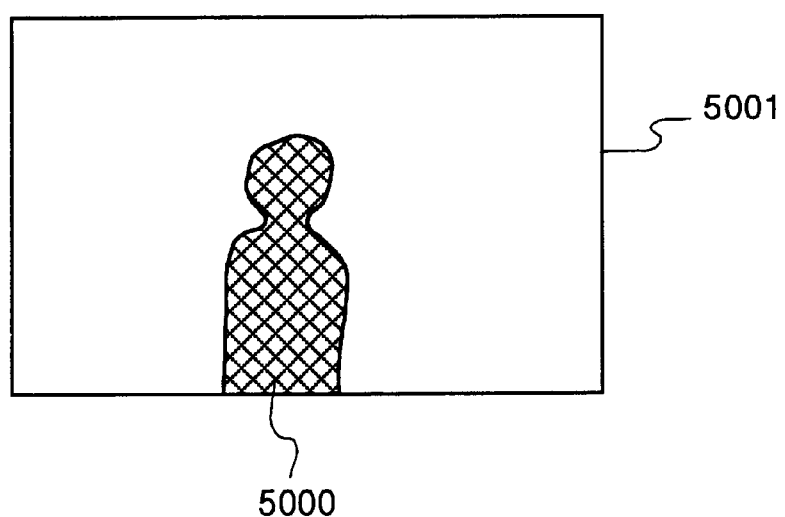
FIG. 65 explains an example of a method of detecting a position of a person from an image based on the first example of the configuration of the display board system according to Embodiment 6 of the present invention.

As a method of detecting a position of a person from an image thereof, various types of methods can be used. For example, at first a local frequency is computed on an inputted full image. Then, the frequency element obtained as described above are subjected to threshold processing, and as described in FIG. 65 the full image is separated into a portion (area 5000) with a high frequency included and a portion (area 5001) with less high frequency included. This processing is employed based on the fact that the image of a person focused on has comparatively more of high frequency elements but a background which is not focused on has less high frequency elements. Herein the portion (area 5000) with high frequencies included in the full image is predicted as a portion of a person. Then, the center of gravity (GX, GY) in the area 5000 where the person is supposed to be photographed is obtained. At which position on the image the person is present can be computed through the processing above.

As described above, when the position of the person is detected as, for instance, (GX, GY), on which position of the input surface the ten-key should be displayed is computed from this position (GX, GY) in the ten-key display position specifying section 4802. As a method of deciding a position of the ten-key to be displayed to the position (GX, GY), various types of methods can be used. For instance, as it is conceivable that the same position as that where the person is standing is probably the hardest-to-view position from other persons, so that the ten-key 4901 is displayed on that position. Furthermore, positions where not only the person who enters a PID number but also viewers are present are presumed from the images and the ten-key 4901 may be displayed on the position obtained through such consideration.

Figure 66:
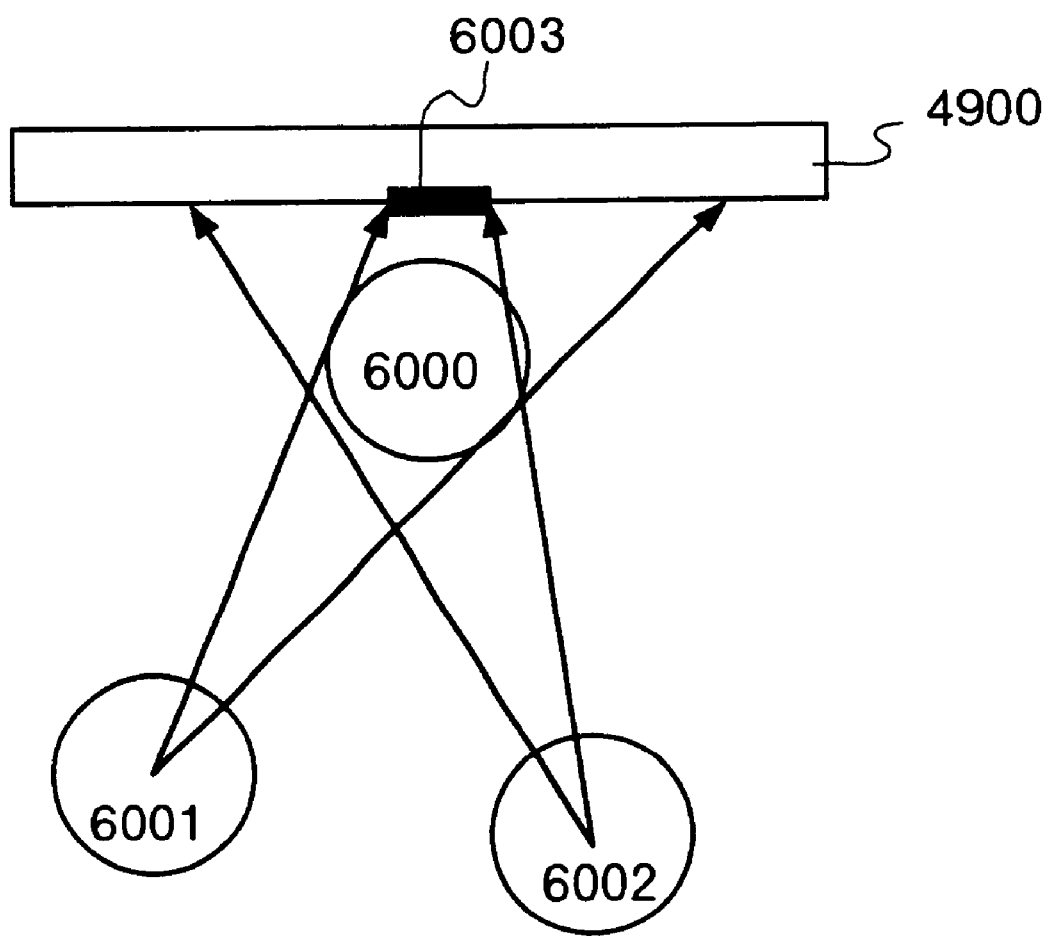
FIG. 66 explains a method of deciding a position where a ten-key is to be displayed in the display board system according to Embodiment 6 of the present invention.

As one example, description is made for a method of deciding a displayed position with reference to FIG. 66. FIG. 66 is a view showing the display board system 4900 when viewed from the upper side thereof. As shown in FIG. 66, for persons 6001 and 6002, a position over which a person 6000 who enters a PID number casts his shadow is an area 6003 indicated by a heavy line, therefore, the ten-key 4901 is displayed on a position within this area 6003. Through the processing described above, the ten-key 4901 is displayed as shown in FIG. 64. Thus, the ten-key 4901 for entry of a PID number is hidden behind the person who enters a PID number so that nobody can see the ten-key.

Figure 67:
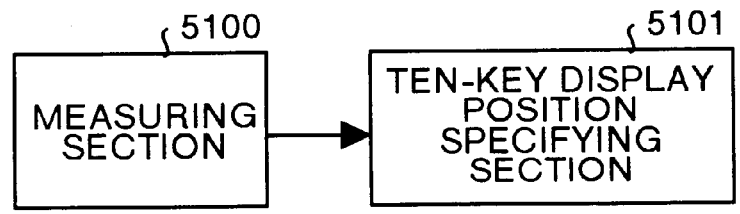
FIG. 67 is a block diagram showing a second example of the configuration of the display board system according to Embodiment 6 of the present invention.

FIG. 67 is a block diagram generally showing a second example of the configuration of the display board system according to Embodiment 6. This display board system comprises a coordinate-position inputting section (corresponding to the coordinate-position input device 102 in Embodiment 4) for detecting a position of a pointing body having pointed to an input surface (corresponding to the touch surface 201 in Embodiment 4) on the input surface and an image display section (corresponding to the PDP 101 in Embodiment 4) for displaying an image on a surface commonly used as the input surface. The display board system further comprises a measuring section 5100 for measuring a three-dimensional position of a person who enters a PID number, and a ten-key display position specifying section 5101 for displaying a ten-key on the image display section according to the three-dimensional position obtained by the measuring section 5100.

Figure 68:
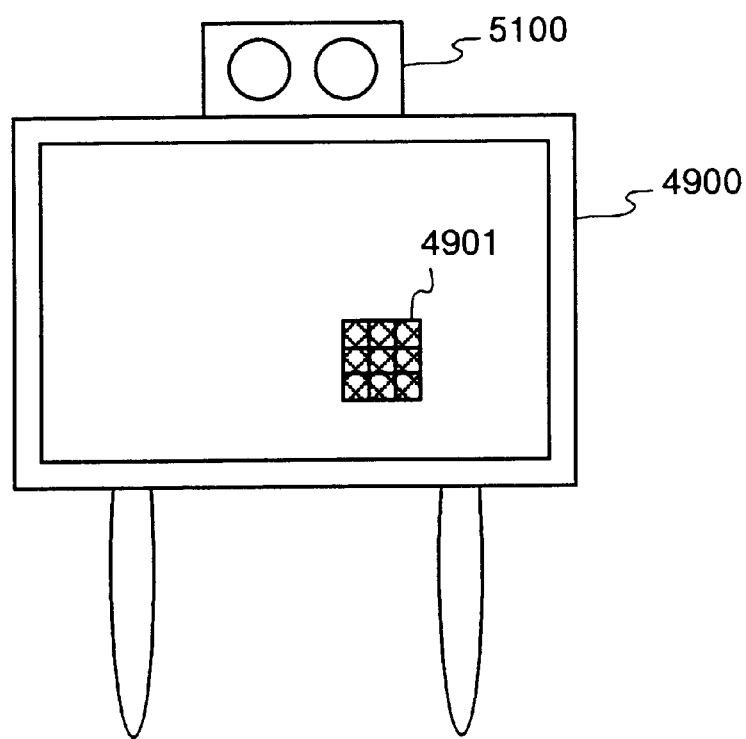
FIG. 68 is an appearance view showing the second example of the configuration of the display board system according to Embodiment 6 of the present invention.

FIG. 68 is an appearance view showing the second example of the configuration of the display board system. In the second example, the measuring section (three-dimensional position measuring device) 5100 for computing a three-dimensional position of a person who enters a PID number by standing in front of the display board system 4900 is provided. As the three-dimensional position measuring device 5100, various types of device can be used. For example, a device using a principle of stereoscopic vision with a twin-lens camera and a device using an optical cutting method of projecting a reference pattern and reading displacement of the pattern from its image or the like can be used.

In the display board system 4900, the measuring section 5100 detects a three-dimensional position of a person (RX, RE, RZ), and the ten-key display position specifying section 5101 decides on which position of the input surface the ten-key should be displayed. As a method of deciding a position of a ten-key to be displayed with respect to the position (RX, RY, RZ), various types of methods can be used. For example, the method described in the first configuration can be used. When the position of the ten-key to be displayed to the position (RX, RY, RZ) is decided, the ten-key 4901 is displayed on the decided display position as shown in FIG. 68. Thus, the ten-key 4901 for entry of a PID number is hidden behind the person 6000 who enters a PID number so as not to be seen from other persons because of the same principle having been described with reference to FIG. 66.

Figure 69:
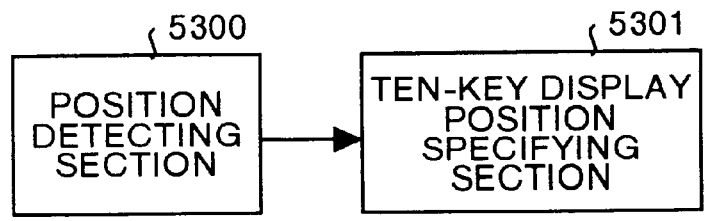
FIG. 69 is a block diagram showing a third example of the configuration of the display board system according to Embodiment 6 of the present invention.

FIG. 69 is a block diagram generally showing a third example of the configuration of the display board system according to Embodiment 6. This display board system comprises a coordinate-position inputting section (corresponding to the coordinate-position input device 102 in Embodiment 4) for detecting a position of a pointing body having pointing to an input surface (corresponding to the touch surface 201 in Embodiment 4) on the input surface and an image display section (corresponding to the PDP 101 in Embodiment 4) for displaying an image on a surface commonly used as the input surface. The display board system further comprises a position detecting section 5300 for detecting a position of a person who enters a PID number by getting on the section, and a ten-key display position specifying section 5301 for displaying a ten-key on the image display section according to the position obtained by the position detecting section 5300.

Figure 70:
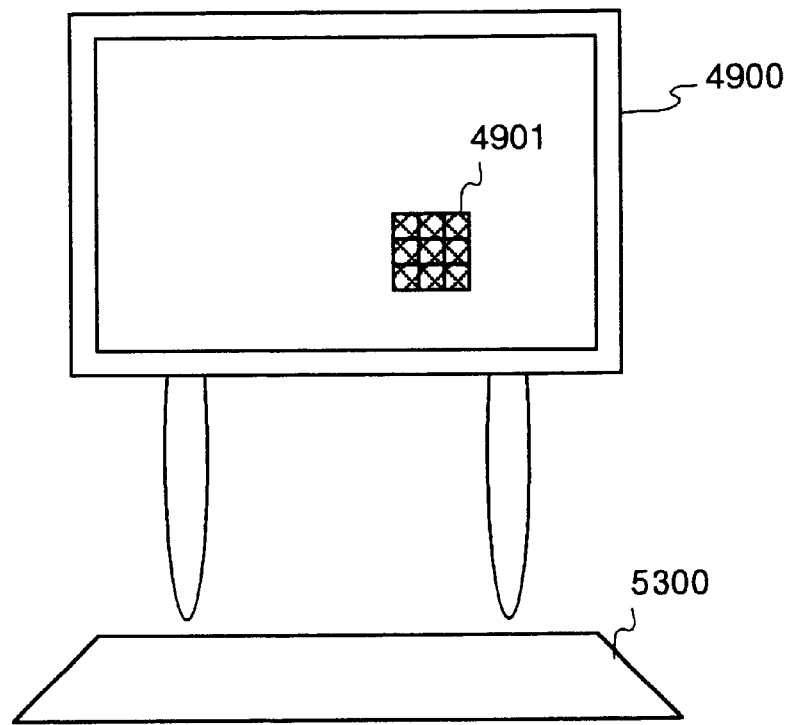
FIG. 70 is an appearance view showing the third example of the configuration of the display board system according to Embodiment 6 of the present invention.

FIG. 70 is an appearance view showing the third example of the configuration of the display board system. In the third example, sheet type of position detecting section (position detecting device) 5300 is provided therein so that a position of a person who enters a PID number standing in front of the display board system 4900 can be found out. As a position detecting method by this position detecting device 5300, various types of methods can be used. For example, a method for detecting a position with a pressure applied on a sheet surface as a pressure-sensitive sheet can be use.

In the display board system 4900, the position detecting section 5300 detects a position of a person (SX, SY), and the ten-key display position specifying section 5301 computes on which position of the input surface the ten-key should be displayed. As a method of deciding a position of a ten-key to be displayed to the position (SX, SY), various types of methods can be used. For example, the method described in the first configuration can be used. When the position of the ten-key to be displayed to the position (SX, SY) is decided, the ten-key 4901 is displayed on the decided display position as shown in FIG. 70. Thus, the ten-key 4901 for entry of a PID number is hidden behind the person 6000 who enters a PID number so as not to be seen from other persons because of the same principle having been described with reference to FIG. 66.

Figure 71:
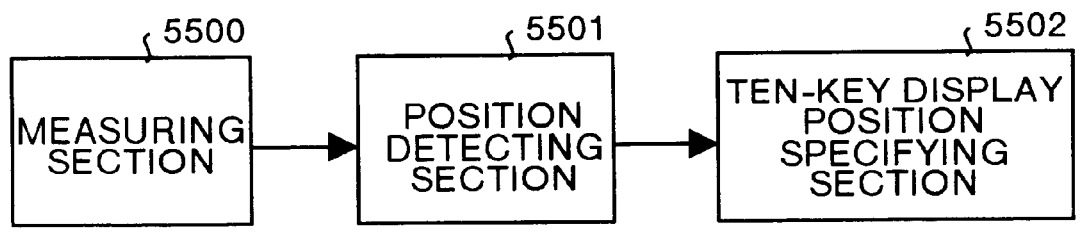
FIG. 71 is a block diagram showing a fourth example of the configuration of the display board system according to Embodiment 6 of the present invention.

FIG. 71 is a block diagram generally showing a fourth example of the configuration of the display board system according to Embodiment 6. This display board system comprises a coordinate-position inputting section (corresponding to the coordinate-position input device 102 in Embodiment 4) for detecting a position of a pointing body having pointed to an input surface (corresponding to the touch surface 201 in Embodiment 4) on the input surface and an image display section (corresponding to the PDP 101 in Embodiment 4) for displaying an image on a surface commonly used as the input surface. The display board system further comprises a plurality of measuring sections 5500 located in an array, a position detecting section 5501 for detecting a position of a person who enters a PID number according to the distance measured by the measuring sections 5500, and a ten-key display position specifying section 5502 for displaying a ten-key on the image display section according to the position obtained by the position detecting section 5501.

Figure 72:
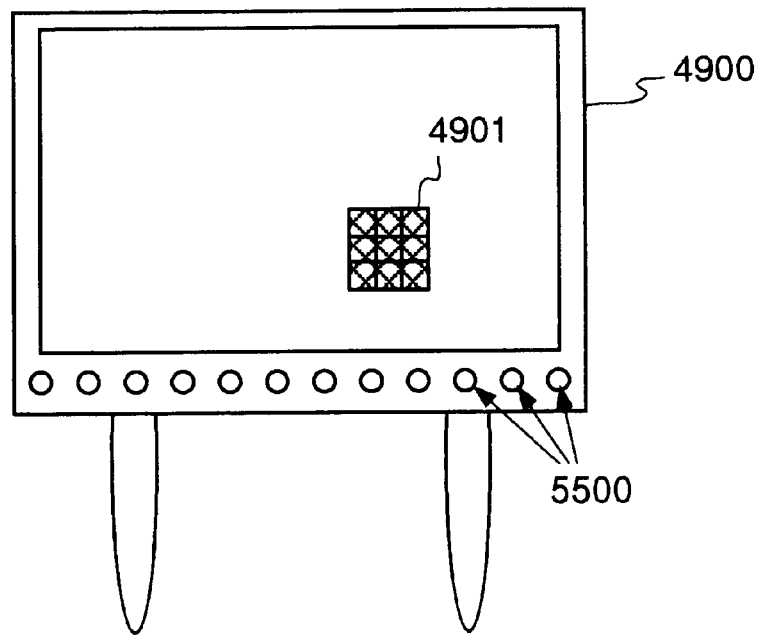
FIG. 72 is an appearance view showing the fourth example of the configuration of the display board system according to Embodiment 6 of the present invention.

FIG. 72 is an appearance view showing the fourth example of the configuration of the display board system. In the fourth example, the measuring section (an array with a plurality of distance measuring sensors) 5500 for measuring a distance up to an object extending in a first-dimensional direction (a vertical direction to the input surface) by using ultrasonic waves are arranged in an array on the display board system 4900. With this feature, positional information (distance information) up a person standing in front of the display board 4900 can be obtained. The distance information obtained by the plurality of distance measuring sensors 5500 as described above is given to the position detecting section 5501, and the position detecting section 5501 identifies a position of a person who enters a PID number according to the distance information obtained from the measuring section 5500. As a method of identifying a position of a person who enters a PID number from the range information obtained from the range finding section 5500, various types of methods can be used. For example, a position of the distance measuring sensors showing the shortest distance can be decided as a position (DX) of the person who enters a PID number.

When the position (DX) of the person is obtained as described above, on which position of the input surface from this position (DX) the ten-key should be displayed is computed by the ten-key display position specifying section 5502. As a method of deciding a position of a ten-key to be displayed to the position (DX), various types of methods can be used. For example, the method described in the first configuration can be used. When the position of the ten-key to be displayed to the position (DX) is decided, the ten-key 4901 is displayed on the decided display position as shown in FIG. 72. Thus, the ten-key 4901 for entry of a PID number is hidden behind the person 6000 who enters a PID number so as not to be seen from other persons because of the same principle described with reference to FIG. 66.

Figure 73:
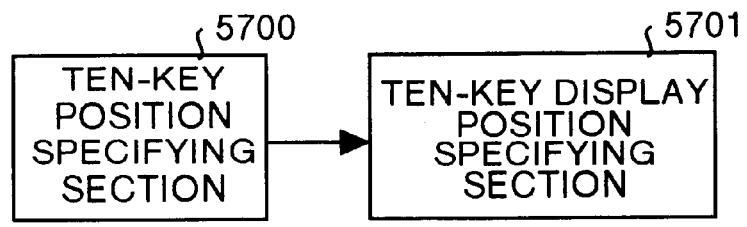
FIG. 73 is a block diagram showing a fifth example of the configuration of the display board system according to Embodiment 6 of the present invention.

FIG. 73 is a block diagram generally showing a fifth example of the configuration of the display board system according to Embodiment 6. This display board system comprises a coordinate-position inputting section (corresponding to the coordinate-position input device 102 in Embodiment 4) for detecting a position of a pointing body having pointed to an input surface (corresponding to the touch surface 201 in Embodiment 4) on the input surface and an image display section (corresponding to the PDP 101 in Embodiment 4) for displaying an image on a surface commonly used as the input surface. The display board system further comprises a ten-key position specifying section 5700 for specifying a position of a ten-key to be displayed, and a ten-key display position specifying section 5701 for displaying a ten-key on a position specified by the ten-key position specifying section 5700.

Figure 74:
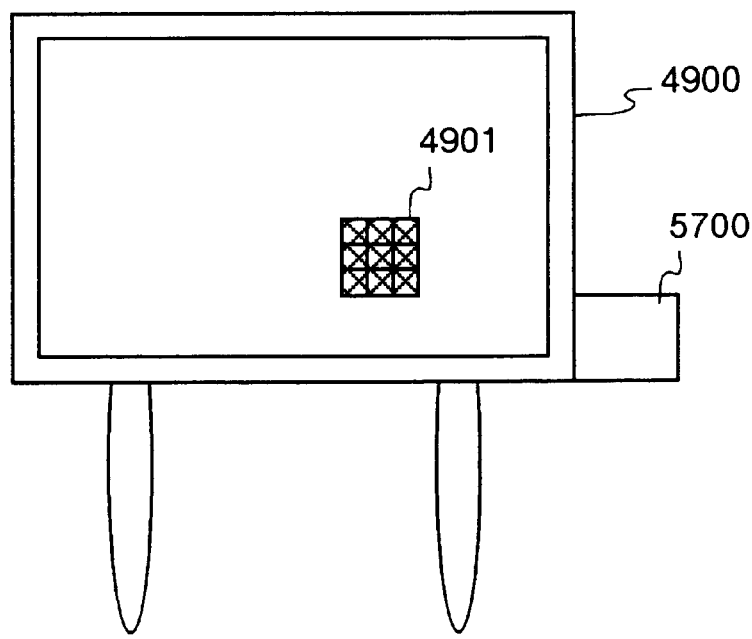
FIG. 74 is an appearance view showing the fifth example of the configuration of the display board system according to Embodiment 6 of the present invention.

FIG. 74 is an appearance view showing the fifth example of the configuration of the display board system. In the fifth example, the ten-key position specifying section 5700 for enabling entry of a position where a ten-key is to be displayed is provided on the display board system 4900. A person who enters a PID number can specify on which part of an input surface the ten-key should be displayed by using this ten-key position specifying section 5700. As a method of specifying a position of a ten-key using the ten-key position specifying section 5700, various types of methods can be used. For example, methods of manually inputting coordinate of a position, or of displaying a thumbnail image to input a desired position by touching it can be employed.

Also in this fifth example of the configuration, an input window (a ten-key display specifying window) for specifying a position of a ten-key to be displayed with gesture or the like may be displayed on an input surface without using the ten-key position specifying section 5700.

Figure 75:
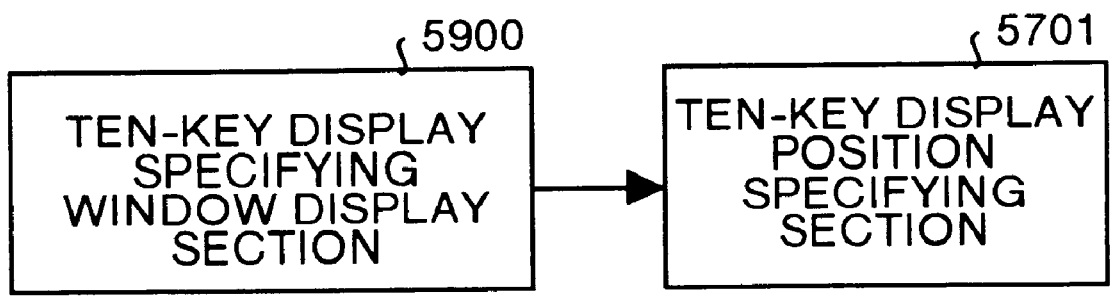
FIG. 75 is a block diagram showing configuration, for displaying an input window (a ten-key display specifying window) to specify a position where a ten-key is displayed on an entry screen, applicable in the display board system according to Embodiment 6 of the present invention.

FIG. 75 is a block diagram generally showing an example of configuration of a display board system which can display an input window (a ten-key display specifying window) for specifying a ten-key display position on an input surface. The display board system shown in FIG. 75 comprises a coordinate-position inputting section (corresponding to the coordinate-position input device 102 in Embodiment 4) for detecting a position of a pointing body having pointed to an input surface (corresponding to the touch surface 201 in Embodiment 4) on the input surface and an image display section (corresponding to the PDP 101 in Embodiment 4) for displaying an image on a surface commonly used as the input surface. The display board system further comprises a ten-key display specifying window display section 5900 for displaying a ten-key display specifying window for specifying a ten-key display position on the image display section, and a ten-key display position specifying section 5701 for displaying the ten-key on a specified position, when an operation of specifying a ten-key display position is performed to the ten-key display specifying window displayed on the image display section by the ten-key display specifying window display section 5900.

Figure 76:
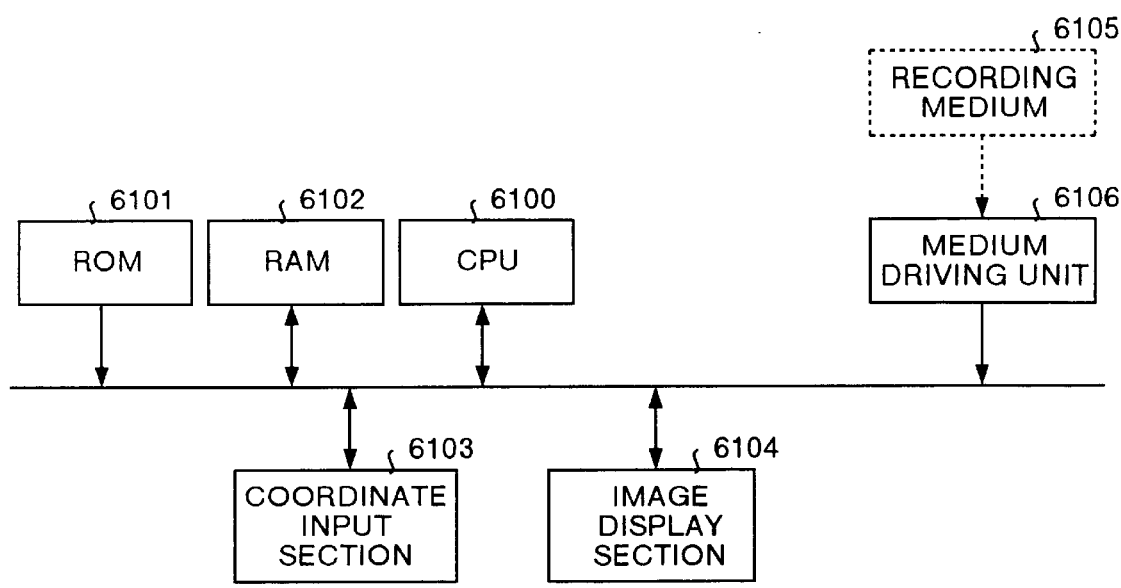
FIG. 76 is a block diagram showing hardware configuration of the display board system according to Embodiment 6 of the present invention.

FIG. 76 is a block diagram showing an example of hardware configuration of the display board system shown in any of the FIG. 63, FIG. 67, FIG. 69, FIG. 71, FIG. 73 and FIG. 75. As shown in FIG. 76, various types of processing in the display board system are realized by, for instance, a microcomputer or a DSP (digital signal processor) and software. More specifically, the display board system comprises at least a CPU 6100 for providing controls over the system as a whole, a ROM 6101 with control programs for the CPU 6100 or the like stored therein, a RAM 6102 used as a work area for the CPU 6100, a coordinate inputting section 6103, and an image display section 6104.

Herein the CPU 6100 has functions of the position detecting section 4801 and ten-key display position specifying section 4802 in FIG. 63, the measuring section 5100 and ten-key display position specifying section 5101 in FIG. 67, the position detecting section 5300 and ten-key display position specifying section 5301 in FIG. 69, the position detecting section 5501 and ten-key display position specifying section 5502 in FIG. 71, the ten-key position specifying section 5700 and ten-key display position specifying section 5701 in FIG. 73, or the ten-key display specifying window display section 5900 and ten-key display position specifying section 5701 in FIG. 75.

It should be noted that, the functions of the CPU 6100 described above can be provided in a form of, for example, a software package (more specifically, information recording medium such as a CD-ROM). Therefore, a medium driving unit 6106 for driving an information recording medium 6105 is provided in the example of FIG. 76.

In other words, the functions of the display board system in Embodiment 6 can be realized also by making a built-in processor system read a program recorded in the information recording medium such as a CD-ROM and making a microprocessor or the like execute ten-key display processing. In this case, the program (namely, the program used in the hardware system) for executing the processing described in Embodiment 6 can be provided in a state in which the program is recorded in a medium. An information recording medium with a program recorded therein is not limited to a CD-ROM, and any medium such as a ROM, a RAM, a flexible disk, and a memory card may be used. The program recorded in a medium is installed in a storage device incorporated in hardware system, for example, in a RAM 6102, with which this program is executed and the above mentioned processing function above can be realized.

The program for realizing the processing described in Embodiment 6 may be provided not only in the form of a medium but also through communications (e.g., from a server).

It should be noted that the description for each configuration above has assumed the case shown in FIG. 66 as a method of deciding a display position, but if only one viewer is present there, a ten-key for inputting a PID number may be displayed on an extension between the viewer and a person who enters a PID number. If there are a plurality of viewers, various types of deciding method can be used according to each situation taking into consideration positions of the viewers and the person who enters a PID number, such that a ten-key for a PID number is displayed in a blind area from the viewers.

The processing described here is applicable not only to the display board system but also to various types of input device requiring entry of a PID number such as an ATM for bank and a device provided at the entrance of a building that recognizes and allows people to enter inside the building.

As described above, with the display board system according to Embodiment 6, a person who enters a PID number is photographed, a position of the person is detected according to the photographed image, and a ten-key is displayed according to the detected position, so that the ten-key can be displayed at the position hidden by the person, therefore, a possibility that a PID number being inputted is seen by other persons can be reduced.

Also a three-dimensional position of the person who enters a PID number is determined, and a ten-key is displayed according to the determined three-dimensional position, so that a display position of the ten-key can more accurately be decided.

When the person gets on a sheet type of position detecting device, the position of the person is detected, and a ten-key is displayed according to the detected position. Thus, for example, a position where the person stands on the floor in front of an input surface can be detected, therefore, a display position of the ten-key can more accurately be decided.

Furthermore, distance up to the object is measured, a position of the person is detected according to the measured value, and a ten-key is displayed according to the detected position, so that a display position of the ten-key can more accurately be decided.

Furthermore, a display position of a ten-key is specified, and the ten-key is displayed on the specified position. Thus, for example, a display position of the ten-key can manually be inputted, therefore, a display position of the ten-key can be decided according to situation.

Furthermore, a ten-key display specifying window for specifying a display position of a ten-key is displayed, and the ten-key is displayed on a position inputted in the ten-key display specifying window. Thus, a manual input device for specifying a display position of the ten-key can be displayed as software, therefore, a low-cost input device can be provided.

A display board system according to Embodiment 7 is applicable to the display board system according to Embodiment 4, and is used for easily generating a software keyboard and enabling insurance of security with a simple operation.

The display board system according to Embodiment 7 has a coordinate-position input device (corresponding to the coordinate-position input device 102 in Embodiment 4) provided on the surface of an image display unit (corresponding to the PDP 101 in Embodiment 4) and a signal control section. The signal control section has a touched area computing section, a touched position detecting section, a touched area determining section, a software keyboard generating section, and a drawing section. Herein, as described in Embodiment 4, the display surface and touch surface (write-in surface) of a display board is formed with the image display unit and coordinate-position input device.

When the touch surface is touched with a fingertip or the like, the coordinate-position input device outputs signals corresponding to the touched area and touched position to the touched area computing section as well as to the touched position detecting section. The touched position detecting section detects coordinates of the point on the touch surface touched with the fingertip or the like from the signals received from the coordinate-position input device. At the same time, the touched area computing section computes a touched area (area of the touched portion) when the touch surface is touched with the fingertip or the like according to the signals received from the coordinate-position input device. The touched area determining section compares the touched area computed by the touched area computing section to a preset threshold value, and determines that a drawing or the like is created on the touch surface when the computed touched area is smaller than the threshold value. The drawing section executes drawing processing according to the touched area computed in the touched area computing section as well as to the coordinates detected in the touched position detecting section to display an image on the image display unit, and also inputs the coordinate (coordinate group) of the image displayed after being subjected to the drawing processing into a computer. When it is determined that the touched area exceeds the threshold value, the touched area determining section determines that the touch surface has been touched with, for instance, a palm, and the software keyboard generating section generates a software keyboard and displays it on the touched position of the image display unit in a size previously set.

By touching the touch surface with, for instance, a palm, a software keyboard can easily be displayed on the image display unit. By operating the displayed software keyboard in the same manner as a keyboard is operated, a user can easily execute various types of operation in the display board system. For example, the display board system can execute authentication processing on permission to access the system according to a PID number inputted through the software keyboard.

Figure 77:
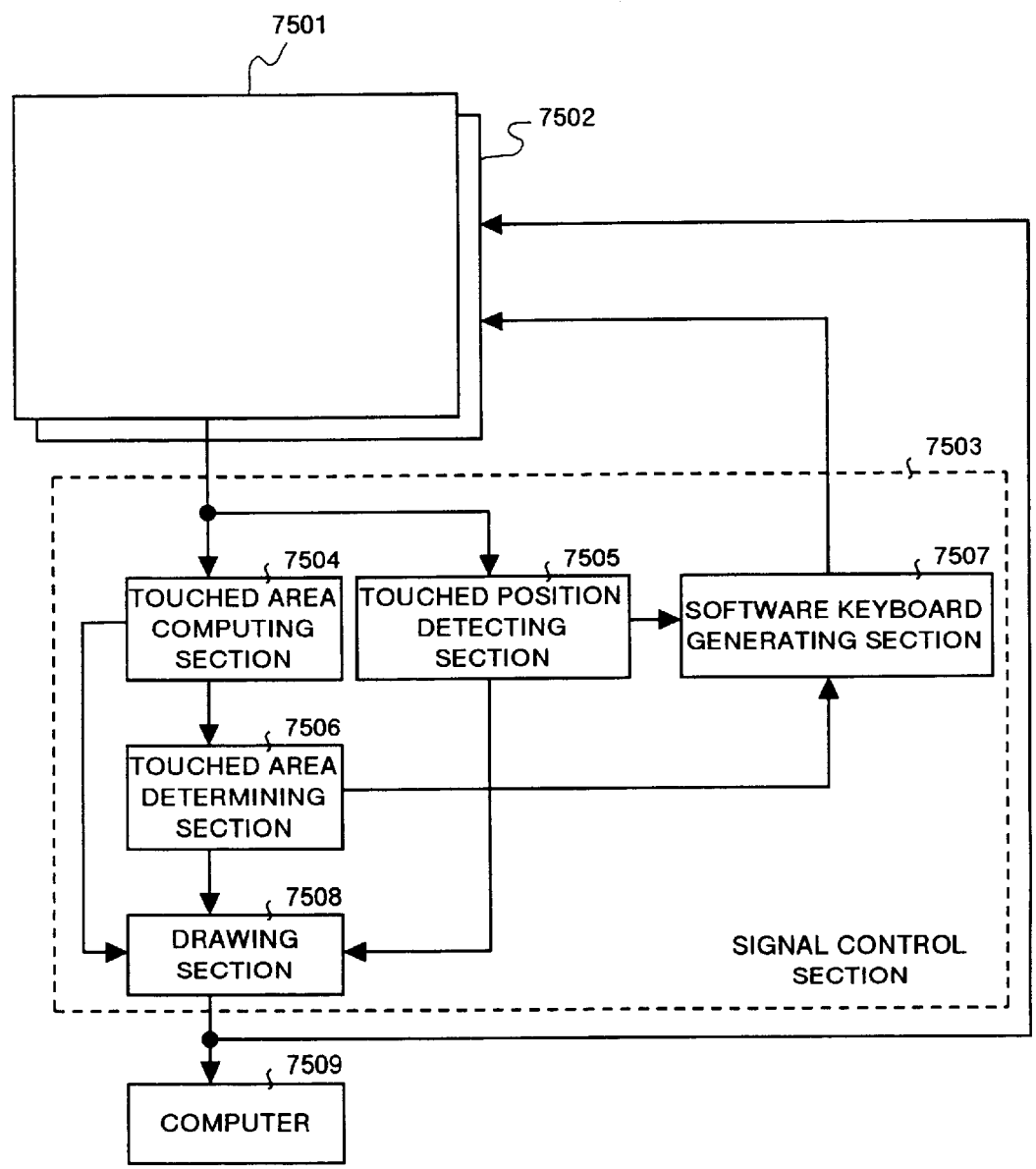
FIG. 77 is a block diagram showing a first example of the configuration of a display board system according to Embodiment 7 of the present invention.

FIG. 77 is a block diagram showing a first example of the configuration of a display board system according to Embodiment 7. As shown in FIG. 77, the display board system has a coordinate-position input device 7501 (corresponding to the coordinate-position input device 102 in Embodiment 4), an image display unit 7502 (corresponding to the PDP 101 in Embodiment 4), and a signal control section 7503. The signal control section 7503 has a touched area computing section 7504, a touched position detecting section 7505, a touched area determining section 7506, a software keyboard generating section 7507 and a drawing section 7508.

Figure 78:
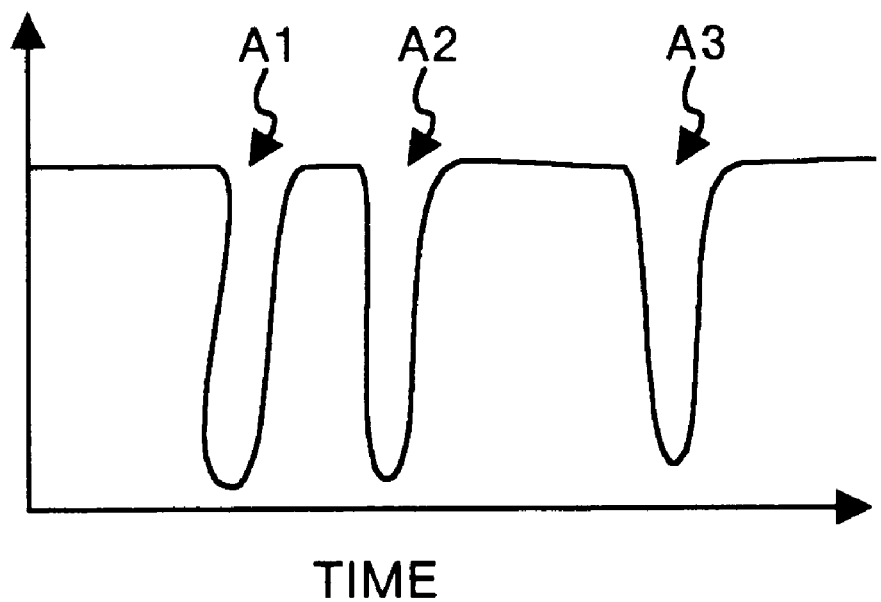
FIG. 78 shows a waveform outputted from a coordinate-position input device in the first example of the configuration of the display board system according to Embodiment 7 of the present invention.

When the touch surface is touched with a fingertip or a pen, the coordinate-position input device 7501 outputs a signal according to the touched area and touched position as shown in FIG. 78. The signal value of this signal changes in response to a portion of the light blocked by a fingertip or the like. In a screenful time-series signal, by integrating each time when the change is generated, an area of the portion on the touch surface where the fingertip touches can be computed. Then the touched area computing section 7504 computes each area of portions A1, A2, and A3 where light is blocked by touching the touch surface with the fingertip according to the screenful time-series signal outputted from the coordinate-position input device 7501. Then the touched position detecting section 7505 computes coordinates of portions A1, A2 and A3 where the light is blocked from the screenful time-series signal outputted from the coordinate-position input device 7501. The touched area determining section 7506 compares the touched area computed by the touched area computing section 7504 with a preset threshold value. The software keyboard generating section 7507 generates, when it is determined in the touched area determining section 7506 that the touched area exceeds the threshold value, a software keyboard and displays it on some position of the image display unit corresponding to the touched position. The drawing section 7508 executes, when it is determined in the touched area determining section 7506 that the touched area is smaller than the threshold value, drawing processing according to the touched area and touched position on the touch surface, displays an image on the image display unit 7502, and also inputs coordinate (coordinate group) of the image displayed after being subject to the drawing processing in the computer 7509.

Figure 79:
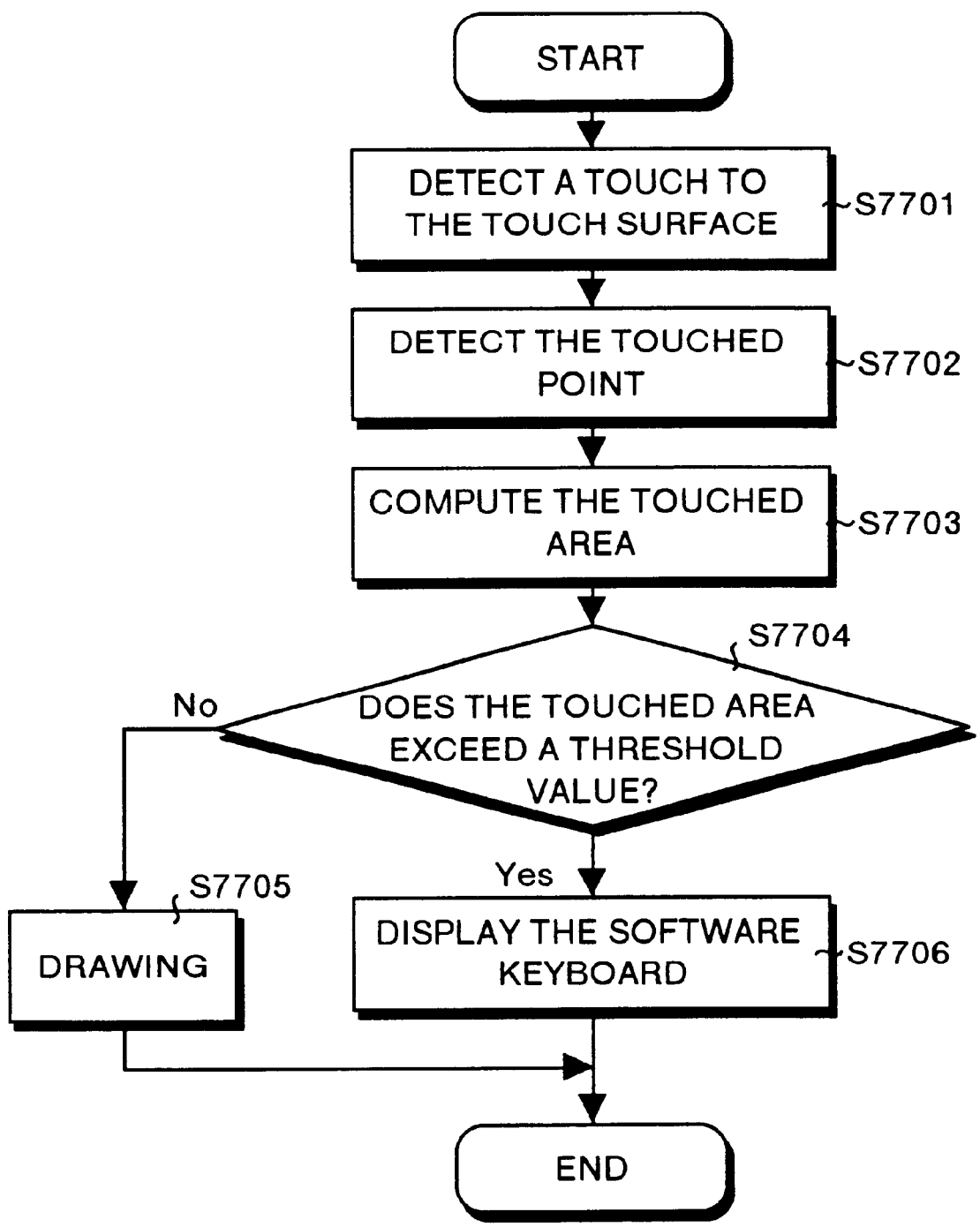
FIG. 79 is a flow chart of operations of the first example of the configuration of the display board system according to Embodiment 7 of the present invention.

Description is made for an operation when the touch surface of the display board system configured as described above is touched with the fingertip or the like with reference to the flow chart in FIG. 79. When the touch surface is touched with the fingertip or the like, the coordinate-position input device 7501 outputs signals corresponding to the touched area and touched position to the touched area computing section 7504 as well as to the touched position detecting section 7505 (step S7701).

The touched position detecting section 7505 detects coordinates of a position on the touch surface touched with the fingertip or the like from the signal received from the coordinate-position input device 7501 (step S7702). At the same time, the touched area computing section 7504 computes an area touched with the fingertip according to the signal received from the coordinate-position input device 7501 (step S7703).

The touched area determining section 7506 compares the touched area computed by the touched area computing section 7504 with the preset threshold value (step S7704), and determines that a graphic or the like is created on the touch surface when the computed touched area is smaller than the threshold value. In response to this determination, the drawing section 7508 executes drawing processing according to the touched area computed in the touched area computing section 7504 as well as according to the coordinate detected in the touched position detecting section 7505 to display an image on the image display unit 7502, and also inputs coordinate (coordinate group) of the image displayed after being subjected to the drawing processing to the computer 7509 (step S7705).

When it is determined that the touched area exceeds the threshold value, the touched area determining section 7506 determines that the touch surface has been touched with, for instance, a palm. In response to this determination, the software keyboard generating section 7507 generates a software keyboard and displays it on some position of the image display unit 7502 corresponding to the touched position in a size previously set (step S7706).

As described above, by touching the touch surface with, for instance, a palm, the software keyboard can easily be displayed on the image display unit 7502. By operating the displayed software keyboard in the same manner as that when a keyboard is operated, various types of operation can easily be executed.

In the first example of the configuration, description has been made for the case where a software keyboard in a certain size is generated in the software keyboard generating section 7507 and displayed on the image display unit 7502. However, the software keyboard generating section 7507 can also display the software keyboard to be displayed on the image display unit 7502 in a size specified by an operator. For example, when the user touches the touch surface with the palm, the software keyboard having a size corresponding to the touched area is generated in the software keyboard generating section 7507 and displayed on the image display unit 7502. As described above, by displaying the palm-sized software keyboard, the most easy-to-use-sized software keyboard can be displayed.

Next description is made for an example of a security function by using the software keyboard displayed on the image display unit 7502 as described above.

Figure 80:
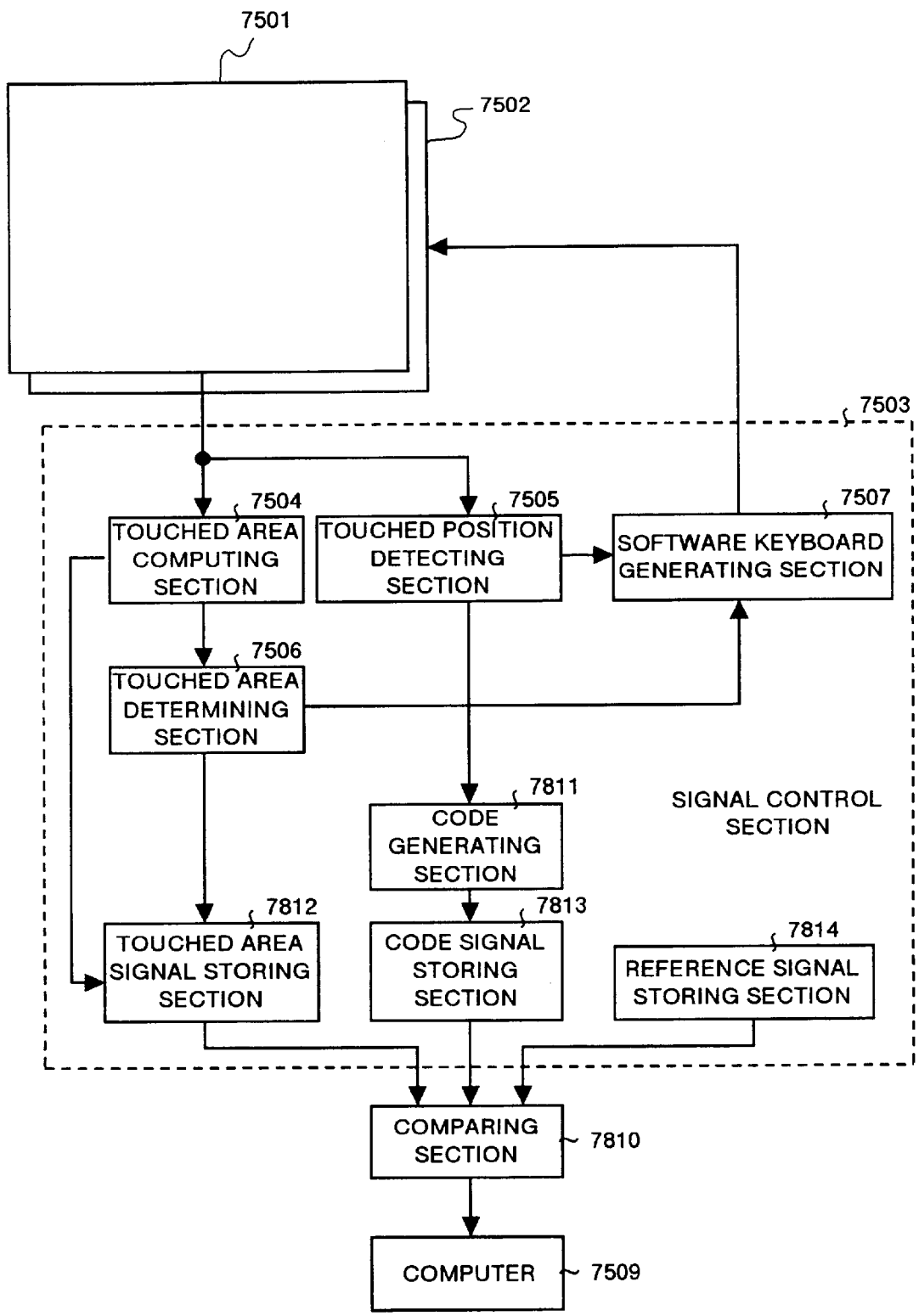
FIG. 80 is a block diagram showing a second example of the configuration of the display board system according to Embodiment 7 of the present invention.

FIG. 80 is a block diagram showing a second example of the configuration of the display board system. As shown in FIG. 80, the display board system has a coordinate-position input device 7501, an image display unit 7502, a signal control section 7503, and a comparing section 7810. The signal control section 7503 has a touched area computing section 7504, a touched position detecting section 7505, a touched area determining section 7506, a software keyboard generating section 7507, and in addition, a code generating section 7811, a touched area signal storing section 7812, a code signal storing section 7813 and a reference signal storing section 7814.

The code generating section 7811 converts a coordinate signal of a touched position on the touch surface detected in the touched position detecting section 7505 to a code signal according to a preset table. The touched area signal storing section 7812 successively stores, when a touched area computed in the touched area computing section 7504 is smaller than the threshold value, the computed touched areas therein. The code signal storing section 7813 successively stores code signals converted in the code generating section 7811. The reference signal storing section 7814 stores a series of code signals for the users previously authorized to use the display board system and also stores a series of touched areas each as reference signals. The comparing section 7810 executes authentication processing by comparing an input signal consisting of the touched area signal series stored in the touched area signal storing section 7812 and the code signal series stored in the code signal storing section 7813 with the reference signals stored in the reference signal storing section 7814.

Figure 81:
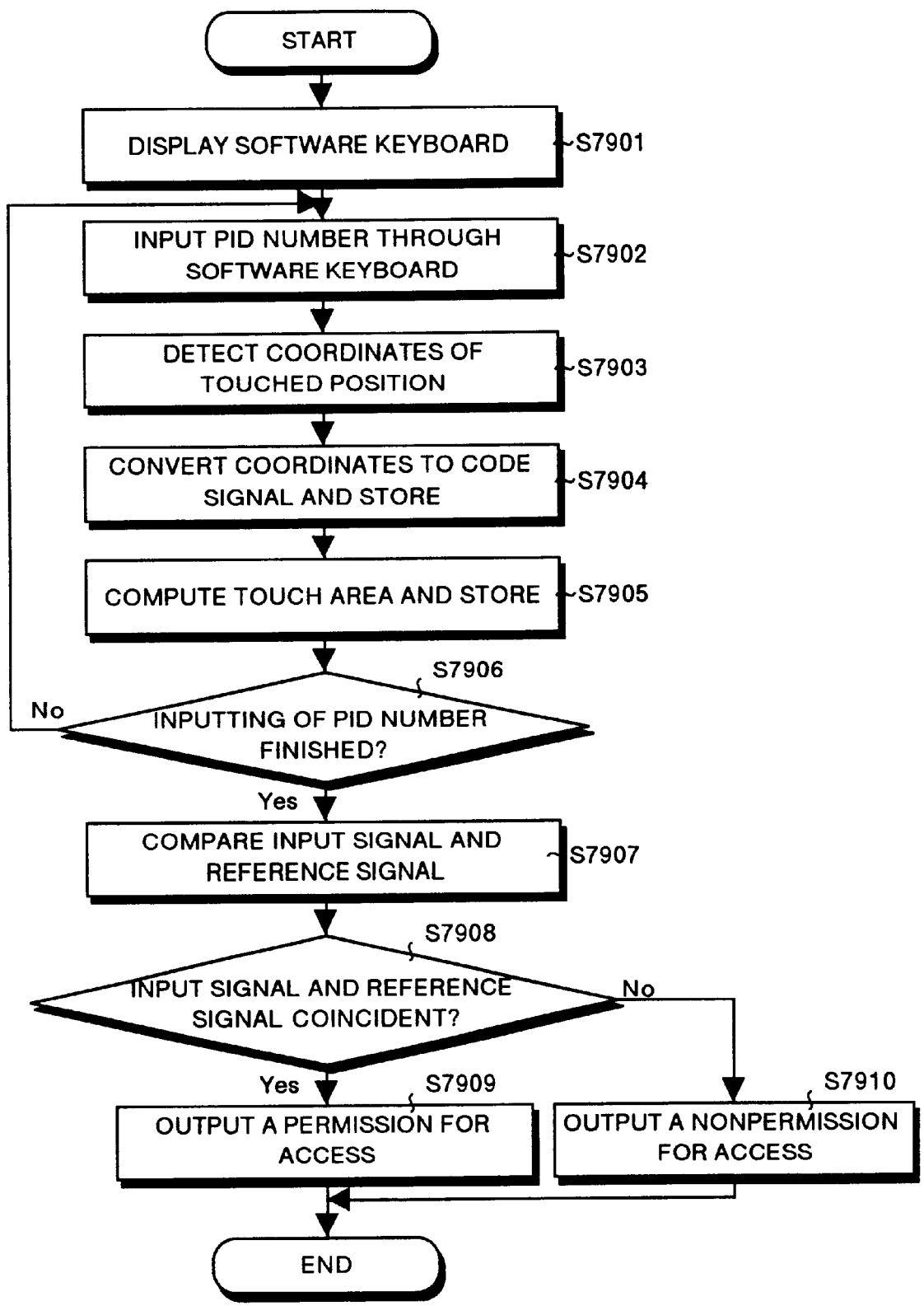
FIG. 81 is a flow chart of operations of the second example of the configuration of the display board system according to Embodiment 7 of the present invention.

Description is made for an operation of the display board system configured as described above with reference to the flow chart in FIG. 81. As described in the first example of the configuration, the software keyboard is displayed on the image display unit 7502 (step S7901), the user touches the touch surface corresponding to the software keyboard with his or her fingertip or the like to enter a PID number or a password (step S7902). Herein when a ten-key is displayed as a software keyboard, a PID number is inputted, while a password is inputted when a full key is displayed.

The touched position detecting section 7505 detects coordinates of each touched position on the coordinate-position input device 7501 and sends the coordinates to the code generating section 7811 (step S7903). The code generating section 7811 converts the coordinates into code signals and successively stores the code signals in the code signal storing section 7813 (step S7904).

On the other hand, the touched area computing section 7504 computes a touched area when the user touches the touch surface with his or her fingertip to enter the PID number or the like, and stores the touched area in the touched area signal storing section 7812 (step S7905).

When this operation of inputting a PID number or a password is finished (step 7906), the comparing section 7810 reads out the code signal series stored in the code signal storing section 7813 and the touched area signal series stored in the touched area signal storing section 7812, and compares the signals consisting of the read-out code signal series and the touched area signal series with the reference signals consisting of the code signal series of the users authorized to access the computer system and the touched area signal series each previously registered in the reference signal storing section 7814 (steps S7906 and S7907). As this comparing method, a simple template matching can be used for comparison of code signals, and Viterbi decoding based on DP matching and HMM and a neural network technology can be used for comparison of signals in touched area series because the signals in the touched area series are the signals changing with time.

As a result of this comparison, when the reference signal coincident with the input signal is registered in the reference signal storing section 7814, it is determined that the user has been registered, and permission to the user to access the system is sent to the computer 7509 (steps S7908 and S7909). When the reference signal coincident with the input signal is not registered in the reference signal storing section 7814, inhibition to access the system is sent to the computer 7509 (steps S7908 and S7910). The computer 7509 displays the received result on the image display unit 7502.

As described above, determination is made as to whether the user is an authorized person or not according to the code signal series as well as according to the touched area signal series indicating a touched position when the PID number and password are inputted from the software keyboard. Therefore, high-reliability authentication for accessing the system can be verified without user's any particular operation required for authentication.

In the second example of the configuration, description has been made for the case where access to the system should be permitted or not depending on the PID number and password inputted from the software keyboard. However, authentication processing as to whether permission to access the system is given or not may be performed according to handwriting of user's signature.

Figure 82:
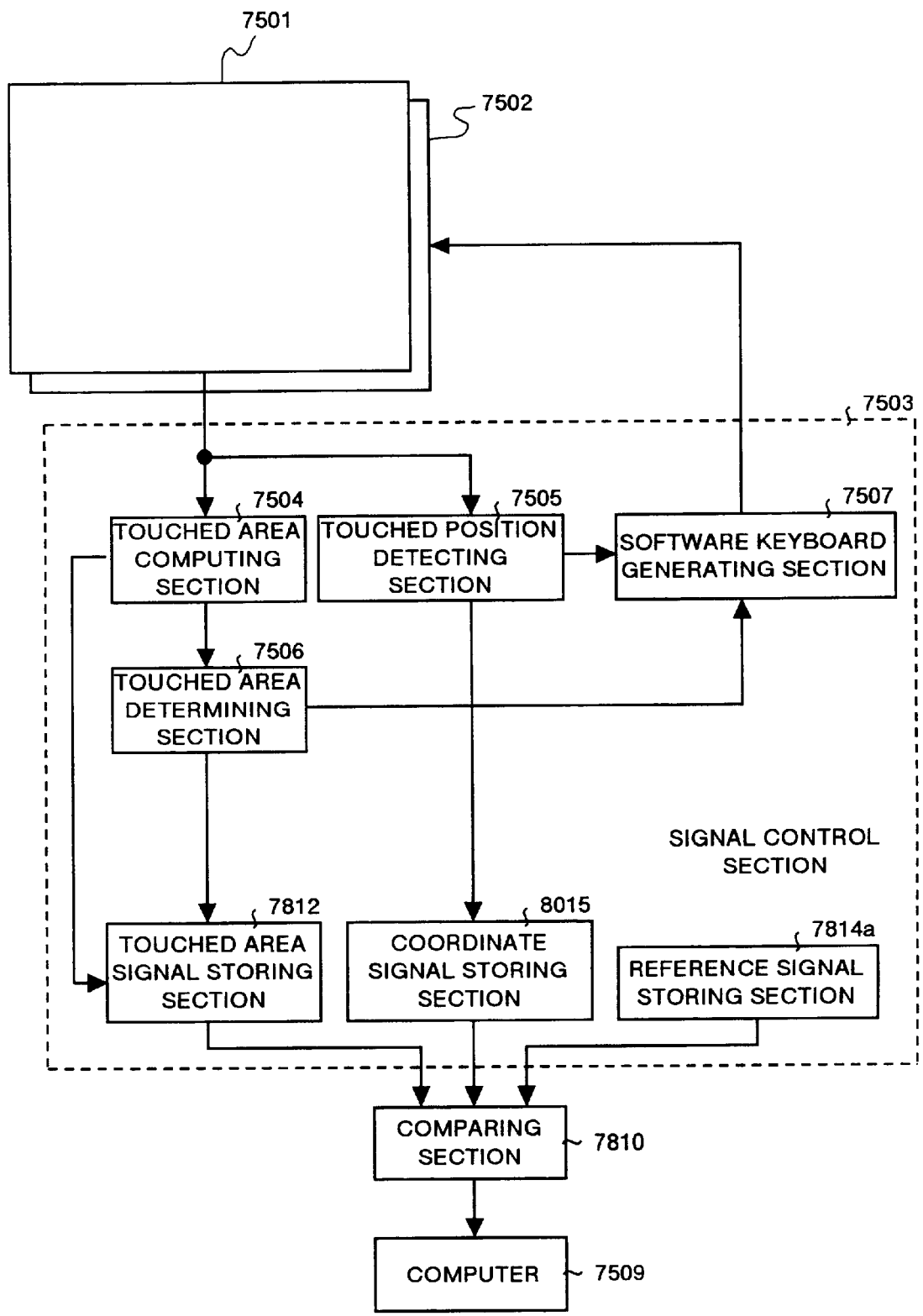
FIG. 82 is a block diagram showing a third example of the configuration of the display board system according to Embodiment 7 of the present invention.

FIG. 82 is a block diagram showing a third example of the configuration of the display board system. The display board system according to this third configuration performs authentication processing as to whether permission to access the system is given or not according to the user's handwriting. The signal control section 7503 of the display board system as shown in FIG. 82 has a touched area computing section 7504, a touched position detecting section 7505, a touched area determining section 7506, a software keyboard generating section 7507, a touched area signal storing section 7812, a coordinate signal storing section 8015, and a reference signal storing section 7814a.

The coordinate signal storing section 8015 stores therein coordinates of a touched position on the touch surface detected by the touched position detecting section 7505. The reference signal storing section 7814a registers therein a coordinate signal series obtained by previously measuring handwritings of users permitted to access the system and a touched area series as reference signals.

Figure 83:
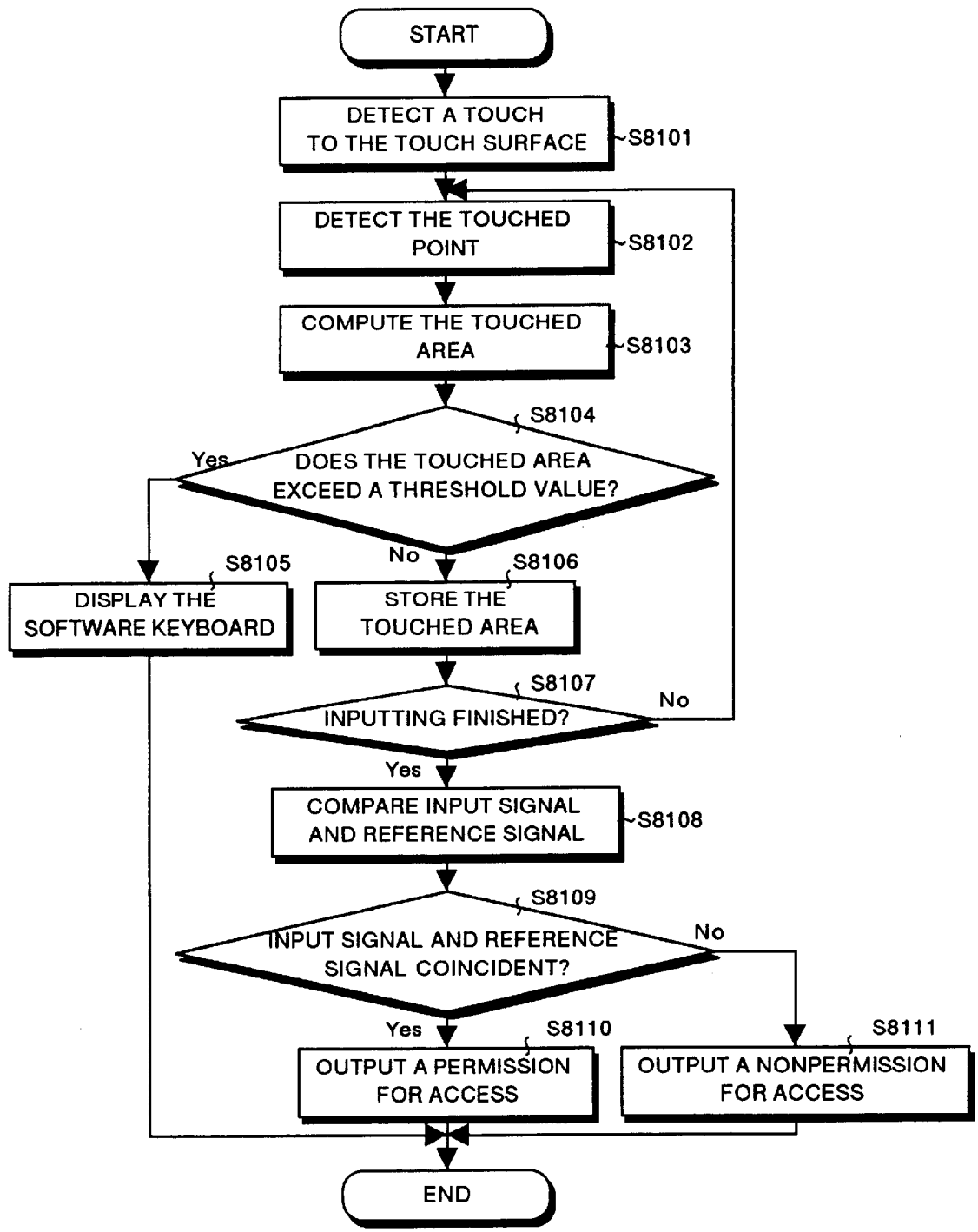
FIG. 83 is a flow chart of operations of the third example of the configuration of the display board system according to Embodiment 7 of the present invention.

Description is made for an operation of the display board system configured as described above with reference to the flow chart in FIG. 83. When the user touches the touch surface with his or her fingertip or the like, the coordinate-position input device 7501 outputs signals corresponding to the touched area and touched position to the touched area computing section 7504 as well as to the touched position detecting section 7505 (step S8101).

The touched position detecting section 7505 detects coordinates of a position on the touch surface touched with the fingertip or the like from a signal received from the coordinate-position input device 7501 and stores the values in the coordinate signal storing section 8015 (step S8102). At the same time, the touched area computing section 7504 computes an area on the touch surface touched with the fingertip according to the signal received from the coordinate-position input device 7501 (step S8103).

The touched area determining section 7506 compares the touched area computed by the touched area computing section 7504 with the preset threshold value (step S8104), and determines that the user has touched the touch surface with, for instance, a palm when the computed touched area is larger than the threshold value. In response to this determination, the software keyboard generating section 7507 generates a software keyboard and displays the keyboard on a position of the image display unit 7502 corresponding to the touched position (steps S8104 and S8105).

On the other hand, when the computed touched area is smaller than the threshold value, the touched area determining section 7506 determines that the user has created some graphics on the touch surface, and the touched areas are successively stored in the touched area signal storing section 7812 (steps S8104 and S8106).

When inputting to the touch surface is finished, the comparing section 7810 reads out the coordinate signal series stored in the coordinate signal storing section 8015 and the touched area signal series stored in the touched area signal storing section 7812. Then the comparing section 7810 compares the signals consisting of the read-out coordinate signal series and touched area signal series with the reference signals consisting of the coordinate signal series indicating handwriting of user's signature authorized to access the computer system and the touched area signal series each previously registered in the reference signal storing section 7814a (steps S8107 and S8108).

As a result of this comparison, when the reference signal coincident with the input signal is registered in the reference signal storing section 7814a, it is determined that the user has been registered, and permission to the user to access the system is sent to the computer 7509 (steps S8109 and S8110). On the other hand, when the reference signal coincident with the input signal is not registered in the reference signal storing section 7814a, inhibition to access the system is sent to the computer 7509 (steps S8109 and S8111). The computer 7509 displays the received result on the image display unit 7502.

As described above, determination is made as to whether the user is an authorized person or not according to the user's signature, therefore, high-reliability authentication for accessing the system can be verified with a simple operation.

Figure 84:
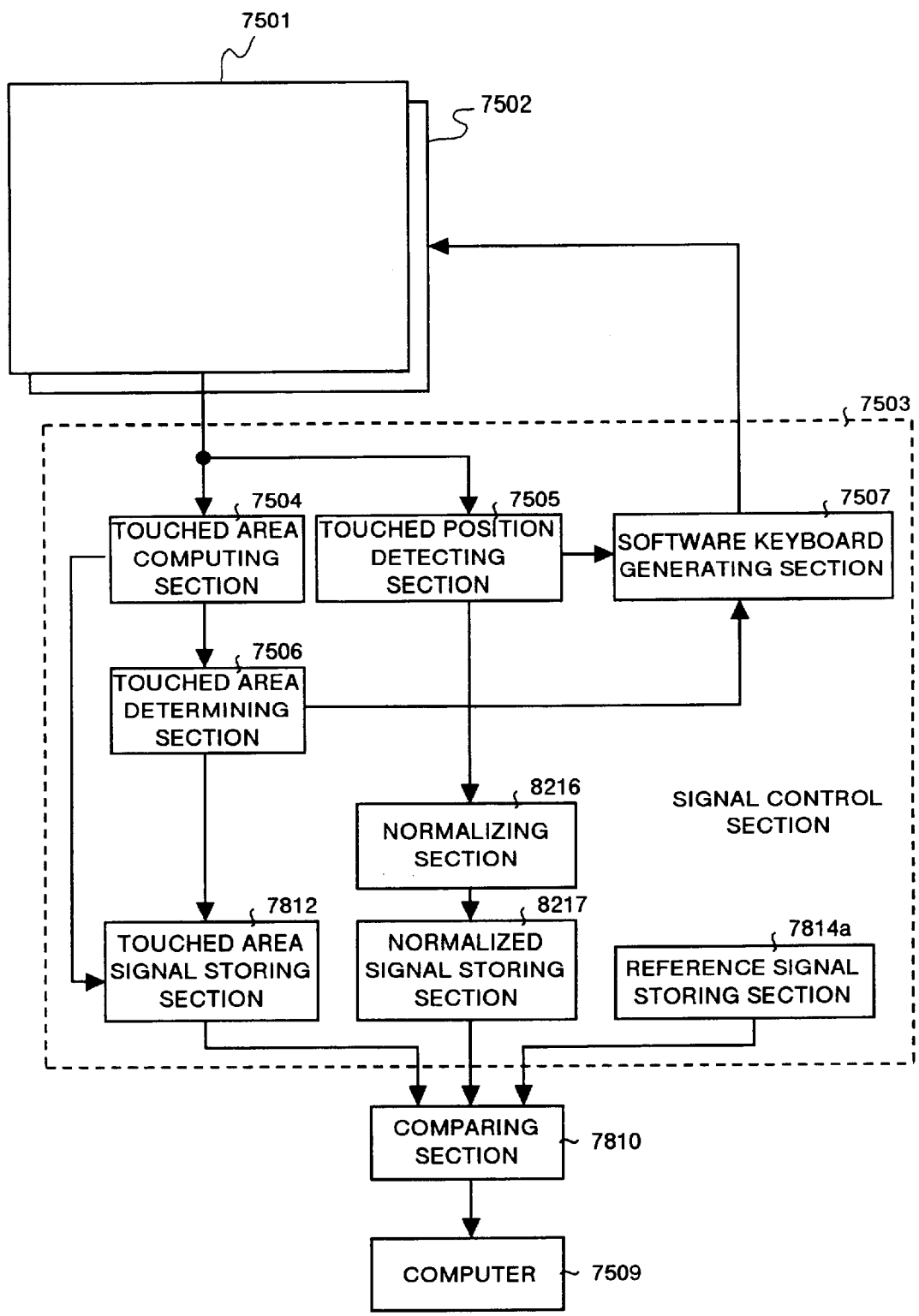
FIG. 84 is a block diagram showing a fourth example of the configuration of the display board system according to Embodiment 7 of the present invention.

In the third example of the configuration, the coordinate signal series for handwriting of user's signature detected in the touched position detecting section 7505 is stored in the coordinate signal storing section 8015. Then the input signal consisting of the coordinate signal series stored in the coordinate signal storing section 8015 and the touched area signal series stored in the touched area signal storing section 7812 are compared with the reference signal registered in the reference signal storing section 7814a. However, as shown in the block diagram (the fourth example of the configuration) in FIG. 84, a normalizing section 8216 and a normalized signal storing section 8217 may be provided instead of the coordinate signal storing section 8015, and a coordinate signal series for handwriting of user's signature detected in the touched position detecting section 7505 may be normalized in the normalizing section 8216 and stored in the normalized signal storing section 8217.

In this case, the input signal consisting of the normalized signal series of the coordinate signal stored in the normalized signal storing section 8217 and the touched area signal series stored in the touched area signal storing section 7812 is compared with the reference signal consisting of a normalized series of coordinate signals showing handwritings of signatures of the users authorized to access the computer system and the touched area series each previously stored in the reference signal storing section 7814a. As described above, by normalizing a coordinate signal of a handwriting of a user's signature detected in the touched position detecting section 7505, the user can make a signature of an arbitrary size, which allows convenience to be enhanced.

Figure 85:
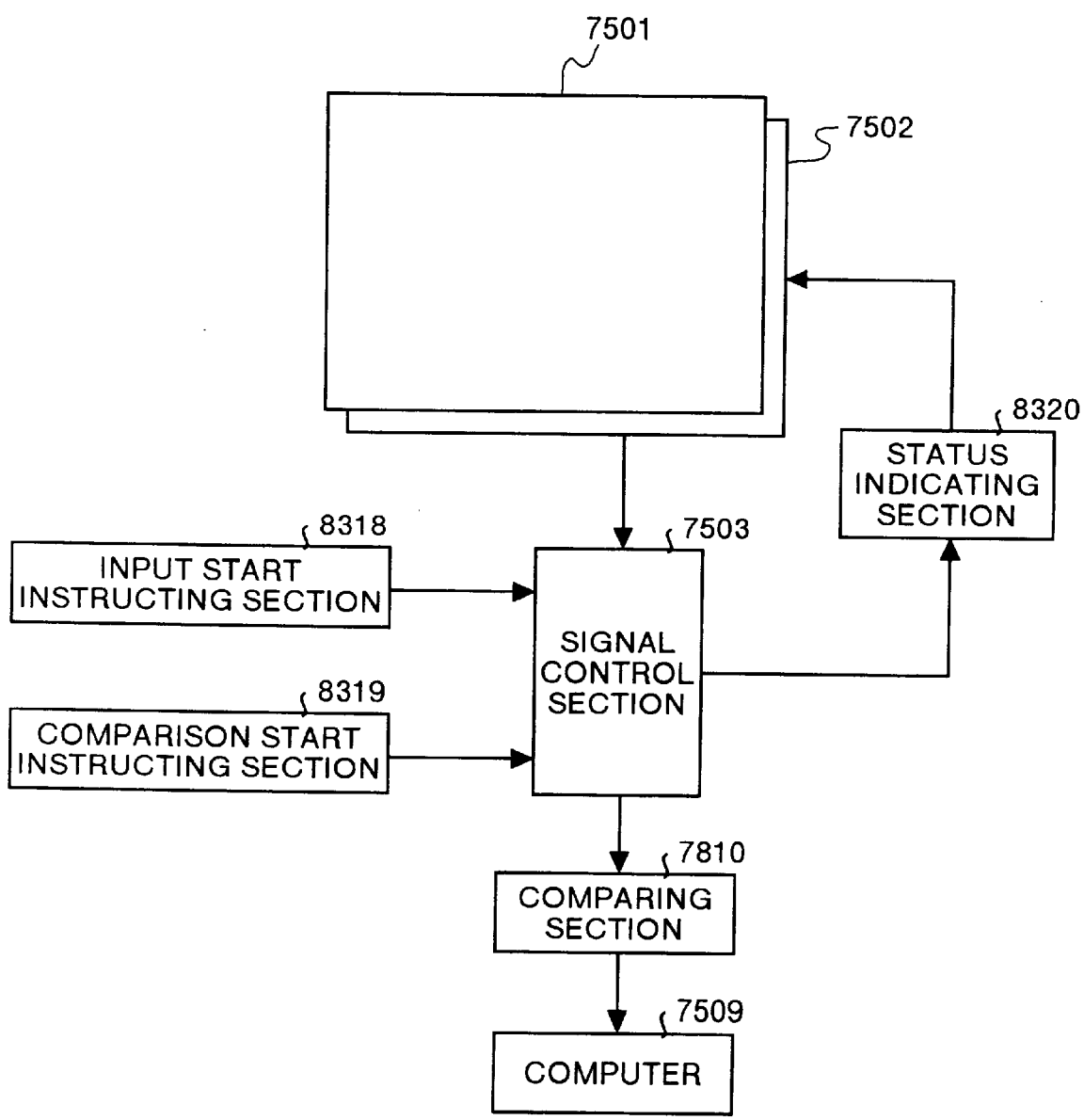
FIG. 85 is a block diagram showing a fifth example of the configuration of the display board system according to Embodiment 7 of the present invention.

As for each configuration for realizing the security function, as shown in the block diagram (the fifth example of the configuration) in FIG. 85, an input start instructing section 8318 for inputting an input start instruction to the signal control section 7503 and a comparison start instructing section 8319 for inputting a comparison start instruction thereto may be provided therein. As a result, when a PID number or a signature is to be inputted, a PID number or the like is inputted according to an input start instruction from the input start instructing section 8318, and when the PID number or the like is to be verified, an operation of comparison can be started according to the comparison start instruction inputted from the comparison start instructing section 8319, so that a PID number or the like can be more accurately verified. A physical switch or a switch like a software keyboard displayed on the image display unit 7502 can be used as the input start instructing section 8318 and the comparison start instructing section 8319.

When a PID number and a password are to be inputted, a touch number counter may be used as the input start instructing section 8318 and the comparison start instructing section 8319. As described above, when the touch number counter is used, the touched number counter is reset to "0" when the displayed software keyboard is first touched, an input start instruction is sent to the signal control section 7503. Then, a number of times is counted with the touched number counter each time when the user touches the software keyboard, and when the counted value reaches a certain number of times prespecified according to a PID number and a password, a comparison start instruction is sent to the signal control section 7503. As described above, a number of input times of a PID number and a password can also be confirmed.

When handwriting of a user's signature is to be inputted, a timer for measuring an input time may be used as the input start instructing section 8318 and the comparison start instructing section 8319. In this case, when a user touches the coordinate-position input device 7501 to start signing, the time measured by the timer is reset to "0" and the measurement is started, and an input start instruction is sent to the signal control section 7503. When a prespecified period of time is over, a comparison start instruction is sent to the signal control section 7503. As described above, even if a number of characters are not certain like in the case of authentication by a signature, an input operation of a signature and a comparing operation can be performed with stability.

A status indicating section 8320 confirms an input processing standby status before an input start instruction is sent from this input start instructing section 8318 to the signal control section 7503, an input processing start status after the input start instruction is sent to the signal control section 7503, a comparison processing status during comparison operation after a comparison start instruction is sent from the comparison start instructing section 8319, and a comparison operation end status. The confirmed status can be displayed on the image display unit 7502. With this feature, a user can accurately recognize each of the processing statuses, which allows convenience to be enhanced.

As described above, with the display board system according to Embodiment 7, a software keyboard is generated according to a touched area obtained by a user touching with a fingertip or the like on a touch surface formed with the image display unit and coordinate-position input device, and the software keyboard is displayed on a position of the image display unit corresponding to the touched position, so that the software keyboard can easily be displayed.

Furthermore, by displaying a software keyboard in a size according to a size of a touched area obtained by a user touching the touch surface with a fingertip or the like, an arbitrary-sized software keyboard can be displayed, which allows convenience to be enhanced.

In addition, by comparing a code signal series as well as a touched area signal series of coordinate of a touched position when a user touches an input surface with a fingertip or the like with a reference signal, determination can be made as to whether the user is an authorized person or not according to the PID number and password inputted through the software keyboard. Therefore, a high-reliability authentication for accessing the system can be verified without any particular operation by the user required f r authentication.

Furthermore, by comparing a coordinate signal series as well as a touched area series when a user touches a touch surface with a fingertip or the like with a reference signal, authentication for accessing the system can be verified according to handwriting of a user's signature, and high-reliability authentication can be performed.

In addition, by normalizing a coordinate signal series when a user touches a touch surface with a fingertip or the like, an arbitrary-sized signature can be used, which allows convenience to be enhanced.

Furthermore, by outputting instruction for inputting data is started through a touch surface or instruction for starting the comparison processing, a PID number or the like can more accurately be recognized. This input start instruction and comparison start instruction are executed with a touch number counting unit for counting a number of times the touch surface is touched or an input time measuring unit for measuring an input time, so that instructions can simply yet accurately be performed.

Furthermore, by displaying a status of inputting data into the touch surface or a status of comparison processing on an image display unit, a user can accurately recognize processing statuses, which allows convenience to be enhanced.

Each processing in Embodiments 1 to 7 described above can be realized by executing a previously prepared program by a computer. This program is recorded in a computer-readable recording medium such as a hard disk, a floppy disk, a CD-ROM, an MO, and a DVD, and is executed by reading out from the recording medium by the computer. Furthermore, this program may also be provided through the recording medium as described above or alternately through a network or broadcasting.

As described above, with the present invention, at least two light emitting units are provided that emit a light beam travelling along an entry area, at least two intensity-distribution detecting units are provided receive a light beam reflected by a reflecting unit and detect distribution of the intensity of the received light, and a coordinate-value identifying unit is provided in order to identify the coordinates of a light-blocked position where the light beam travelling along the entry area is blocked by using each distribution of intensity detected by the intensity-distribution detecting units. Therefore, a user can perform a desired input operation only by blocking a portion of the light travelling along the entry area with an arbitrary pointing body such as a user's finger or a pen, which allows operability to be improved. In other words, the need of using a special pen having a reflecting member can be eliminated.

With the present invention, each of at least two light emitting units emit a light beam toward an inner side of a frame to form an entry area in the inner side thereof, each of at least two intensity-distribution detecting units receive a light beam reflected by a reflecting member provided in a specified location of the frame and detect distribution of the intensity of the received light, and a coordinate-value identifying unit identifies a light-blocked position using the detected distribution of intensity. Therefore, a user can perform a desired input operation only by blocking a portion of the light travelling along the entry area with an arbitrary pointing body such as a user's finger or a pen, which allows operability to be improved. In other words, the need of using a special pen having a reflecting member can be eliminated.

With the present invention, the light emitting unit forms light from a light source into a fan shape and emits the fan-shaped light beams so that the emitted light beams cover the entry area or a substantially entire area of the inner side of the frame. Therefore, the need for using a mechanical system such as a rotating polygon mirror for scanning the entry area with a light beam can be eliminated, which allows generation of vibrations in the device to be prevented. Therefore, coordinates of a position where light travelling along the entry area is blocked can accurately be identified, which allows reliability of the coordinate-position inputting/detecting device to be enhanced.

With the present invention, one unit of light source may be provided for all the light emitting units or one unit of light source may be provided for each of the light emitting units. Therefore, the flexibility in design can be increased. For example, component devices for the coordinate-position inputting/detecting device can be selected based on their cost.

With the present invention, a light converging system converges light from the light source to form fan shape light beams, therefore, a light that can cover most of the area of the inner side of the frame can be emitted. This allows the need for using a mechanical system such as a rotating polygon mirror for scanning the entry area with a light beam to be eliminated.

With the present invention, a light converging lens converges the light reflected by the reflecting unit, and a light-receiving element receives the light converged by the light converging lens and outputs an electric signal according to the distribution of intensity of the received light, therefore, the distribution of light intensity can be detected with simple configuration.

With the present invention, the light reflected by the reflecting unit is led to the light-receiving element through a slit, and the light-receiving element receives the light converged by the light converging lens and outputs an electric signal according to the distribution of intensity of the received light, therefore, the distribution of light intensity can be detected with simple configuration.

With the present invention, dark points generated on the light-receiving elements due to a blocking of the light beam within the entry area are detected according to the electric signals outputted from the light-receiving elements, and coordinates of the light-blocked position are computed using the detected dark points. Therefore, coordinates of the light-blocked position can easily be identified using, for example, the principle of triangulation.

With the present invention, dark points generated on the light-receiving elements due to a blocking of the light beam within the entry area are detected according to the electric signals outputted from the light-receiving elements, coordinate information obtained by previously correlating the coordinates within the entry area to each combination of two dark points is referred to, and the coordinates corresponding to the combination of the of the detected dark points are selected as coordinates of the light-blocked position. Thus, the processing required for identifying the coordinates of the light-blocked position can be simplified and speeded up.

With the present invention, the light emitting unit, the reflecting unit, and the intensity-distribution detecting unit are integrated with the frame, therefore, workability, for example, when the coordinate-position inputting/detecting device is to be attached to a display unit can be improved.

With the present invention, a minimum-value identifying unit identifies minimum values of the distribution of intensity detected by each of the intensity-distribution detecting unit respectively, a computing unit computes a time differentiation of identified coordinates. A determining unit determines the contents of an input operation performed by a user in the entry area from the previously prepared condition and at least one of the minimum values, coordinates, and time-differentiation values. Therefore, it is possible to accurately identify what type of input operation a user performs in an entry area.

With the present invention, the intensity-value identifying unit identifies light intensity values of the dark points detected by the dark point detecting unit according to electric signals outputted from each of the light-receiving elements respectively, a second computing unit computes a time differentiation of the coordinates obtained by a first computing unit. A determining unit determines the contents of an input operation performed by a user in the entry area from the previously prepared condition and at least one of the light intensity values, coordinate values, and time-differentiated values. Therefore, it is possible to accurately identify what type of input operation a user performs in an entry area.

With the present invention, the intensity-value identifying unit identifies light intensity values of the dark points detected by the dark point detecting unit according to electric signals outputted from each of the light-receiving elements, a first computing unit computes a time differentiation of the coordinates selected by a selecting unit. A determining unit determines the contents of an input operation performed by a user in the entry area from the previously prepared condition and at least one of the light intensity values, coordinate values, and time-differentiated values. Therefore, it is possible to accurately identify what type of input operation a user performs in an entry area.

With the present invention, a result of previous determination concerning the contents of an operation is used as one of the conditions for determining the contents of the next operation. Therefore, the contents of continuous input operation by a user can accurately be determined.

With the present invention, an entry area that matches with the size of a display surface of a display unit is formed, therefore, the display surface can effectively be used. In addition, as the entry area is formed with light, viewability of the display unit is not reduced.

With the present invention, an entry area that matches with the size of a write-in surface for writing freehand characters and graphics is formed, therefore, the write-in surface can effectively be used. In addition, as the entry area is formed with light, the write-in surface can be made use of as it is.

With the present invention, the coordinate-position inputting/detecting device is provided in the front surface of a display unit for displaying characters and images, and a display surface and a write-in surface of a display board are formed with the display unit and coordinate-position inputting/detecting device. Therefore, viewability of the display unit and operability as well as reliability of the system can be improved.

With the present invention, the coordinate-position inputting/detecting device is provided in the front surface of a display unit for displaying thereon characters and images, and a display surface and a write-in surface of the display board are formed with the display unit and coordinate-position inputting/detecting device, therefore, viewability of the display unit and operability as well as reliability of the system can be improved. Furthermore, the display board system comprises a frame unit having a holding section for holding a display surface and a write-in surface of the display board at a specified height. A printer accommodating section for accommodates the printer therein, and a control unit accommodating section for accommodates the control unit therein. The control unit accommodating section, printer accommodating section, and holding section are arranged in the vertical direction in this order from the bottom, and as a result of that, transport and installation of the system can easily be carried out, which allows adaptability for handling of the system to be improved. Namely, downsizing and integration of the system as a whole can be achieved, and also adaptability for handling, operability and reliability can be improved.

With the present invention, because a plasma display is used as a display unit, in addition to the above mentioned effects that viewability of a display unit and operability as well as reliability of the system can be improved, optimizations of the system can be performed by making use of characteristics of the plasma display that makes a thickness of a display unit thinner, has high brightness as well as a wide viewing angle, and can smoothly reproduce moving pictures.

With the present invention, a keyboard placement section for placing a keyboard connected to a personal computer is provided at a position in the upper side of the printer accommodating section and in the lower side of the holding section of a frame unit, therefore, adaptability for handling of the system can be improved.

With the present invention, an angle adjusting unit for adjusting an angle of a display surface and a write-in surface of the display board is provided in a holding section. Thus, incoming disturbance light to a display unit (display surface), especially, light from lighting equipment such as a fluorescent tube on a ceiling can be prevented. This allows viewability of the display unit, operability for entry, and adaptability for handling of the system to be improved.

With the present invention, a plurality of connecting terminals for connecting various types of information equipment and AV equipment such as a digital camera, a DVD player, and video equipment are provided in a display unit and is usable as a large-sized screen monitor, therefore, it is possible to provide a display board system enabling connection and operation of various types of information equipment and AV equipment without a computer. In addition, it is possible to make use of a display board system at any occasion, which allows general versatility of the display board system to be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinate-position inputting/detecting device comprising:
   at least two light emitting means each for emitting light beams traveling along an entry area having a specified area;
   reflecting means provided at a specified location in a peripheral section of the entry area for reflecting incident light beams emitted from each of said light emitting means back towards substantially the same respective light paths as the incident light beams;
   at least two intensity-distribution detecting means each for receiving the light beams reflected by said reflecting means and for detecting the distribution of the intensity of the received light;
   coordinate-value identifying means for identifying the coordinates of a blocked position where the light beam traveling along the entry area is blocked by using the distribution of intensity detected by each of said intensity-distribution detecting means;
   minimum-value identifying means for identifying local minimum values of the distribution of intensity detected by each of said intensity-distribution detecting means;
   storing means for storing therein at least one of the local minimum values identified by said minimum-value identifying means and the coordinates identified by said coordinate-value identifying means; and
   determining means for determining the contents of an operation performed in said entry area according to a previously prepared condition and at least one of the local minimum values and the coordinates stored in said storing means,
   wherein the determining means determines the contents of the operation performed in the entry area is a pointing state when a local minimum value is smaller than a first predetermined intensity threshold but larger than a second predetermined intensity threshold, said first predetermined intensity threshold being larger than said second predetermined intensity threshold.

2. A coordinate-position inputting/detecting device comprising:
   at least two light emitting units each configured to emit light beams traveling along an entry area having a specified area;
   a reflecting unit provided at a specified location in a peripheral section of the entry area and configured to reflect incident light beams emitted from each of said light emitting units back towards substantially the same light paths as the incident light beams;
   at least two intensity-distribution detecting units each configured to receive the light beams reflected by said reflecting unit and to detect the distribution of the intensity of the received light;
   a coordinate-value identifying unit configured to identify the coordinates of a blocked position where the light beam traveling along the entry area is blocked by using the distribution of intensity detected by each of said intensity-distribution detecting units;
   a minimum-value identifying unit configured to identify local minimum values of the distribution of intensity detected by each of said intensity-distribution detecting units;
   a memory configured to store at least one of the local minimum values identified by said minimum-value identifying unit and the coordinates identified by said coordinate-value identifying unit; and
   a determining unit configured to determine the contents of an operation performed in said entry area according to a previously prepared condition and at least one of the local minimum values and the coordinates stored in said memory,
   wherein the determining unit determines the contents of the operation performed in the entry area is a pointing state when a local minimum intensity value is smaller than a first predetermined intensity threshold but larger than a second predetermined intensity threshold, said first predetermined intensity threshold being larger than said second predetermined intensity threshold.

3. A method for inputting/detecting coordinate-position comprising the steps of:
   emitting light beams traveling along an entry area with at least two light emitting units, said entry area having a specified area;
   reflecting incident light beams emitted from each of said light emitting units with a reflecting unit back towards substantially the same respective light paths as the incident light beams, said reflecting unit provided at a specified location in a peripheral section of said entry area;
   receiving the light beams reflected by said reflecting unit and detecting the distribution of the intensity of the received light with at least two intensity-distribution detecting units;
   identifying a position on said entry area at which the light beams traveling along the entry area are blocked with a coordinate-value identifying unit according to the distribution of the intensity of the received light detected by each of said intensity-distribution detecting units;
   identifying local minimum values of the distribution of intensity detected by each of said intensity-distribution detecting units with a minimum-value identifying unit;

storing in a memory at least one of the local minimum values identified by said minimum-value identifying unit and the coordinates identified by said coordinate-value identifying unit; and determining the contents of an operation performed in said entry area according to a previously prepared condition and at least one of the local minimum values and the coordinates stored in the storing step, wherein the determining step determines the contents of the operation performed in the entry area is a pointing state when a local minimum value is smaller than a first predetermined intensity threshold but larger than a second predetermined intensity threshold, said first predetermined intensity threshold being larger than said second predetermined intensity threshold.

4. The method according to claim 3, wherein the receiving step comprises:

converging the light reflected by said reflecting step; and outputting an electric signal according to the distribution of intensity of the converged light.

5. The method according to claim 4, wherein said position identifying step comprises:

detecting dark points generated due to blocking of a light beam within said entry area according to the electric signals outputted from said outputting step; and computing the coordinates of the light-blocked position using the position of the dark points detected by said dark point detecting step.

6. The method according to claim 4, wherein said position identifying step comprises:

detecting dark points generated due to blocking of a light beam within said entry area according to the electric signal outputted from said outputting step;

storing coordinate information obtained by previously correlating the coordinates within said entry area to each combination of the dark points detected by said dark point detecting step; and selecting the coordinates corresponding to the combination of the relative positions of the dark points detected by said dark point detecting step as the coordinates of the light-blocked position.

7. A coordinate-position inputting/detecting device comprising:

at least two light emitting means each for emitting light beams traveling along an entry area having a specified area;

reflecting means provided at a specified location in a peripheral section of the entry area for reflecting incident light beams emitted from each of said light emitting means back towards substantially the same respective light paths as the incident light beams;

at least two intensity-distribution detecting means each for receiving the light beams reflected by said reflecting means and for detecting the distribution of the intensity of the received light;

coordinate-value identifying means for identifying the coordinates of a blocked position where the light beam traveling along the entry area is blocked by using the distribution of intensity detected by each of said intensity-distribution detecting means;

minimum-value identifying means for identifying a value that represents a change in light intensity due to a touch detected by each of said intensity-distribution detecting means;

storing means for storing therein at least one of the value that represents the change in light intensity due to the touch identified by said minimum-value identifying means and the coordinates identified by said coordinate-value identifying means; and determining means for determining the contents of an operation performed in said entry area according to a previously prepared condition and at least one of the value that represents the change in light intensity due to the touch and the coordinates stored in said storing means, wherein the determining means determines the contents of the operation performed in the entry area is a pointing state when the value that represents the change in light intensity due to the touch is smaller than a first predetermined intensity threshold but larger than a second predetermined intensity threshold, and said first predetermined intensity threshold being larger than said second predetermined intensity threshold.

8. The coordinate-position inputting/detecting device according to claim 7, wherein said light emitting means forms a light beam from a light source in a fan shape and emits the fan-shaped light beam.

9. The coordinate-position inputting/detecting device according to claim 8, wherein one light source is provided for all of said light emitting means or one light source is provided for each of said light emitting means.

10. The coordinate-position inputting/detecting device according to claim 8, wherein each of said light emitting means comprises a light converging system for converging a light beam from said light source to form a fan shape light beam.

11. The coordinate-position inputting/detecting device according to claim 7, wherein each of the intensity-distribution detecting means comprises:

light converging means for converging the light reflected by said reflecting means; and light-receiving means provided in the downstream side from said light converging lens for outputting an electric signal according to the distribution of intensity of the converged light.

12. The coordinate-position inputting/detecting device according to claim 11, wherein each of said intensity-distribution detecting means comprises a slit instead of said light converging means for leading the light reflected by said reflecting means to said light-receiving means.

13. The coordinate-position inputting/detecting device according to claim 11, wherein said coordinate-value identifying means comprises:

dark point detecting means for detecting dark points on said light-receiving means generated due to blocking of a light beam within said entry area according to the electric signals outputted from each of said light-receiving means; and first computing means for computing the coordinates of the light-blocked position using the position of the dark points detected by said dark point detecting means.

14. The coordinate-position inputting/detecting device according to claim 13, wherein said coordinate-value identifying means further comprises:

intensity-value identifying means for identifying the light intensity values of the dark points detected by said dark point detecting means respectively according to electric signals outputted from said light-receiving means;

second computing means for computing a time differentiation of the coordinates obtained by said first computing means;

storing means for storing therein at least one of the light intensity values identified by said intensity-value identifying means, the coordinates obtained by said first computing means and the time-differentiated values obtained by said second computing means in a correlated form; and determining means for determining the contents of an operation performed in said entry area according to the previously prepared condition and at least one of the light intensity values, coordinates and the time-differentiated values each stored in said storage means.

15. The coordinate-position inputting/detecting device according to claim 14, wherein said determining means uses a result of a previous determination concerning the contents of the operation as one of the conditions.

16. The coordinate-position inputting/detecting device according to claim 11, wherein said coordinate-value identifying means comprises:

dark point detecting means for detecting dark points on said light-receiving means generated due to blocking of a light beam within said entry area according to the electric signal outputted from each of said light-receiving means;

storing means for storing therein coordinate information obtained by previously correlating the coordinates within said entry area to each combination of the dark points detected by said dark point detecting means; and selecting means for selecting the coordinates corresponding to the combination of the relative positions of the dark points detected by said dark point detecting means as the coordinates of the light-blocked position.

17. The coordinate-position inputting/detecting device according to claim 16, wherein said coordinate-value identifying means further comprises:

intensity-value identifying means for identifying the light intensity values of the dark points detected by said dark point detecting means respectively according to the electric signals outputted from said light-receiving means;

first computing means for computing a time differentiation of coordinates selected by said selecting means;

storing means for storing therein at least one of the light intensity values identified by said intensity-values identifying means, the coordinates selected by said selecting means and the time-differentiated value obtained by said first computing means in a correlated form; and determining unit for determining the contents of an operation performed in said entry area according to the previously prepared condition and at least one of the light intensity values, coordinates and the time-differentiated values stored in said storing means.

18. The coordinate-position inputting/detecting device according to claim 17, wherein said determining means uses a result of a previous determination concerning the contents of the operation as one of the conditions.

19. The coordinate-position inputting/detecting device according to claim 7, wherein said determining means uses a result of a previous determination concerning the contents of the operation as one of the conditions.

20. The coordinate-position inputting/detecting device according to claim 7, wherein said entry area is formed, when the coordinate-position inputting/detecting device is to be attached in front of the display surface of a display unit, of the size that matches with the size of the display surface.

21. The coordinate-position inputting/detecting device according to claim 7, wherein said entry area is formed, when the coordinate-position inputting/detecting device is to be attached in front of a write-in surface for writing freehand characters and graphics, of the size that matches with the size of the write-in surface.

22. A coordinate-position inputting/detecting device comprising:

at least two light emitting units each configured to emit light beams traveling along an entry area having a specified area;

a reflecting unit provided at a specified location in a peripheral section of the entry area and configured to reflect incident light beams emitted from each of said light emitting units back towards substantially the same light paths as the incident light beams;

at least two intensity-distribution detecting units each configured to receive the light beams reflected by said reflecting unit and to detect the distribution of the intensity of the received light;

a coordinate-value identifying unit configured to identify the coordinates of a blocked position where the light beam traveling along the entry area is blocked by using the distribution of intensity detected by each of said intensity-distribution detecting units;

a minimum-value identifying unit configured to identify a value that represents a change in light intensity due to a touch detected by each of said intensity-distribution detecting units;

a memory configured to store at least one of the value that represents the change in light intensity due to the touch identified by said minimum-value identifying unit and the coordinates identified by said coordinate-value identifying unit; and a determining unit configured to determine the contents of an operation performed in said entry area according to a previously prepared condition and at least one of the value that represents the change in light intensity due to the touch and the coordinates stored in said memory, wherein the determining unit determines the contents of the operation performed in the entry area is a pointing state when the value that represents the charge in light intensity is smaller than a first predetermined intensity threshold but larger than a second predetermined intensity threshold, said first predetermined intensity threshold being larger than said second predetermined intensity threshold.

23. The coordinate-position inputting/detecting device according to claim 22, wherein said light emitting units form a light beam from a light source in a fan shape and emits the fan-shaped light beam.

24. The coordinate-position inputting/detecting device according to claim 23, wherein one light source is provided for all of said light emitting units or one light source is provided for each of said light emitting units.

25. The coordinate-position inputting/detecting device according to claim 23, wherein each of said light emitting units comprise a light converging system for converging a light beam from said light source to form a fan shape light beam.

26. The coordinate-position inputting/detecting device according to claim 22, wherein each of the intensity-distribution detecting units comprises:

a light converging unit configured to converge the light reflected by said reflecting unit; and a light-receiving unit provided in the downstream side from said light converging unit and configured to output an electric signal according to the distribution of intensity of the converged light.

27. The coordinate-position inputting/detecting device according to claim 26, wherein each of said intensity-distribution detecting units comprise a slit instead of said light converging unit configured to lead the light reflected by said reflecting unit to said light-receiving unit.

28. The coordinate-position inputting/detecting device according to claim 26, wherein said coordinate-value identifying unit comprises:
    a dark point detecting unit configured to detect the dark points on said light-receiving unit generated due to blocking of a light beam within said entry area according to the electric signals outputted from each of said light-receiving units; and
    a first computing unit configured to compute the coordinates of the light-blocked position using the position of the dark points detected by said dark point detecting unit.

29. The coordinate-position inputting/detecting device according to claim 28, wherein said coordinate-value identifying unit further comprises:
    an intensity-value identifying unit configured to identify the light intensity values of the dark points detected by said dark point detecting unit respectively according to electric signals outputted from said light-receiving unit;
    a second computing unit configured to compute a time differentiation of the coordinates obtained by said first computing unit;
    a memory configured to store therein at least one of the light intensity values identified by said intensity-value identifying unit, the coordinates obtained by said first computing unit and the time-differentiated values obtained by said second computing unit in a correlated form; and
    a determining unit configured to determine the contents of an operation performed in said entry area according to the previously prepared condition and at least one of the light intensity values, coordinates and the time-differentiated values each stored in said memory.

30. The coordinate-position inputting/detecting device according to claim 29, wherein said determining unit uses a result of a previous determination concerning the contents of the operation as one of the conditions.

31. The coordinate-position inputting/detecting device according to claim 26, wherein said coordinate-value identifying unit comprises:
    a dark point detecting unit configured to detect the dark points on said light-receiving unit generated due to blocking of a light beam within said entry area according to the electric signal outputted from each of said light-receiving units;
    a memory configured to store therein coordinate information obtained by previously correlating the coordinates within said entry area to each combination of the dark points detected by said dark point detecting unit; and
    a selecting unit configured to select the coordinates corresponding to the combination of the relative positions of the dark points detected by said dark point detecting unit as the coordinates of the light-blocked position.

32. The coordinate-position inputting/detecting device according to claim 31, wherein said coordinate-value identifying unit further comprises:
    an intensity-value identifying unit configured to identify the light intensity values of the dark points detected by said dark point detecting unit respectively according to the electric signals outputted from said light-receiving unit;
    a first computing unit configured to compute a time differentiation of coordinates selected by said selecting unit;
    a memory configured to store therein at least one of the light intensity values identified by said intensity-value identifying unit, the coordinates selected by said selecting unit and the time-differentiated values obtained by said first computing unit in a correlated form; and
    a determining unit configured to determine the contents of an operation performed in said entry area according to the previously prepared condition and at least one of the light intensity values, coordinates and the time-differentiated values stored in said storing unit.

33. The coordinate-position inputting/detecting device according to claim 32, wherein said determining unit uses a result of a previous determination concerning the contents of the operation as one of the conditions.

34. The coordinate-position inputting/detecting device according to claim 22, wherein said determining unit uses a result of a previous determination concerning the contents of the operation as one of the conditions.

35. The coordinate-position inputting/detecting device according to claim 22, wherein said entry area is formed, when the coordinate-position inputting/detecting device is to be attached in front of the display surface of a display unit, of the size that matches with the size of the display surface.

36. The coordinate-position inputting/detecting device according to claim 22, wherein said entry area is formed, when the coordinate-position inputting/detecting device is to be attached in front of a write-in surface for writing freehand characters and graphics, of the size that matches with the size of the write-in surface.

37. A method for inputting/detecting coordinate-position comprising the steps of:
    emitting light beams traveling along an entry area with at least two light emitting units, said entry area having a specified area;
    reflecting incident light beams emitted from each of said light emitting units with a reflecting unit back towards substantially the same respective light paths as the incident light beams, said reflecting unit provided at a specified location in a peripheral section of said entry area;
    receiving the light beams reflected by said reflecting unit and detecting the distribution of the intensity of the received light with at least two intensity-distribution detecting units;
    identifying a position on said entry area at which the light beams traveling along the entry area are blocked with a coordinate-value identifying unit according to the distribution of the intensity of the received light detected by each of said intensity-distribution detecting units;
    identifying a value that represents a change in light intensity due to a touch detected by each of said intensity-distribution detecting units with a minimum-value identifying unit;
    storing in a memory at least one of the value that represents the change in light intensity due to the touch identified by said minimum-value identifying unit and the coordinates identified by said coordinate-value identifying unit; and
    determining the contents of an operation performed in said entry area according to a previously prepared condition and at least one of the value that represents the change in light intensity due to the touch and the coordinates stored in the storing step;

wherein the determining step determines the contents of the operation performed in the entry area is a pointing state when the value that represents the change in light intensity due to the touch is smaller than a first predetermined intensity threshold but larger than a second predetermined intensity threshold, said first predetermined intensity threshold being larger than said second predetermined intensity threshold.

38. The method according to claim 37, wherein said emitting step forms a light beam from a light source in a fan shape and emits the fan-shaped light beam.

39. The method according to claim 38, wherein said emitting step forms a light beam with one light source.

40. The method according to claim 38, further comprising the step of:
converging a light beam from said light source to form a fan shape light beam.

41. The method according to claim 37, wherein the receiving step comprises:
converging the light reflected by said reflecting step; and
outputting an electric signal according to the distribution of intensity of the converged light.

42. The method according to claim 41, wherein said receiving step leads the light reflected by said reflecting step to said outputting step via a slit instead of said converging step.

43. The method according to claim 41, wherein said position identifying step comprises:
detecting dark points generated due to blocking of a light beam within said entry area according to the electric signals outputted from said outputting step; and
computing the coordinates of the light-blocked position using the position of the dark points detected by said dark point detecting step.

44. The method according to claim 43, wherein said position identifying step further comprises:
identifying the light intensity values of the dark points detected by said dark point detecting step respectively according to electric signals outputted from said outputting step;
computing a time differentiation of the coordinates obtained by said coordinate computing step;
storing at least one of the light intensity values identified by said identifying step, the coordinates obtained by said coordinate computing step and the time-differentiated values obtained by said time differentiation computing step in a correlated form; and
determining the contents of an operation performed in said entry area according to the previously prepared condition and at least one of the light intensity values, coordinates and the time-differentiated values each stored in said storing step.

45. The method according to claim 44, wherein said determining step uses a result of a previous determination concerning the contents of the operation as one of the conditions.

46. The method according to claim 43, wherein said position identifying step further comprises:
identifying the light intensity values of the dark points detected by said dark point detecting step respectively according to the electric signals outputted from said outputting step;
computing a time differentiation of coordinates selected by said selecting step;
storing at least one of the light intensity values identified by said identifying step, the coordinates selected by said selecting step and the time-differentiated values obtained by said time differentiation computing step in a correlated form; and
determining the contents of an operation performed in said entry area according to the previously prepared condition and at least one of the light intensity values, coordinates and the time-differentiated values stored in said storing step.

47. The method according to claim 46, wherein said determining step uses a result of previous determination concerning the contents of the operation as one of the conditions.

48. The method according to claim 41, wherein said position identifying step comprises:
detecting dark points generated due to blocking of a light beam within said entry area according to the electric signal outputted from said outputting step;
storing coordinate information obtained by previously correlating the coordinates within said entry area to each combination of the dark points detected by said dark point detecting step; and
selecting the coordinates corresponding to the combination of the relative positions of the dark points detected by said dark point detecting step as the coordinates of the light-blocked position.

49. The method according to claim 37, wherein said determining step uses a result of previous determination concerning the contents of the operation as one of the conditions.

50. The method according to claim 37, wherein said entry area is formed, when the coordinate-position inputting/detecting device is to be attached in front of the display surface of a display unit, of the size that matches with the size of the display surface.

51. The method according to claim 37, wherein said entry area is formed, when the coordinate-position inputting/detecting device is to be attached in front of a write-in surface for writing freehand characters and graphics, of the size that matches with the size of the write-in surface.

* * * * *